US011756528B2

(12) United States Patent
Gullo

(10) Patent No.: US 11,756,528 B2
(45) Date of Patent: Sep. 12, 2023

(54) AUTOMATIC GENERATION OF VIDEOS FOR DIGITAL PRODUCTS USING INSTRUCTIONS OF A MARKUP DOCUMENT ON WEB BASED DOCUMENTS

(71) Applicant: Videate, Inc., Liberty Hill, TX (US)

(72) Inventor: David Christian Gullo, Liberty Hill, TX (US)

(73) Assignee: Videate, Inc., Liberty Hill, TX (US)

( * ) Notice: Subject to any disclaimer, the term of this patent is extended or adjusted under 35 U.S.C. 154(b) by 54 days.

(21) Appl. No.: 17/228,972

(22) Filed: Apr. 13, 2021

(65) Prior Publication Data

US 2021/0319781 A1 Oct. 14, 2021

Related U.S. Application Data

(60) Provisional application No. 63/009,448, filed on Apr. 13, 2020.

(51) Int. Cl.
| | |
|---|---|
| *G10L 13/08* | (2013.01) |
| *G06F 40/166* | (2020.01) |
| *G06F 16/9535* | (2019.01) |
| *H04N 21/61* | (2011.01) |
| *G10L 13/027* | (2013.01) |
| *G06T 13/80* | (2011.01) |
| *G10L 15/00* | (2013.01) |

(52) U.S. Cl.
CPC .......... *G10L 13/086* (2013.01); *G06F 40/166* (2020.01); *G06T 13/80* (2013.01); *G10L 13/027* (2013.01); *G10L 15/005* (2013.01)

(58) Field of Classification Search
CPC ............ G06F 16/9535; G06Q 30/0241; H04N 21/6175

USPC .............................................. 386/285; 725/46
See application file for complete search history.

(56) References Cited

U.S. PATENT DOCUMENTS

| | | | | |
|---|---|---|---|---|
| 2009/0003800 A1* | 1/2009 | Bodin | ................. | G06F 16/9535 386/285 |
| 2015/0365725 A1* | 12/2015 | Belyaev | ............. | H04N 21/6175 725/46 |

(Continued)

FOREIGN PATENT DOCUMENTS

| | | | |
|---|---|---|---|
| CN | 103325399 B | * | 4/2016 |
| CN | 108282677 A | * | 7/2018 |
| KR | 20130083021 A | * | 7/2013 |

*Primary Examiner* — Farzad Kazeminezhad
(74) *Attorney, Agent, or Firm* — Makoui Law, PC; Ali Makoui

(57) ABSTRACT

A system for generating videos uses a domain-specific instructional language and a video rendering engine that produces videos against a digital product which changes and evolves over time. The video rendering engine uses the instructions in an instruction markup document written in the domain-specific instructional language to generate a video while navigating a web-based document, (which is different from the instruction markup document), representing the digital product for which the video is generated. The video rendering engine navigates the web-based document, coupled with the instruction markup document, which explains the operations to be performed on the web-based document. The instruction markup document also identifies the special effects that manipulate the underlying product in real-time, includes the spoken text for generating subtitles, and provides formalized change management by design.

38 Claims, 34 Drawing Sheets

(56) References Cited

U.S. PATENT DOCUMENTS

2017/0161239 A1* 6/2017 Newton ............. G06Q 30/0241
2019/0129923 A1* 5/2019 Li ........................ G06F 40/106

* cited by examiner

| Narrative | Action | Data | Special Effect |
|---|---|---|---|
| [1] On the left panel you will see Spiels where you can edit or upload documents that drive the videos.<br><br>Click the [2] New button and [3] enter a title for your new video.<br>[4] | [1] Click 'Spiels'<br><br>[2] Click 'New'<br><br>[3] The 'Title' | [3] 'My New Spiel' | [4] 'Quick Swirl' |

FIG. 5

| TYPE OF CONSTRUCT | CONSTRUCT |
| --- | --- |
| Root | spiel |
| Screen Animations | circle; swirl; quick_swirl; long_swirl; long_swirl_out; spaz; fade_in; fade_out; blur_in; blur_out; box; box_out |
| Screen Navigation / Page Actions | mouse_to; mouse_move; move_by; mouse_arc; mouse_settings; scroll_into_view; scroll_to; scroll_by; click |
| Code Editor Component /Debugger Access | monaco; monaco_line; monaco_clear; monaco_click; exit; exit_for; console |
| Sidebar Organizer | organizer; topic; organizer_show; organizer_hide; organizer_next |
| Video Recording | start_recording; stop_recording |
| Asset Generation | encode |
| Browser Page Access | url; portal |
| Remote Terminal Access | terminal_init; terminal |
| Timeout/Wait | timeout; wait_for; break |
| Audio Play | speak, play (file or MP4 movie) |
| Text Display | type; send_key; send_meta; ssmc; blur; highlight; highlight_off; flash; notify; soft_return |
| Script Execution | script |
| User Authentication | login_for |

FIG. 7

| Name 1105 | Values (defaults are underlined) 1110 | Notes 1115 |
|---|---|---|
| Cursor Color | rgba (255,255,0,0.5) | RGB Alpha vector |
| Cursor Diameter | 30px | |
| Mouse Persona | <pointer to library of mouse behaviours><br>Synthetic | Choices are: Mouse, Trackball, or Synthetic, or customer generated. Default is "Synthetic". |
| Language | en-US | ISO Language + Locale |
| Voice | Mathew | Amazon Neural Network Voice |
| Voice Engine | Amazon | |
| Mouse Clicks | <pointer to library of sound choices> | If omitted, no sounds played. |
| Mouse Destination Offset | [x, y]<br>[32,32] | For some user interfaces, it is required to offset the cursor by a number of pixels in order to properly see and point to the right elements. Defaults 0x0 pixels. |
| Mouse Trails Count | 0-100<br>30 | Number of mouse trails, to show a streaking effect when the mouse moves. Useful for eye tracking. When set to 0, disables the feature. |
| Mouse Trail Lifetime | 100 | Number of milliseconds a mouse trail takes to fade to completely opaque. |
| Mouse Acceleration Factor | 1.0 | Number between 0.1 and 2.0. 1.0 is the median. Sets the speed at which mouse movements happen. |
| Keyboard Sounds | <pointer to library of sound choices> | If omitted, no sounds played. |
| Keyboard Typematic Rate | 5 | Average characters per second when typing operations happen. |
| Highlight Color(s) | <array of rgba colors><br>rgba (255,255,0,0.5) | When more than one color is provided, they are rotated on each action. Useful for brand alignment. |
| Flash Colors | <array of rgba colors><br>rgba (255,255,0,0.5) | Provided as raw CSS |
| Subtitles | Boolean<br>true | If provided, subtitle file will be available to HLS-enabled players in the default language. |
| Subtitle Languages | <array if ISO language codes for translation engine> | For each language, a separate language translation file will be rendered. |
| Component Font | Default font used on <notify>, <organizer> and any on-screen components and overlays. | Default: Arial, Helvetica,Sans |
| Notify Title | Title of notification windows. | Usually the brand and/or product name in UI notifications. |
| Page Navigation Sound | Any .wav sound file<br>[none] | Informs viewer a page navigation event has begun. |
| Page Load Sound | Any .wav sound file<br>[none] | Informs viewer a page loaded event has occurred. |

FIG. 11

| Title | Github Joanna DG Trackball | | Language | en-US | | Voice | Joanna |

```
1    <spiel>
2      <timeout seconds="1800"/>
3      <!-- pid 91 -->
4      <url href="https://github.com/davegullo"/>
5      <break time="3000"/>
6      <login_for selector="a[href='/join?source=header']"/>
7      <blur selector="div[itemtype='http://schema.org/Person'],div.pin" px="10"/>
8      <blur selector="div.js-yearly-contributions" px="20"/>
9      <fade_in/>
10     <break time="1000"/>
11     <mouse_settings persona="DG Trackball"/>
12     <mouse_move x="1" y="1"/>
13     <start_recording/>
14     <play volume="20" file="long-gong4.wav" async="true"/>
15     <notify title=" ">  XYZ  , Inc. ©2020</notify>
16     <mouse_arc x="800" y="500"/>
17     <break time="200"/>
18     <mouse_arc x="910" y="520"/>
19     <p>
20       <speak xml:lang="en-US">>
21         Let's take a tour
22         <mark name="quick_swirl 1 0"/>
23         of some of the frequently
24         <mark name="flash nav.UnderlineNav-body * 80"/>
25         <mark name="mouse_arc 1120 330"/>
```

XYZ, Inc.© 2020

● Let's take a tour   ● of some of the frequently   ● used features   ● We will begin with quick_swirl 1 0"

flash * 80"

flash 1120 330"

mouse_to abc

```
1  <spiel>
2    <timeout seconds="1800"/>
3    <!-- pid 91 -->
4    <url href="https://github.com/davegullo"/>
5    <break time="3000"/>
6    <login_for selector="a[href='/join?source=header']"/>
7    <blur selector="div[itemtype='http://schema.org/Person'],div.pin" px="10"/>
8    <blur selector="div.js-yearly-contributions" px="20"/>
9    <fade_in/>
10   <break time="1000"/>
11   <mouse_settings persona="DG Trackball"/>
12   <mouse_move x="1" y="1"/>
13   <start_recording/>
14   <play volume="20" file="long-gong4.wav" async="true"/>
15   <notify title=" "> XYZ , Inc. ©2020</notify>
16   <mouse_arc x="800" y="500"/>
17   <break time="200"/>
18   mouse_arc, attribute 'yz': the attribute 'yz' is not allowed.
19   mouse_arc, attribute 'y': attribute 'y' is required but missing.
20   <p>
21     <speak xml:lang="en-US">>
22       Let's take a tour —— 1352
23       <mark name="quick_swirl 1 0"/>
24       of some of the frequently —— 1353
         <mark name="flash nav.UnderlineNav-body * 80"/>
         <mark name="mouse_arc 1120 330"/>
```

Title: Github Joanna DG Trackball  Language: en-US  Voice: Joanna

XYZ, Inc.© 2020    1360

1370  ● Let's take a tour  ● of some of the frequently  ● used features  ● We will begin with

1390 quick_swirl 1 0"

flash * 80"

flash 1120 330"

mouse_to abc

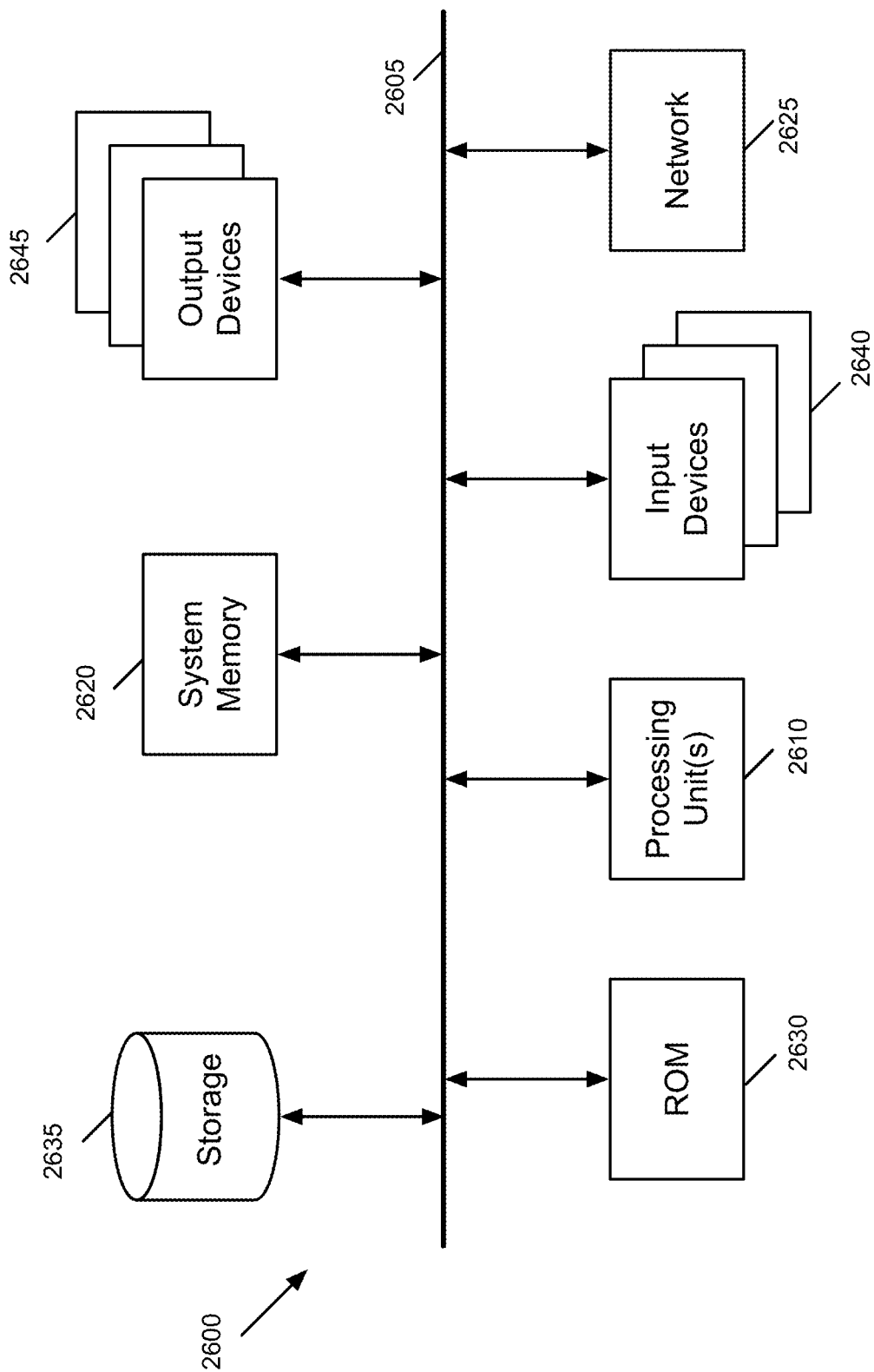

AUTOMATIC GENERATION OF VIDEOS FOR DIGITAL PRODUCTS USING INSTRUCTIONS OF A MARKUP DOCUMENT ON WEB BASED DOCUMENTS

CLAIM OF BENEFIT TO PRIOR APPLICATIONS

This application claims the benefit of U.S. Provisional Patent Application Ser. No. 63/009,448, filed on Apr. 13, 2020. The contents of U.S. Provisional Patent Application 63/009,448 are hereby incorporated by reference.

BACKGROUND

Training and demonstration videos of digital products are subject to visual and functional drift as the digital products change over time. Manually updating the videos for digital products that are subject to frequent changes is time consuming and expensive. That is why there are not enough video training and demonstration media supporting complex products.

BRIEF DESCRIPTION OF THE DRAWINGS

The various embodiments of the automatic generation of videos for digital products now will be discussed in detail with an emphasis on highlighting the advantageous features. These embodiments depict the novel and non-obvious automatic generation of videos for digital products shown in the accompanying drawings, which are for illustrative purposes only. These drawings include the following figures, in which like numerals indicate like parts:

FIG. 5 is a schematic front view of a portion of the display of a computing device displaying an instruction document that is in a multi column table format, according to various aspects of the present disclosure;

FIG. 7 illustrates examples of the constructs of the domain-specific instructional language used to generate a video file, according to various aspects of the present disclosure;

FIG. 11 illustrates examples of the persona settings, according to various aspects of the present disclosure;

FIG. 13 is a schematic front view of a portion of the display of a computing device displaying the code editor user interface identifying a line number in the instruction markup document that has not been successfully completed, according to various aspects of the present disclosure;

FIG. 14 is a schematic front view showing the user interface of FIG. 13 after a detailed error message is shown for the construct that has not been successfully completed, according to various aspects of the present disclosure;

FIG. 26 is a functional block diagram illustrating an example electronic system, according to various aspects of the present disclosure.

DETAILED DESCRIPTION

Figure 1A:
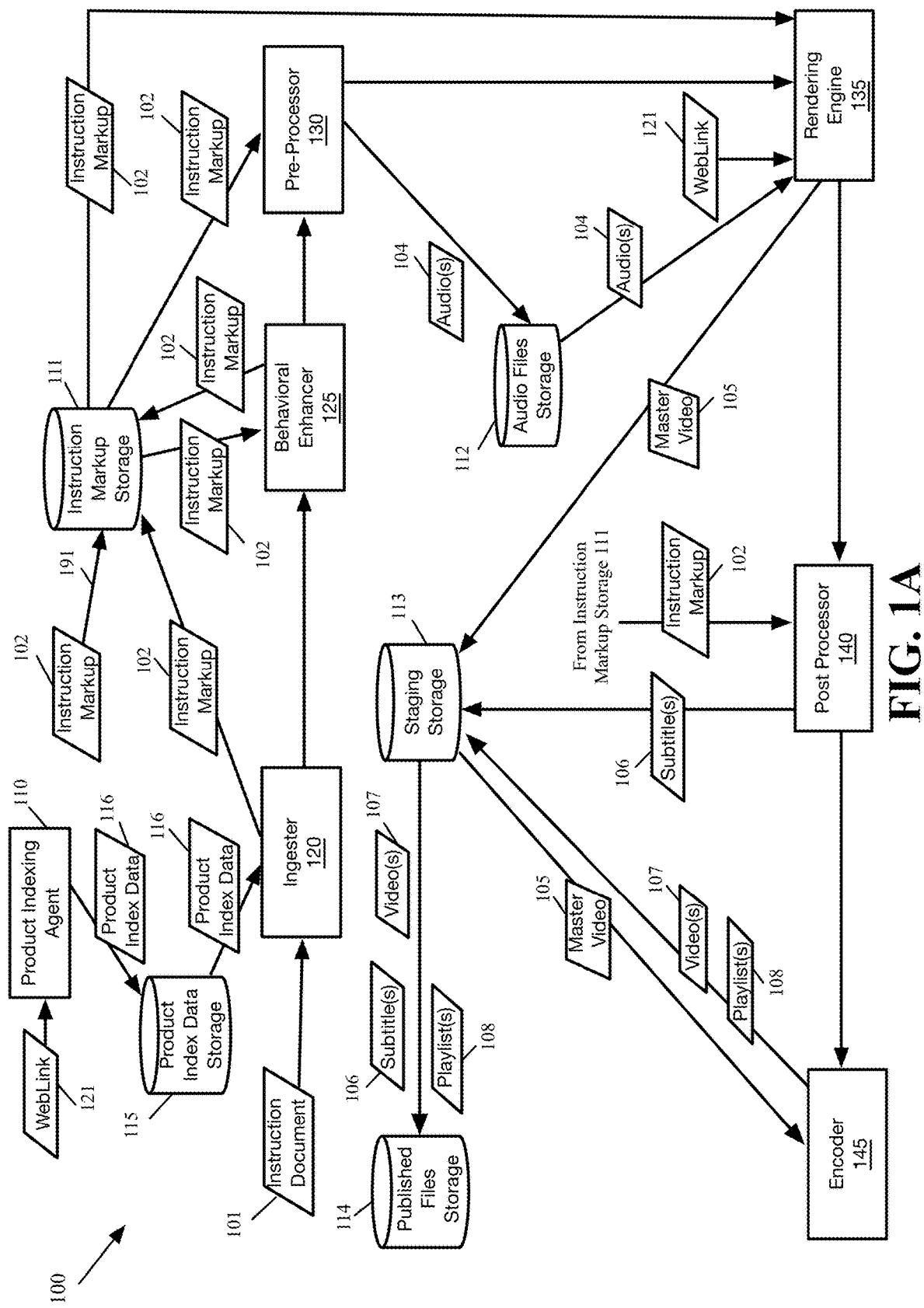
FIG. 1A is a functional block diagram illustrating an example system for generating videos, according to various aspects of the present disclosure.

One aspect of the present embodiments includes the realization that training and demonstration videos of digital products are subject to frequent updates as the digital products change over time. Using the traditional means, a person needs to repeatedly update the videos to reflect the changes in the digital product. These manually performed changes are time consuming, often resource constrained, and prone to errors. Because of these conditions, many companies simply do not embark on video production by traditional means.

The present embodiments, as described in detail below, solve the above-mentioned problems by providing a system that uses a domain-specific instructional language (referred to herein as spiel) and a video rendering engine that produces video, over and over again, against a digital product which changes and evolves over time. The video rendering engine uses the instructions in a document written in the domain-specific instructional language of the present embodiments to generate a video while navigating a web-based document representing the digital product for which the video is generated.

The video rendering engine navigates the given web-based document, coupled with the domain-specific instructional language document, which explains the operations to be performed on the web-based document. Lexical analysis is performed on the domain-specific instructional language document with respect to the web-based document, and actions and behaviors are inferred which drive the experience in the video.

Another aspect of the present embodiments includes the realization that many special effects such as blurring the personally identifiable information (PII), highlighting inlays and sub-components of the user interface (UI) while preserving textual composition, page-to-page transitions, and overlays which are context-sensitive to the page state are not obtainable in video editing programs that are currently provided in the prior art. These special effects must be "built up" or simulated with a series of other techniques, which are extremely brittle to any change of the underlying user interface.

The present embodiments, as described in detail below, solve the above-mentioned problem by embedding these special effects in the video in real-time as opposed to overlaying the special effects in the video editing program in post-production. The domain-specific instructional language and the video rendering engine of the present embodiments incorporate the special effects that manipulate the underlying product in real-time and change the state of the actual product into a video that is being automatically produced.

Another aspect of the present embodiments includes the realization that the traditional means of video production require human effort to line up and create subtitles. The application of subtitles in prior art requires, at a minimum, interaction with a video editing program to provide a synchronization of every textual block to each utterance in the audio track.

The present embodiments, as described in detail below, solve the above-mentioned problem by including the text to be spoken in the domain-specific instructional language document that is used to generate the video. The same text is also used to generate audio. The rendering engine, therefore, already has a timecode and the set of text which is being spoken as the video is generated. As opposed to the traditional means of video production that require human effort to line up and create subtitles, the present embodiments generate the subtitles by design.

Another aspect of the present embodiments includes the realization that the digital products can and do change over time. Human effort is needed to be aware of these changes. For example, a navigational menu item that is referenced in a spoken script may no longer exist. It takes human intelligence in prior art to know and understand the changes between the historical transcript of the video, versus the actual state of the digital product at the time of production.

Additionally, as a project evolves, it requires splicing in small differences within the sequence. For example, there may be a new step in-between other steps. In the traditional means, either the entire video must be re-generated, or the snippet itself must be regenerated, which creates some unique challenges: (i) the audio talent must be available, and sound exactly the same as the original date of production, (ii) the UI must be identical to the exact date of production and no new UI elements, skins, look-and-feel, etc., may be included, and (iii) the inserted snippet needs to flow identically to the rest of the video in terms of pace and logical content. Because of the challenges of normalizing all of these factors, the most common approach in the past is to redo the entire video. This effort requires one or more roles to be involved in the production (e.g., subject-matter expert, audio talent, audio engineer, video producer), costing substantial resources to a company.

The present embodiments, as described in detail below, solve the above-mentioned problem by providing formalized change management by design. The domain-specific instructional language document references aspects and elements of the page that is being navigated and creates explicit references to all critical components. When there is a derivation of these references, dead-end links, missing items, etc., errors are raised by design for disambiguation and enhancement. The errors are captured into a workflow that guides the video author to reconcile and produce with far less human intervention, and in a manner, which creates "consistency by design."

With this method, changes are seamlessly spliced into existing videos, because they are handled in an instructional document which is converted to speech at render time, and the product is captured in its entirety on each rendering. Additionally, the document workflow allows any person on a team to append content to the instructional document, lowering the barrier and resources required to produce the entire video.

The remaining detailed description describes the present embodiments with reference to the drawings. In the drawings, reference numbers label elements of the present embodiments. These reference numbers are reproduced below in connection with the discussion of the corresponding drawing features.

Some of the present embodiments provide a system that uses a domain-specific instructional language and a video rendering engine for generating videos while navigating a digital document, such as a web-based document. FIG. 1A is a functional block diagram illustrating an example system 100 for generating videos, according to various aspects of the present disclosure. The pipeline of the video generation system 100 may include a product indexing agent 110, an ingester 120, a behavioral enhancer 125, a pre-processor 130, a rendering engine 135, a post processor 140, and an encoder 145.

With reference to FIG. 1A, each component of the pipeline is connected to the next component in the pipeline with an arrow to visualize the sequence that the components are performed. However, each component of the pipe may be activated by different methods. For example, and without limitations, a component may be activated by the previous component of the pipeline, by an application programming interface (API) call from an integrated development environment (IDE) of the system 100, by a webhook mechanism through the GitHub, by a direct application programming interface call (API), etc. GitHub is a repository service that provides hosting for software development version control using the distributed version-control system, Git.

The following paragraphs provide a summary of different components of the system 100. Additional details of each component is provided further below with reference to FIGS. 2A-2H.

With further reference to FIG. 1A, the ingester 120 may include a lexical analyzer (not shown). The ingester 120 may receive an instruction document 101 and may convert the instruction document 101 into an instruction markup document 102. The ingester 120 may write the instruction markup document 102 in the domain-specific instructional language of the present embodiments, referred to as spiel.

The product indexing agent 110 may receive a weblink 121 to a web document representing the digital product for which one or more videos are to be generated. The product indexing agent 110 may be a web-crawler that may visit all web pages in the digital product and may generate a textual index of all elements within all web pages in the digital product. The product indexing agent 110 may store the textual index, referred to as the product index data 116, in a product index data storage 115.

The product indexing agent 110 may be periodically activated to detect any changes in the digital product's data and may update the product index data storage 115. The ingester 120 may receive the product index data 116 from the product index data storage 115 and may narrow and qualify the input data from the instruction document 101 in order to generate the instruction markup document 102.

The instruction markup document 102 may include instructions for generating a video from a digital document, such as a web-based document, while the web-based document is being accessed by a browser. The term web-based document (web document or webpages) is used herein to refer to a document that may be accessed and manipulated by a web browser. The web-based document may be written in a language such as, for example, and without limitations, Hypertext Markup Language (HTML), Cascading Style Sheets (CSS), JavaScript, etc. The web-based document may be accessed by a link (or pointer) such as a uniform resource locator (URL) and may be accessible through the Internet, intranet, the local storage of a computing device (whether or not connected to a network), etc.

The instruction document 101 may be in a common format. The instruction document 101 may be, for example, and without limitations, a Microsoft® Word document (e.g., with a .doc or .docx extension), an extensible markup language (XML) document, a Darwin Information Typing Architecture (DITA) document, a markdown document, an unformatted text document, a Rich Text Format (RTF) document, an AsciiDoc document, a DocBook document, etc.

The domain specific instructional language (or spiel), in which the instruction markup document 102 is written, may derive the actions of a web browser on a computing device such as, for example, and without limitations, a server, a desktop, a laptop, a mobile device, an emulated terminal or remote session to any of these computing devices, etc. The domain specific instructional language may include constructs for performing human simulated behaviors such as mouse or trackballs clicks and movements, gestures, URL navigation, speech, typing words, etc.

Similar to the XML language, the spiel may include constructs such as tags, elements, and attributes. A tag may be a construct that begins with the character <and ends with the character>. A tag may be one of the followings: a start tag, such as <notify>, an end tag, such as </notify>, or an empty tag, such as <fade_in/>. An element is a component that either begins with a start tag and ends with a matching end tag, or is an empty tag. An element may include other child elements. An attribute is a construct that includes a name-value pair that exists within a start tag or within an empty tag. A tag may include an action, such as 'click' and a target of the action (also referred to as a token), such as 'save.' Spoken and visual elements may come in language-specific variants, which are differentiated by the xml:lang attribute, for example:

For visual elements:
<notify xml:lang="en-US">Welcome!</notify>
For spoken elements:
<p>
    <speak xml:lang="en-US">I like your hat.</speak>
    <speak xml:lang="es-MX">Me gusta tu sombrero.</speak>
</p>

The p (or paragraph) tag may be used to contain the variants of the same equivocal block, which may differ by the language specified in their corresponding language parameters (xml:lang). In the above example, the blocks "I like your hat" and "Me gusta to sombrero" have the same meaning in two different languages and are included in within the same p tag. During video production, a language parameter may be provided for the video that is currently being produced, and only the words in the speak tags that have a matching language parameter may be played on the screen.

The instruction markup document 102 may instruct a speech synthesis markup language (SSML) speech synthesizer (also referred herein as speech synthesis engine) on what audio files to generate. The instruction markup document 102 may coordinate the actions within SSML calls to perform all of the above activities, synchronized by the words.

The ingester 120 may store the instruction markup document 102, for example, in the instruction markup storage

111. In addition, a user of the system 100 may generate an instruction markup document 102 (e.g., by using a document editor) and may send the document to the system 100. The instruction markup documents 102 received from the user may also be stored (as shown by 191) in the instruction markup storage 111.

With continued reference to FIG. 1A, the contents of the instruction document 101, in some instances, may be such that the lexical analyzer of the ingester 120 may not be able to convert every block of text in the instruction document 101 into an instruction markup language construct in the instruction markup document 102. In addition, an instruction markup document 102 generated by a user may also include blocks of plain text that are not included in any instruction markup language constructs.

Some embodiments may include a behavioral enhancer 125 that may use heuristics and/or artificial intelligence (AI) to identify actions within the plain text portions of the instruction markup document 102 that are not within the markup document constructs. The behavioral enhancer 125 may create additional constructs based on these plain text portions to further enhance the instruction markup document 102. The behavioral enhancer 125 may store the enhanced instruction markup document 102, for example, in the instruction markup storage 111.

With further reference to FIG. 1A, the pre-processor (or pre-renderer) 130 may use the instruction markup document 102 to generate one or more audio files 104. As described further below, the instruction markup document 102 may include constructs that identify spoken words. The pre-processor 130 may use these constructs to generate the audio file(s) 104. The pre-processor 130 may store the audio file(s) 104, for example, in the audio files storage 112.

The rendering engine 135 may receive the weblink 121 to the web document representing the digital product for which a video file is to be generated. The rendering engine 135 may use the weblink 121, the instruction markup document 102, and the audio file(s) 104 to generate a master video file 105. For example, the rendering engine 135 may build a set of tasks that are sequenced together, run a desktop (or mobile) environment using the weblink 121, and record the screen of the desktop (or the mobile device) into the master video file 105.

The rendering engine 135 may store the master video file 105, for example, in the staging storage 113. The staging storage 113 may be used to store different files that are ready for review and prior to the files being published.

The post processor 140 may use the instruction markup document 102 and may generate one or more subtitle files 106 in one or more different languages. The post processor 140 may store the subtitle file(s) 106 in the staging storage 113.

The master video file 105, in some embodiments, may be a high quality video file that may be compressed by the encoder 145 to generate video files with different resolutions and/or with different transmission bandwidths (or bitrates). The video resolution refers to the number of distinct pixels that could be displayed on the display of a device in each dimension. The transmission bandwidth or bitrate refers to the number of kilobits of data transmitted (or streamed) per second.

In different embodiments, the encoder may encode videos in one or more different resolutions such as, for example, and without limitations, 640×360 and 842×480 for standard definition (SD), 1280×720, 1920×1080 for high definition (HD), 3840×2160 for 4K video, etc. The video transmission bitrates are typically proportional to the video resolutions.

The encoder 145 may generate one or more playlists 108. A playlist 108 may be a collection of a number of video files played together. A playlist 108 may also be a collection of different versions of a video (e.g., with different screen resolutions and/or bitrates). A playlist 108 may include a single video. The encoder 145 may store the video file(s) 107 and the playlist(s) 108 in the staging storage 113.

With further reference to FIG. 1A, the video file(s) 107, the playlist(s) 108, and the subtitle file(s) 106 that are stored in the staging storage 113 may be reviewed by a person (e.g., a client that is using the system 100 to generate videos), for example, by using a user interface of a computing device. The person may then send (e.g., through the user interface of the computing device) an approval to publish the video file(s) 107, the playlist(s) 108, and/or the subtitle file(s) 106. The video file(s) 107, the playlist(s) 108, and/or the subtitle file(s) 106 that are approved to be published may then be moved (or copied) from the staging storage 113 to the published files storage 114 and may be accessed, for example, by links through a network such as the Internet or an intranet.

Figure 1B:
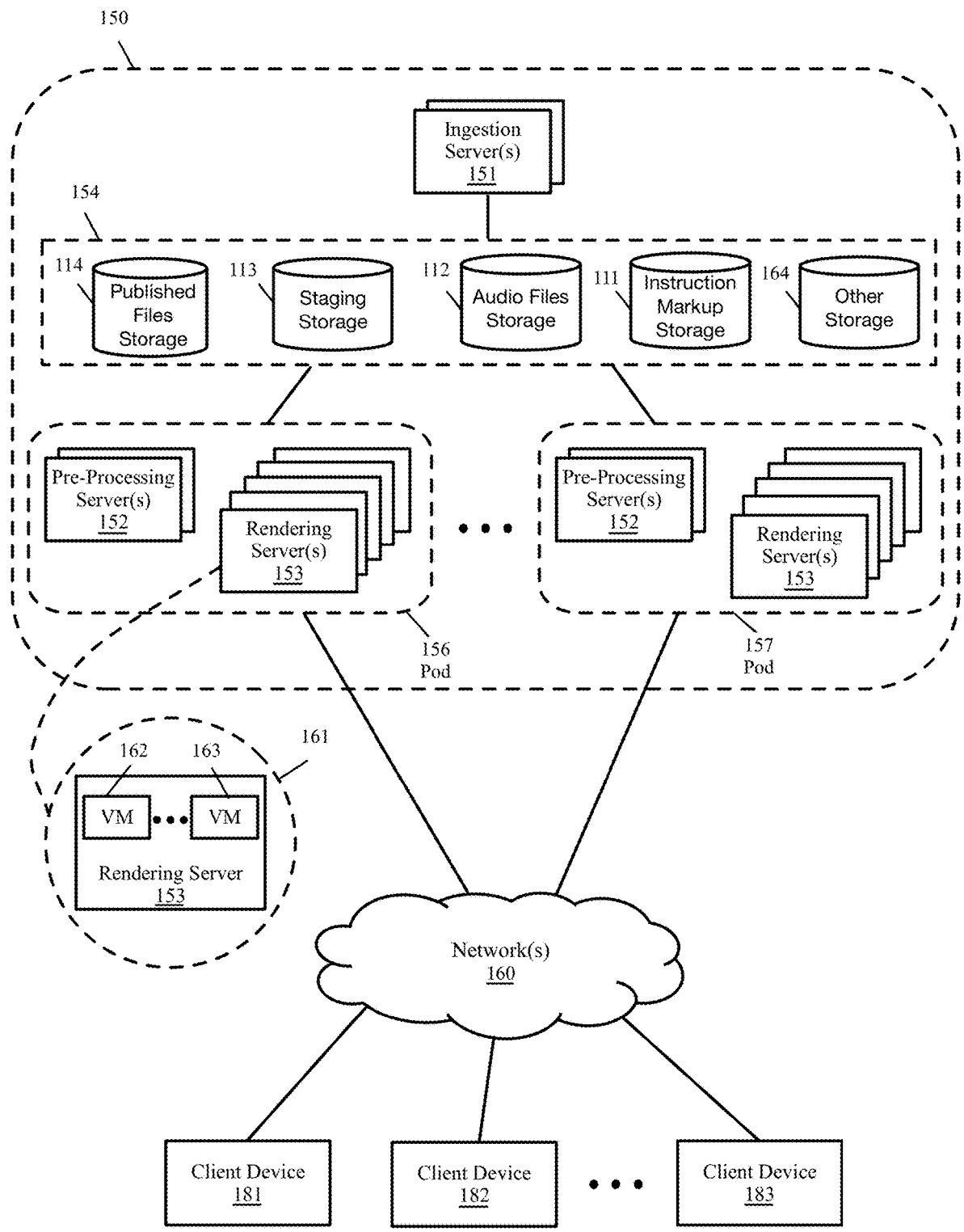
FIG. 1B is a functional block diagram illustrating an example hardware system for implementing the video generation system of FIG. 1A, according to various aspects of the present disclosure.

FIG. 1B is a functional block diagram illustrating an example hardware system 150 for implementing the video generation system 100 of FIG. 1A, according to various aspects of the present disclosure. With reference to FIG. 1B, the hardware system 150 may include one or more ingestion servers 151, one or more pre-processing servers 152, one or more rendering servers 153, and storage 154. The client devices 181-183 may be used by clients of the system 100 (FIG. 1A) to submit instruction documents 101 and weblinks 121 for the system 101 to generate videos 107, playlists 108, and subtitles 106 as described above with reference to FIG. 1A. The client devices 181-183 may also be used by clients to pre-view videos while the videos are being rendered by the rendering server(s) 153. The client devices 181-183 may also be used by clients to review and validate the videos 107, the playlists 108, and/or the subtitles 106 generated by the system 150.

With reference to FIG. 1B, the servers 151-153 may be any computing devices capable of implementing the video generation system of FIG. 1A. The ingestion server(s) 151 may implement the ingester 120 and the behavioral enhancer 125 of FIG. 1A. The ingestion server(s) 151 may receive instruction documents 101 as the client devices 181-183 submit instruction documents 101 for ingestion. The load on the ingestion server(s) 151, in some embodiments, may be balanced by one of the ingestion server(s) 151 or by a separate load balancer (not shown).

The client devices may be used by the clients (or users) of the system 100 of FIG. 1A and the hardware system 150 of FIG. 1B. The term client or user is referred herein to an entity such as, for example, and without limitations, a company, a government entity, an educational institution, a research institution, an individual person etc., who may wish to use the system 100 of FIG. 1A and the hardware system 150 of FIG. 1B to generate videos for digital products.

The client devices 181-183 may include desktop computers, laptop computers, tablet computers, smart phones, cellular telephones, personal digital assistant (PDA) devices, or other types of computing and/or communication devices. The client devices 181-183 may communicate with the system 150 through one or more networks 160. The network(s) 160 may include the Internet, telecommunication networks (e.g., public switched telephone network (PSTN), packet-switched network), and/or networks intranets, user's network (e.g., Wi-Fi, Ethernet), etc.

The pre-processing server(s) 152 and the rendering server(s) 153 may be arranged in one or more pods 156-157. Each pod 156-157 may be designated to one or more clients. A transactional message queue (or job queue), in some embodiments, may deliver work to the rendering server(s) 153 and/or the pre-processing server(s) 152 to avoid duplication of efforts. A pre-processing server 152 may implement that pre-processor 130 of FIG. 1A. A rendering server 153 may implement the rendering engine 135, the post processor 140, and/or the encoder 145 of FIG. 1A. Since pre-processing of instruction markup documents may be much less time consuming than the rendering, post processing, and encoding, some embodiments may assign more servers as the rendering servers 153 than the pre-processing servers 152. The load on the rendering server(s) 153 and/or the pre-processing server(s) 152, in some embodiments, may be balanced by one of the server(s) 152-153 or by a separate load balancer (not shown).

The pod assignment to clients, in some embodiments, may be done at an administrative level, and may be re-balanced as the clients' needs grow. For example, a client may be assigned a shared pod, and may be moved to a dedicated pod as the client's needs grow. In some of the present embodiments, the clients may not be aware of the pods, nor may be able to specify which pod to do their work at any given time.

The rendering server(s) 153, in some embodiments, may implement one or more virtual machines (VMs) 162-163 as shown by the exploded view 161 of a rendering server 153. The virtual machines 162-163 may be used to emulate a desktop environment and/or a mobile environment in order for a browser controlled by a rendering server 153 to navigate an emulated display screen of a computing device such as a desktop, a laptop, a smartphone, a tablet computer, etc., in order to record a video from the emulated display screen when the browser is using the instructions in an instruction markup document (or the spiel markup document) to navigate a digital product (e.g., a web-document pointed by the weblink 121 of FIG. 1A).

In other embodiments, in addition to, or in lieu of the virtual machines 162-163, the rendering server(s) 153 may emulate containers (not shown) and/or may include physical display screens (not shown). As described below with reference to FIG. 2E, the instruction markup document 102 may include instructions to start a remote terminal session. The virtual machines 162-163 and/or the containers (not shown), in some embodiments, may be used to implement a remote terminal, for example, based on the instructions received from a client. In some embodiments, the remote terminal may be a remote computing device controlled by a client that may be accessed by a rendering server 153 through the network(s) 160.

A virtual machine may be a software-implemented computer that, like a physical computer, runs an operating system. Multiple virtual machines may operate concurrently on the same host machine (e.g., a server 151-153 of FIG. 1B). Each virtual machine may run its own guest operating system. The containers, on the other hand, are self-contained execution environments that share the kernel of the host machine's operating system.

With further reference to FIG. 1B, the system 150 may include storage 154. The storage 154 may include one or more storage devices 111-114 and 164. Some of the of the storage devices 111-114 and 164 may be local storages for the servers 151-153 in order to provide fast access to data during ingestion, pre-processing, rendering, post processing, and/or encoding processes.

Figure 2A:
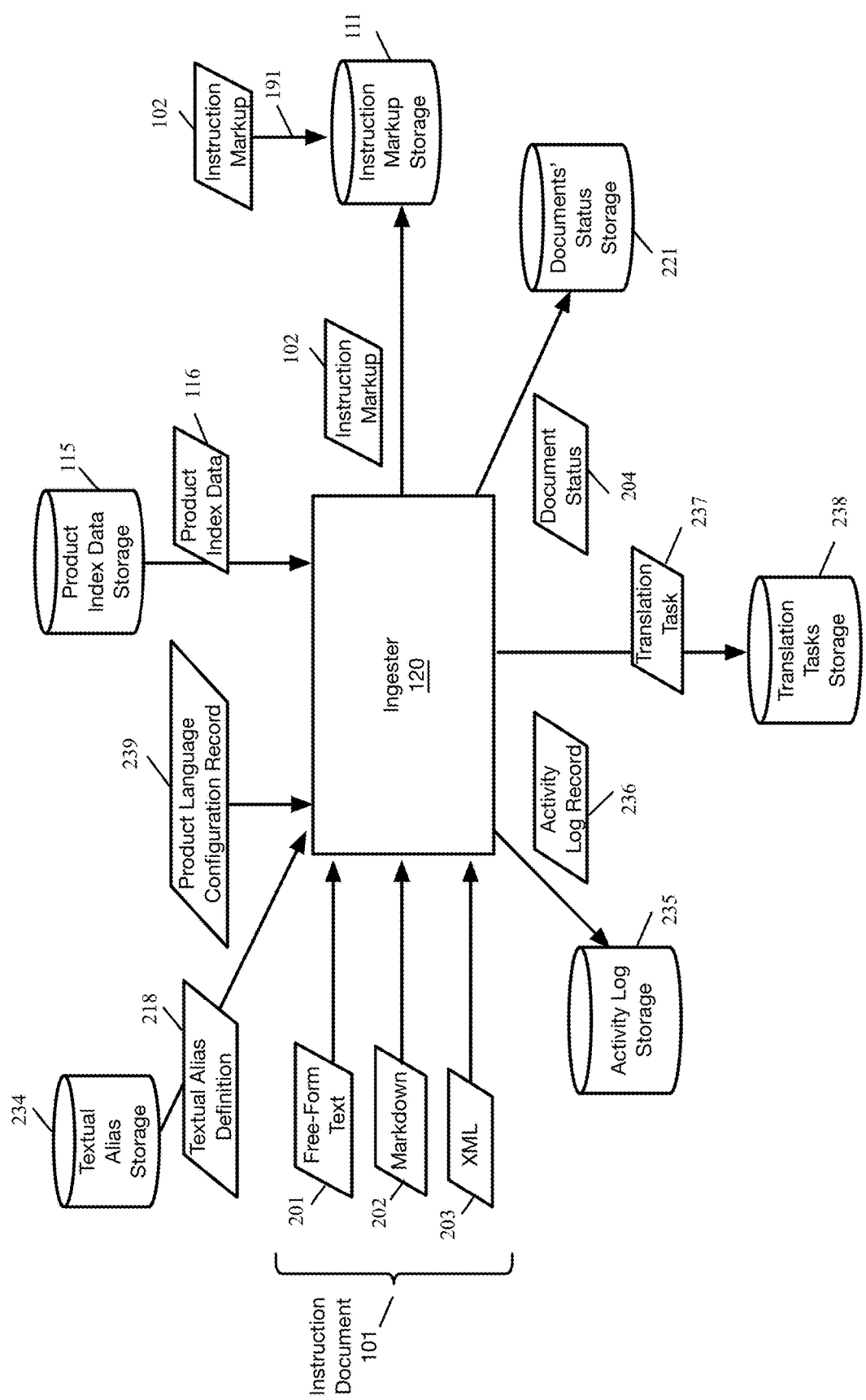
FIG. 2A is a functional block diagram illustrating an example embodiment of the ingester of FIG. 1A, according to various aspects of the present disclosure.

FIG. 2A is a functional block diagram illustrating an example embodiment of the ingester of FIG. 1A, according to various aspects of the present disclosure. With reference to FIG. 2A, the ingester 120 may receive an instruction document 201, 202, or 203. The instruction document (e.g., the instruction document 101 of FIG. 1A) may be a document 201 that includes free-form text, a markdown document 202, an XML document 203, etc. The instruction documents 201, 202, or 203 may be user-defined. The user may upload the document into the system 100, for example, and without limitations, from a user interface such as the user interface 2400 described below with reference to FIG. 24.

The ingester 120 may parse the instruction documents 201, 202, or 203 into the instruction markup document 102, which may be a domain-specific instruction markup document that is interchangeably referred to herein as the spiel markup document or the spiel markup XML. Examples of a spiel markup document's constructs are provided below with reference to FIG. 7.

Figure 2B:
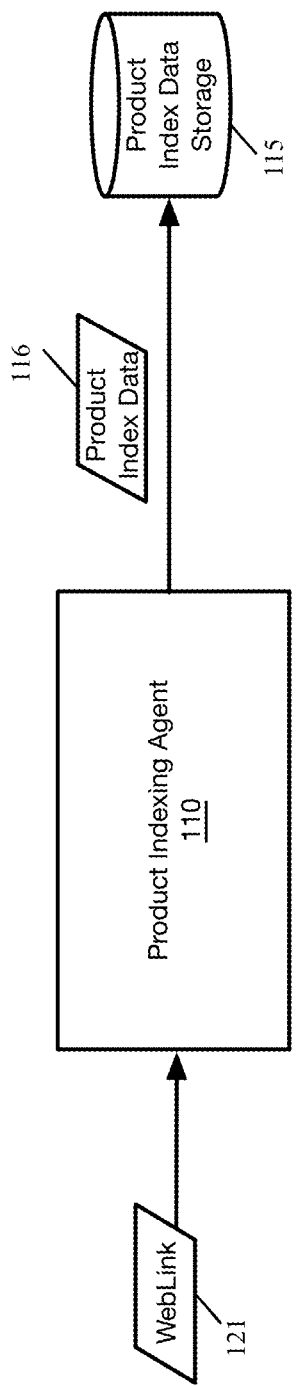
FIG. 2B is a functional block diagram illustrating an example embodiment of the product indexing agent of FIG. 1A, according to various aspects of the present disclosure.

The ingester 120 may receive the product index data 116 from the product index data storage 115 and may narrow and qualify the input data from the instruction document 101 in order to generate the instruction markup document 102. FIG. 2B is a functional block diagram illustrating an example embodiment of the product indexing agent 110 of FIG. 1A, according to various aspects of the present disclosure.

With reference to FIG. 2B, when a new digital product is added to a desktop or mobile environment, the product indexing agent 110 may be launched to create a textual index 116 of all elements within all web pages in the digital product, their HTML element context, and the page on which the elements were found.

The product indexing agent 110 may be a software agent (e.g., an automated bot) that may receive a weblink 121 to a digital product and may visit all reachable pages/views within the digital product, and may store the product index data 116 in the product index data storage 115.

The product indexing agent 110 may be activated periodically to detect any changes (e.g., new elements, modified elements, deleted elements) in the digital product and may update the product index data storage 115 accordingly. This web-crawling job by the product indexing agent 110 may perform a quality-assessment of a new digital product. For example, the product indexing agent 110 may look for unworkable scenarios in the digital product, such as, cross-origin iframes (where the browser restricts cross-origin access to an inline frame), lack of information in CSS classes and/or identification-selectors or other potentially unique HTML attributes. The aggregate summary of the collected data set may be scored (e.g., from 0 to 100) and may be used to judge the product "site-wide" based on all reachable pages or views, and by factoring the intersection of tokens found in both the digital product and within the corpus of the instruction documents which are related to the digital product. The product index data 116 may then be used by the ingester 120 in order to narrow and qualify the input data from documents. Tokenized strings from product index data 116 may then be joined to tokens from the instruction documents. Further details of the product indexing agent is described below with reference to FIG. 6.

Referring back to FIG. 2A, the free-form text document 201 may be, for example, and without limitations, a Microsoft® Word document, an unformatted text document, an RTF document, etc. The free-form text document 201 may include annotated elements. When the ingester 120 encounters an annotated element in the instruction document, the ingester 120 may apply a mapping action. The mapping action may constitute the most popular activity that the system performs, for example, mouse_to, click, flash, etc.

As an example, the free-form text document 201 may include italic text. In some embodiments, when the ingester 120 encounters italicized text in the free-form text instruction document 201, the ingester 120 may generate a construct for moving the mouse to the quick selector identified by the italicized text.

For example, the text "You should mouse to the save button" with the word save italicized may be converted by the ingester 120 into the following construct to copy into the instruction markup document 102:

```
<p>
    <speak xml:lang="en-US">
        You should mouse to the
        <mark name="mouse_to 'save'"/>
        save button.
    </speak>
</p>
```

In the above example, the <speak> body </speak> construct is a SSML compliant construct that may be used to indicate the content to be spoken. The <mark> tag (or mark element) is a SSML compliant mark construct. The <mark> tag is an empty element that places a marker into the text/tag sequence. The SSML mark tag has a required attribute, "name." The mark tag may be used to reference a specific location in the text/tag sequence, and may additionally be used to insert a marker into an output stream for asynchronous notification.

The free-form text document 201 may include underline text. In some embodiments, when the ingester 120 encounters underlined text in the free-form text instruction document 201, the ingester 120 may generate a construct for clicking the quick selector identified by the underlined text.

For example, the text "Click on the save button" with the word save underlined may be converted by the ingester 120 into the following construct to copy into the instruction markup document 102:

```
<p>
    <speak xml:lang="en-US">
        Click on the
        <mark name="click 'save'"/>
        save button.
    </speak>
</p>
```

The free-form text document 201 may include bold text. In some embodiments, when the ingester 120 encounters bold text in the free-form text instruction document 201, the ingester 120 may generate a flash on the element with the bold text.

For example, the text "Notice that your settings have been updated" with the word settings in bold may be converted by the ingester 120 into the following construct to copy into the instruction markup document 102:

```
<p>
    <speak xml:lang="en-US">
        Notice that your
        <mark name="flash 'settings'"/>
        settings have been updated.
    </speak>
</p>
```

In the above example, the flash construct may apply CSS visual transform flash effect on the word "settings." The flash effect may cause a sudden brief burst of bright light of the word "settings."

The free-form text document 201 may include a built-in heading style. In some embodiments, when the ingester 120 encounters a heading in the free-form text instruction document 201, the ingester 120 may identify the text that is affected by the heading style. The ingester 120 may generate a notify construct to copy into the instruction markup document 102. The notify construct, <notify/> text body <notify/>, shows a desktop-style notification (e.g., a popup) of anything typed within the notify construct's text body.

The free-form text document 201, in some embodiments, may be in a multi column table format. An example of free-form text document with a multi column table format is described below with reference to FIG. 5.

With further reference to FIG. 2A, the markdown document 202 may be written in markdown language, which is a lightweight markup language with plain-text formatting syntax. In some embodiments, the markdown constructs (e.g., markdown tags) may be available in any text context, including Word, Google Docs, Apple Pages document paragraphs and plain text documents. For example, the instruction document 101 of FIG. 1A may be a file that includes both free-form text and markdown constructs.

In some embodiments, the markdown constructs may be in the form of <action> <selector> and may be delimited by the characters "[" and "]." The ingester 120 may parse the markdown constructs that are in the form of [<action> <selector>] into the equivocal constructs (or tags) associated with the instruction markup language (or spiel) of the present embodiments.

In some embodiments, the selector of a markdown construct may be defined as one of the following forms: (i) plain text, for example, 'save and close', (ii) XML Path Language (XPath), for example, xpath://a[@class='classname'], or (iii) CSS, for example, a.classname.

For normative purposes, markdown may use plain text match selectors almost exclusively, but may accept XPath or CSS selectors to disambiguate document elements when necessary. The mapping of a markdown tag may take the first space-delimited argument, and convert the first space-delimited argument in the following two ways. In the first way, which is for the root level tags (i.e., those tags directly under the root of the instruction markup document), the first argument becomes the tag name, and the remainder of the content becomes the selector or the most significant required attribute.

An example of a root-level markdown conversion is [url http://foobar.com], which may be converted into <url href="http://foobar.com"/> construct for the instruction markup document. Another example of a root-level markdown conversion is [click 'Save and Close'], which may be parsed by the ingester 120 into <click selector="'Save and Close'"/> construct for the instruction markup document. It should be noted that the preceding example includes single quotes nested in double quotes.

In the second way to map the markdown tags, which is for markdown tags within paragraph text, the tags may get ingested into the <speak> tags and therefore become SSML-compliant <mark/> tags. When processing a mark tag, a speech synthesizer may perform one or both of the followings. The speech synthesizer may inform the hosting environment with the value of the "name" attribute and with information that may allow retrieving the corresponding position in the rendered output. The speech synthesizer may issue an event that includes the "name" attribute of the tag when the audio output of the SSML document reaches the mark tag. The hosting environment may define the destination of the event.

An example of the translation is as follows. The document may include two buttons, save [mouse_to 'save'] and close [mouse_to 'close'], which may be parsed by the ingester 120 into the followings:

```
<p>
    <speak xml:lang="en-US">
        The document contains two buttons, save
        <mark name="mouse_to 'save' "/>
        and close.
        <mark name="mouse_to 'close' "/>
    </speak>
</p>
```

A content author (e.g., the author of a free-form text instruction document) may use the commenting feature of a text editor (such as, for example, and without limitation, Microsoft Word, Google Docs, Apple Pages, etc.) to embed tagging information which may not be seen in the final document. The contents of each tag may be any of the markdown commands of the present embodiments, which are derived from and match the tags that are defined under the root <spiel> tag of an instruction markup document. When text is selected in the document, an entered comment applies to the selected text, and the selected text may be used as a parameter to the markdown instruction (e.g., title, skip, slide).

Some examples of the markdown instructions include:
[start_video]
[title]
[skip]
[slide]
[stop_video]

An example of an instruction document that includes comments for generating markdown commands is described below with reference to FIG. 4.

Some embodiments may provide a browser extension to disambiguate the mapping of a digital product's user interface elements to the tokens in an instruction markup document 102 of FIG. 1A (and/or in the corresponding instruction document 101). The browser extension may be used to specify textual aliases for the digital product's user interface elements which do not contain enough information to automatically create a 1:1 unique element selector based on a textual token in the instruction document and/or in a marked up document. A textual alias is a token that typically resolves to either a CSS or XPath selector.

A person may proactively point the cursor in a web browser to an element in the user interface of the digital product, select the element (e.g., and without limitations, right-click on the element), and provide a textual alias for the element. The browser extension may then store the textual alias in a database. A person may also reactively remove disambiguates when an instruction document 101 is not completely rendered.

The ingester 120 may receive a textual alias definition document 218 from the textual alias storage 234. The textual alias definition document 218 provides aliases to disambiguate the mapping of the elements of a digital product's user interface and the tokens in an instruction document. Further details of disambiguating the mapping of the elements of a digital product's user interface to the tokens in an instruction document, and generating the textual alias definition document 218 are described below with reference to FIGS. 15 and 16.

With further reference to FIG. 2A, the DITA document 203 is an XML data model for authoring and publishing. Any images, video files, or other files that is to appear in the output may be inserted via reference. The DITA constructs are defined in the Organization for the Advancement of Structured Information Standards (OASIS) DITA specification. The DITA specification has key elements in all of the respective document type definition (DTD) schemas (typically identified with .dtd file extensions), which may be translated by the ingester 120 into the constructs for the instruction markup document. For textual content, and content within step, cmd, info tags, there are mixed blocks of text and xml.

When a <uicontrol> tag is encountered, the text body becomes a textual selector, and a lexical parsing may be performed to infer which action should be applied. This logic backtracks on each word in the sentence preceding the <uicontrol> until the beginning of the sentence, or the next <uicontrol> element. If no lexical action is found, the action may default to a mouse_to action. For example, consider the following DITA construct:

```
<step>
    <cmd>Click <uicontrol>Get Started</uicontrol> and then click <uicontrol>Create Playbook </uicontrol>.
    </cmd>
    <info>The <uicontrol>Get Started</uicontrol> option appears only when you are creating a playbook for the first time.
    </info>
</step>
```

The above DITA construct may be converted by the ingester 120 into the following construct for the instruction markup document 102:

```
<p>
    <speak xml:lang="en-US">
        Click
        <mark name="click 'Get Started'"/>
        get started and click
        <mark name="click 'Create Playbook'"/>
        create playbook.
    </speak>
</p>
<p>
    <speak xml:lang="en-US">
        The
        <mark name="mouse_to 'Get Started'"/>
        get started option appears only when you are creating a playbook for the first time.
    </speak>
</p>
```

The mapping of the words in the DITA document 203 into the instruction markup document may include the followings. The words click, select, or choose may be mapped into the click construct. The words enter, provide, type, for fill in may be mapped into the type construct. The words hover or mouse over may be mapped into the mouse_to construct. The click, type, and mouse_to constructs are described below with reference to FIG. 7.

The ingester 120 may store the instruction markup document 102, for example, in the instruction markup storage 111. In addition, a user of the system 100 may generate a markup language document (e.g., by using an editor) and may send the document to the system 100. The user-defined markup language document may be stored (as shown by the arrow 191) as a markup language document 102 in the instruction markup storage 111. The ingester 120 may update the document status 204 in the documents' status storage 221. Updating a document status throughout the system pipeline is described further below with reference to FIG. 2E.

With continued reference to FIG. 2A, the ingester 120, may generate activity logs and may store the activity logs in the activity log storage 235. When a change event occurs in the ingestor 120, an activity log record 236 may be created that may contain the document name, the change(s), the author, and date/time in which the change occurred. A change event may be detected, for example, when the last modified date of a document in the Hyper Text Transfer Protocol (HTTP) header changes. A change event may also be detected when a document is pushed into a version control software, such as GitHub, and a webhook or an API call is received from the GitHub when a new version of a document is retrieved from the GitHub. The activity log 235 may create an activity feed that shows all changes which have occurred, sorted in reverse chronologic order.

With further reference to FIG. 2A, the ingester 120 may receive a product language configuration record 219 that may describe zero or more additional output languages for the instruction document 101. When an instruction document 101 is ingested by the ingester 120, a product language configuration record 239 may describe zero or more additional output languages of the instruction document 101. For each additional language and for each block of text in the instruction document 101, a machine generated translation may be generated. For each additional language and for each block of text that is spoken, a machine generated audio translation may be generated.

A translation task 237 may then be generated for a translator (e.g., a person who is a native speakers of a foreign language) to "check out," verify the text translation, and listen to the machine generated audio translation of the given block of text. The translation task 237 may be stored in the translation task storage 238. Some embodiments may define a system level role for the translators, which provides a narrowed set of editing features. The translator may view the subset of the pending translation tasks that are assigned to the translator, and may navigate directly to the portions of the documents which have pending translation work. The translator may edit the translated blocks of text to make corrections. The audio for the spoken portions of the text are then automatically machine generated.

When a translator validates a block of text, the validated text may be saved and may be "checked in" in a revision control software, such as GitHub, as a revision of the document. The auto-assignment of the translation task occurs when a change event to the primary document language is detected by the ingester 120. All actions done by the translator may add notification into the user's activity feed a person with a system level "owner" role. A person with a system level role of project coordinator may also approve or reassign the task.

Figure 2C:
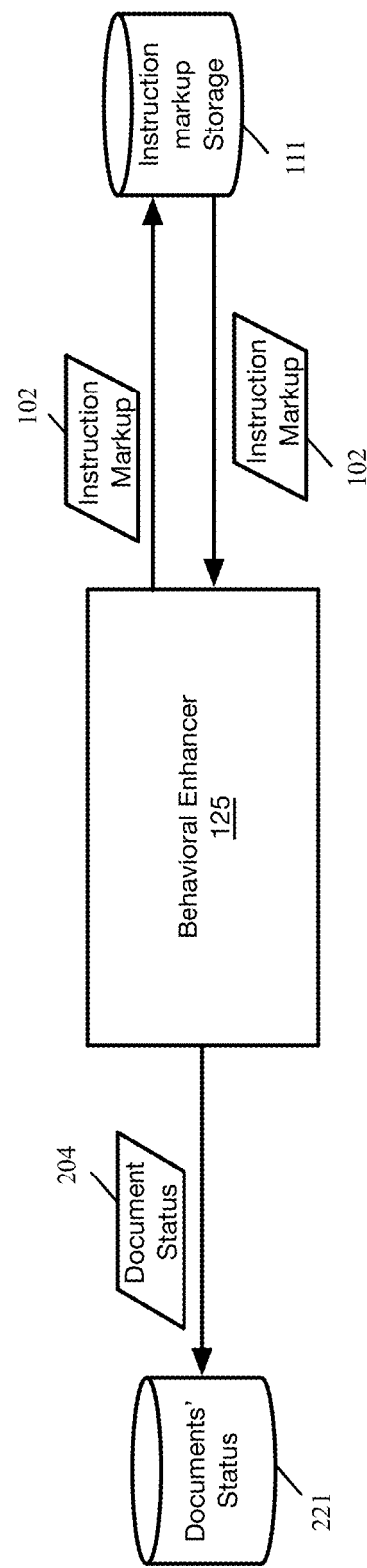
FIG. 2C is a functional block diagram illustrating an example embodiment of the behavioral enhancer of FIG. 1A, according to various aspects of the present disclosure.

The contents of the instruction documents 201, 202, or 203 in some instances, may be such that the lexical analyzer of the ingester 120 may not be able to convert every block of text in the instruction document 201, 202, or 203 into an instruction markup language construct in the instruction markup document 102. FIG. 2C is a functional block diagram illustrating an example embodiment of the behavioral enhancer 125 of FIG. 1A, according to various aspects of the present disclosure.

The behavioral enhancer 125 (also referred herein as the spieler) may scan the instruction markup document 102 and may search for blocks of plain text that are not included in instruction markup language constructs. In the discussions made herein, the blocks of plain text that are identified and enhanced by the behavioral enhancer 125 may be blocks of plain text that are not embedded within any markup constructs (other than the root markup construct that embeds the whole instruction markup document) by the ingester 120. In addition, the term "block of text that is not embedded within any instruction markup construct" refers to a block of text that is not embedded within any instruction markup construct other that the root construct.

The behavioral enhancer 125 may find actions within the plain text of the instruction markup document 102 (e.g., the blocks of text that are not with an instruction markup document's construct). As described above, the instruction document 101 may include annotations (e.g., underline, bold, italic, headings, etc.) provided by the document's author. The annotations may be used to generate constructs for the instruction markup document 102. When the explicit annotations are not present, the behavioral enhancer 125 may identify additional actions in the plain text, which were not indicated by the author.

The behavioral enhancer 125 may use heuristics and/or AI to identify the additional actions. For example, if the instruction document 101 includes the following plain text with no annotations: "Provide your email and password, and click save," the behavioral enhancer 125 may generate constructs to allow the rendering engine 135 to identify text called email, password on the webpage for which the video is generated, and provide sample data. The behavioral enhancer 125 may also generate constructs to allow the rendering engine 135 to "click" an identifier called "Save" on the webpage.

Some embodiments may not send an instruction markup document to the rendering engine 135 unit until all plain text blocks in the instruction markup document are embedded within the instruction markup constructs. In some of these embodiments, each plain text block, for which the behavioral enhancer 125 cannot identify additional actions, may be embedded within a speak construct, for example, <speak xml:lang="en-US"> plain text block </speak>.

The behavioral enhancer 125 may save the enhanced instruction markup document 102 into the instruction markup storage 111. The behavioral enhancer 125 may update the document status 204 in the documents' status storage 221.

Figure 2D:
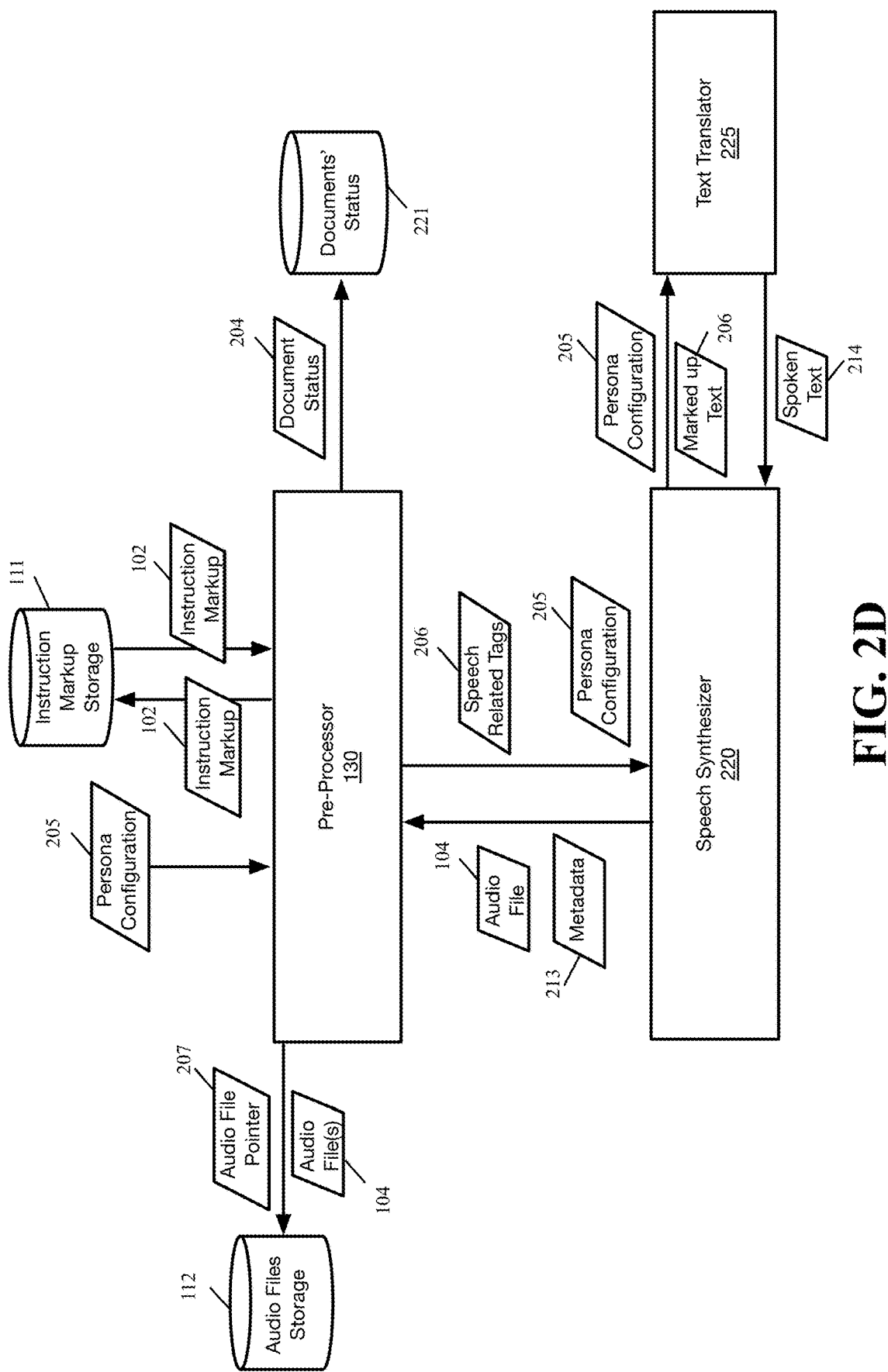
FIG. 2D is a functional block diagram illustrating an example embodiment of the pre-processor of FIG. 1A, according to various aspects of the present disclosure.

FIG. 2D is a functional block diagram illustrating an example embodiment of the pre-processor of FIG. 1A, according to various aspects of the present disclosure. With reference to FIG. 2D, the pre-processor (also referred to herein as the asseter) 130 may generate one or more audio files 104 prior to the generation of the master video file 105 (FIG. 1A) by the rendering engine 135.

The pre-processor 130, in some embodiments, may be activated when an instruction markup document 102 is saved by the behavioral enhancer 125. The pre-processor 130 may also be activated when the rendering engine 135 cannot find an audio file. For example, when a new pod 156-157 (FIG. 1B) is spun out, the rendering engine 135 (FIG. 1A) may not find the audio files required for rendering an instruction markup document in the local storage of the pod and may push the instruction markup document 102 to the pre-processor 130 to generate the audio files. The rendering engine 135, in some embodiments, may block the processing of an instruction markup document until the pre-processor 130 is done processing the instruction markup document.

With further reference to FIG. 2D, the pre-processor 130 may generate the physical audio assets 104 such as, for example, and without limitations, MP3 files and/or Waveform Audio File Format (WAV) files. In order to generate the audio file(s) 104, the pre-processor 130 may scan the instruction markup document 102 to identify speech related tags (e.g., and without limitations, <speak> tags).

The pre-processor 130 may pre-process the speak constructs and any files (e.g., any audio or video files) which are referred to in the <play> constructs in order to determine the files' durations. The pre-processor 130 may, for example, enhance a play tag, such as <play file="foo.mp4">, to include the file's duration: <play file="foo.mp4" duration="33.45"/>. The audio and video files that are referred to by the play tags may by video files and audio files that have to be played when the master video file 104 (FIG. 1A) is being recorded. The pre-processor 130 has to obtain duration attributes for these files in order for the rendering engine 135 to schedule playing and or displaying the files accurately within the visual timeline.

The pre-processor 130 may send the speech related tags 206 (with the associated text blocks) and the settings in the persona configuration 205 to the speech synthesizer 220 (also referred to herein as the SSML engine). The settings in the persona configuration 205 may include the identification of a spoken language, the type of audio files to be generated, the particular type of voice (e.g., and without limitations, one of the several types of male, female, and/or child voices with different tones and/or different accents) that may be synthesized by the speech synthesizer 220.

In some embodiments, the persona configuration 205 may include a language parameter (e.g., as shown in FIG. 11). The language parameter may identify the language and locale using an International Organization for Standardization (ISO) 3166 alpha-2 country code such as en-US (for U.S. English), en-GB (for British English), ES (Spain), DE (Germany), etc. The speech synthesizer 220 may use the appropriate voices for the given language.

When translation is required, for each textual element, such as <notify>, <type>, or <speak>, the block of text may be sent to the text translator 225. The text translator 225 may replace the starting language block (i.e., the language block in the instruction markup document 102) with the translated text. Within all constructs, except for <speak>, the entire construct's text content is sent as a block. Within <speak> tags, each sentence is sent independently to the speech engine for translation, and replaces the starting language.

The speech synthesizer 220 may receive the translated text 214 from the text translator 225 and may generate an audio file 104. In some embodiments, when the language of the text in the instruction markup document 102 is already in the language identified by the language parameter, the speech synthesizer 220 may not send the text to the text translator 225 for translation.

The speech synthesizer 220 may send the audio files 104 and the associated metadata 213 to the pre-processor 130. The metadata 213 may provide information for the start and/or the duration of each sentence, the start and/or the duration of groups of sentences etc.

The pre-processor 130 may use the metadata 213 to modify and further enhance the information in the speech related tags of the instruction markup document 102, for example, to add the start and/or the duration of each sentence or each group of sentences. For example, the duration of the speech for a sentence may be expressed in a tag such as duration="value," where the value may be a numerical value expressing the duration in precision of hundredths of a second. The rendering engine 135 (FIG. 1A) may consume the instruction markup document, which is enhanced by the pre-processor 130, and may determine when to fire the given events that happen concurrently with speech related tags (e.g., the <speak> tags).

In some of the present embodiments, the instruction markup document 102 may include SSML tags, which may be sent to the speech synthesizer 220. The followings are examples of the parameters sent from the pre-processor 130 to the speech synthesizer 220 in some embodiments. The pre-processor 130 may send an entire speak tag to the speech synthesizer 220. The speak tag may also be used in the rendering engine 135 in order to play the audio file generated by the speech synthesizer 220.

The pre-processor 130 may send fragments to the speech synthesizer 220 for every SSML <mark/> tag in order to obtain the fractional duration of the chunk of spoken text. The audio may not be played by the rendering engine 135, but may be required for determining the timing (also referred to as the offset duration) in precision of hundredths of a second. This enables the triggering of actions in the rendering engine 135 which may be happening at the same time the speaking (generated from the entire speak tag as described above) is being played.

As an example, if the speak tag is <speak xmilang="en-US" duration="15.17"> and the mark tag is <mark duration="11.23">, a duration="15.17" parameter may be added to the instruction markup document 102 for both the <speak xml:lang="en-US" duration="15.17"> and the <mark duration="11.23"> tags. It should be noted that the duration in mark tags add up to less than the full duration of the speak, since there is never a <mark> at the very end (as the <mark> at the end is redundant).

The following example shows how a <speak> construct is modified after partial chunks are sent to the speech synthesizer 220. These chunks may be split on each <mark> tag, and on every sentence ending with a period, question mark, or exclamation point. The duration of these chunks may be appended to the explicit mark tag, or implicit mark tags which were inserted for end-of-sentence punctuation. The <speak> construct before sending the partial chunks may be as follows:

```
<p>
    <speak xml:lang="en-US">
        The universe is composed of many galaxies.
        There is no telling how many there are.
        <mark name="mouse_to #galaxy"/>
        The Hubble telescope is searching for new galaxies.
    </speak>
</p>
```

The <speak> construct may be modified as follows, after the chunks are sent to the speech synthesizer 220:

```
<p>
    <speak xml:lang="en-US" duration="22.04"
    thumb="/path/to/file/feedface.png">
        The universe is composed of many galaxies.
        <mark duration="5.04/>
        There is no telling how many there are.
        <mark duration="14.34"/>
        <mark name="mouse_to #galaxy" duration="14.34"/>
        The Hubble telescope is searching for new galaxies.
    </speak>
</p>
```

It should be noted that a trailing <mark> tag at the end of the speak block is not necessary, because the total duration is known in the speak tag. The durations on the sentence-level mark tags may be used by the post processor for generating subtitles, such that each sentence may be appended to a Web Video Text Tracks (WebVTT) file at the appropriate timecode. For each <play/> tag, which may play audio, or an embedded movie file, the <mark> tags may be probed for their duration, and a duration="value" tag may be appended to the play tag. For example:

<play src="ding.wav" duration="1.03"/>.

Once the processing has completed, the augmented instruction markup document 102 (e.g., after any possible duration is added) may be written to a cache directory in the instruction markup storage 111. The rendering engine and timeline views in the user interface (e.g., as described below with reference to FIG. 13) may use the enhanced instruction markup document file. On the next activation of the pre-processor 130, this file may be immediately removed, and any consumers of this file may block their work while the file is generated again.

The instruction markup document 102 may include <play/> tags for the audio and video files. The pre-processor 130 may determine the length of these assets and may tag the instruction markup document 102 with this data before the rendering engine 135 begins playing. The outcome of this process may be a duration (e.g., duration="42.73" that is expressed in seconds and thousandths of a second) which may be added to the <play/> tags.

With further reference to FIG. 2D, the pre-processor 130 may store the audio file(s) 104 in the audio files storage 112. The pre-processor 130, in some embodiments, may use a hash algorithm and convert the text related to is being said into a file pointer 207 and may store the audio file(s) 104 in the audio files storage 112 using the associated file pointer(s) 207. The file pointer(s) 207 may be used by the rendering engine 135 to retrieve the audio file(s) 104.

The audio file(s) 104 may be converted into a Portable Network Graphics (PNG) visualization for the timeline view (e.g. the timeline view shown in FIG. 13), and may be appended as a "thumb" attribute. For example:

<speak xmilang="en-US" thumb="/path/to/file/feed-face.png"/>. The pre-processor may update the document status 204 in the documents' status storage 221.

Figure 2E:
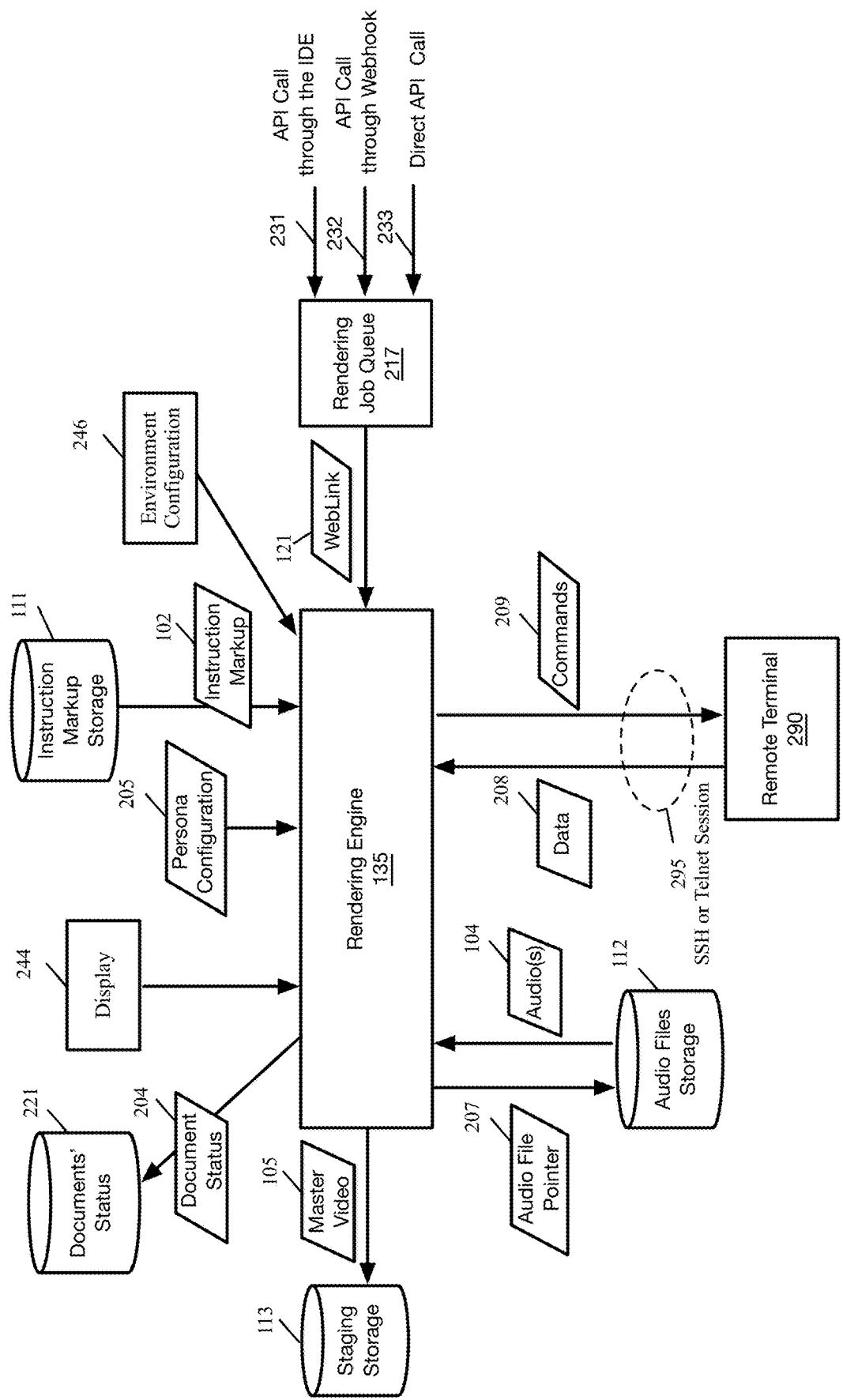
FIG. 2E is a functional block diagram illustrating an example embodiment of the rendering engine of FIG. 1A, according to various aspects of the present disclosure.

FIG. 2E is a functional block diagram illustrating an example embodiment of the rendering engine of FIG. 1A, according to various aspects of the present disclosure. With reference to FIG. 2E, the rendering engine (or renderer) 135 may generate the master video file 105, which may be a high quality video (or movie) file from the instruction markup document 102. The rendering engine 135 of FIG. 1A may be activated to (i) render (or re-render) the instruction markup document 102 and/or to (i) render (or re-render) a playlist (or a playlist of the playlists).

The rendering engine 135 may be activated when a rendering job is placed in a rendering job queue 217. For example, an instantiation of the rendering engine 135 may start in one of the rendering servers 153 of FIG. 2A. There may be different mechanisms for placing a rendering job in the rendering job queue 217. For example, the rendering job may be placed in the rendering job queue 217 by making an API call 231 through the IDE of the system 100 of FIG. 1A, when an instruction markup document 102 is ready for rendering.

As another example, when a new a web-document (or a new version of an existing web-document) is generated by a client, the client may place the web-document in GitHub.

The GitHub may send a webhook (which is a specific type of API) 232 to place a rendering job in the rendering job queue 217 to generate a new video for the web-document.

As another example, the rendering job may be placed in the rendering job queue 217 by a direct API call 233. Each API call may identify the web-document, for which a video is to be rendered (e.g., by a pointer, such as the weblink 121 (FIG. 1A) that points to the web document).

A rendering job may also be placed in the rendering job queue 217 to generate a playlist (or a playlist of playlists). For example, an API call to render (or re-render) a playlist may be in the format of GET/api/v1/render/playlist/(id)?callback=(urlencoded URL), where the id is the playlist identifier and the URL is the callback URL provided by the client. As another example, the API call to render (or re-render) an instruction markup document may be in the format of GET/api/v1/render/spiel/(id), where id is the identifier of the instruction markup (or spiel) document to be rendered.

Optionally, the request to render or re-render may send a callback URL, which may be invoked on success or failure. The given callback URL may receive a HTTP POST of a JavaScript object notation (JSON) object, which may include the following response format:

```
HTTP 200 | 500
{
    guid: "",
    status: (success | fail),
    message: "",
}
``` where 200 and 500 denote the HTTP OK (or success status) and internal server error (or failure status), respectively, and guid is the Globally Unique Identifier (GUID).

If the API render GET request is accepted, the API may return HTTP 200 and a GUID which is a job number (or ticket number):

```
HTTP 200 | 500
{
    guid: ""
}
```

The guid may be stored by the client in order to retrieve the job's status, for example, by sending the following request: GET/api/v1/render/status/(guid).

The following is an example of the response format:

```
HTTP 200 | 500
{
    guid: "",
    status: (batch_success, in_progress, batch_fail),
    completed_spiels: [spiel_id, spiel_id, spiel_id],
    rendering_spiels: [spiel_id],
    failed_spiels: [spiel_id],
    message: "Instructs customer potential remedies for failed spiels"
}
```

On the API call complete, the API service layer may post a job to the pre-processor 130 message queue in the pod assigned to the client. The pre-processor 130 may generate an enhanced instruction markup document with the required duration="value" attributes, which are used by the rendering engine. The pre-processor 130, in some embodiments, may also post a render job to the client's rendering job queue, which may block execution until the pre-processor 130 is done generating enhanced instruction markup document.

The rendering engine 135 may keep track of success or failure of a given instruction markup document 102 and may trigger one of the following workflow queue responses: (i) job complete [spielid] or (ii) job fail [spielid, fail reason], depending on the success or failure, respectively.

When the rendering engine 135 completes the render job, zero or more notifications may be triggered: (i) The client may receive an email, including a link to the "review and publish" screen in the client's console, (ii) If the client is logged in, a notification popup may occur in the browser tab which triggered the render job. The notification popup may only occur if the user initiated the API call from client's console (e.g., from a provided UI), and (iii) If the client has configured a global callback handler (e.g., in a settings page), the callback URL may be invoked, even if the call was submitted via the UI.

With further reference to FIG. 1D, when the rendering engine 135 receives a rendering job through the rendering job queue 217, the job may include a weblink 121 to the web-document to use for generating a video file. The rendering job may identify login credentials to access a web-based document pointed to by the weblink 121. In some embodiments, the rendering job may also identify the instruction markup document 102 to be rendered.

The rendering engine 135 may use the weblink 121, the instruction markup document 102, the audio file(s) 104, and the persona configuration 205 to generate the master video file 105. The rendering engine 135 may build a set of tasks that are sequenced together. For example, the rendering engine 135 may execute every tag under the root level tag of the instruction markup document 102 as a series of blocking instructions. The rendering engine 135 may not continue until the prior tag has completed. The exception where parallel execution may happen is within the <speak> tags. The <mark> tags within the <speak tag> execute immediately, while the audio is playing, in order to "do" something and "say" something at the same time. Therefore, by design, the tasks are implied by their orientation in the instruction markup document 102.

The rendering engine 135, in some embodiments, may run a desktop environment or a mobile environment and may use a web browser to access the web-document pointed to by the weblink 121. The desktop environment or the mobile environment may run on a virtual machine 162-163 or a container (as described above with reference to FIG. 1B). The rendering engine 135 may use a web browser to navigate a display 244 and record the master video file 105 from the display 244. The display 244, in some embodiments, may be an emulated display screen of a virtual machine 162-163 (or a container), as described above with reference to FIG. 1B. The rendering engine 135, in some embodiments, may use a physical display screen to record the master video file 105.

The rendering engine 135 may use the same hash algorithm used by the pre-processor 130 to derive a file pointer 207 from the text related to what is being spoken. The rendering engine 135 may use the file pointer to retrieve and play an associated audio file 104 from the audio file storage 112.

With further reference to FIG. 2E, the persona configuration 205 may provide personalization information such as, for example, and without limitations, cursor color, cursor diameter, whether mouse clicks would make sounds, keyboard sounds, etc., that may be used during video generation. Additional details of the persona configuration parameters are described below with reference to FIG. 11.

The instruction markup document 102 may include a construct to start a remote terminal session. The rendering engine 135 may start a secure terminal session 295 with a remote terminal 290. In some embodiments, the remote terminal 290 may be emulated by a virtual machine 162-163 or a container (as described with above with reference to FIG. 1B). In other embodiments, the remote terminal 290 may be a remote computing device.

The secure terminal session 295 may use, for example, and without limitations, the Secure Shell (SSH) protocol or the Telnet protocol. The rendering engine 135 may send commends 209 to the remote electronic device 290 and may receive data 208 from the remote electronic device 290. The rendering engine 135 may display the data 208 as the master video file 105 is being recorded.

The tag to start the remote terminal session (e.g., the terminal_init tag) may invoke a sub-shell on the rendering engine 135, and may either invoke an SSH or a Telnet session to the remote host. Initiation may require credentials, which may either be stored globally in the clients' settings, or may be provided ad-hoc in optional attributes (e.g., host, username, password, and expect).

The following is an example of a remote terminal_init tag.

```
<terminal_init
    type="[ssh | telnet]"
    username="ubuntu"
    password="pass123"
    host="training.customer.vpn"
    expect="successful login string"
    quadrant="[1-9]"
/>
```

A quasi-terminal (read-only) may be shown on-screen which may simulate a terminal window, and may be overlaid in the browser. For example, in some embodiments, the terminal window may be positioned in one of the nine standard quadrants, in a fixed position and size, or in a window which may move around. The pointing device (e.g., mouse or trackball) may click this window to make it full screen, and may click again to retain the starting size and position.

The quasi-terminal may have CSS selectors which may allow referencing a given line of the terminal, a line matching a pattern, or the current command prompt (i.e., where the blinking cursor is in the window). Once the remote terminal session is initiated, the engine may continue with the markup document 102 flow.

During the recording session, the tag body may be sent to the active session, and a newline may be implied in each call, for example, <terminal> ls-tl</terminal>.

The following are the examples of the outputs to the on-screen quasi-terminal.

$ ls-tl

-rw-r--r--1 davidg staff 3535 March 3 10:59 asseter-spec.txt

-rw-r--r--1 davidg staff 1481 February 28 14:33 patent-outline.txt

Calls in the format <terminal> ls-tl</terminal> are non-blocking, and may continue the next rendering engine instruction. Optionally, the terminal_init tag may support an expect="pattern" (e.g., <terminal expect="-rw-r--r--"> ls-tl</terminal>), which may wait for the given string pattern in stdout, which may then inform the rendering engine 135 to continue the flow of execution. Tags with "expect"

attributes may block the flow of execution, or may timeout with an error after a given number of seconds. The time out value may be set in an optional timeout tag (e.g., timeout="5" to set a 5 second timeout) or in the client's global settings.

With continued reference to FIG. 2E, the rendering engine 135 may store the master video file 105 in the staging storage 113. The rendering engine 135 may update the document status 204 in the documents' status storage 221. In some embodiments, when an instruction document such as the instruction document 101 (FIG. 1A) is received by the system 100, the document is given a name (e.g., a name assigned by a user) and the status of the document may be updated as the document moves as a job through the pipeline of FIG. 1A. For example, as described above, each GUID may identify a job in the pipeline and the status of the job may be inquired using a GET command.

In some embodiments, an environment configuration 246 may be injected into the rendering engine 135, which may contain host files (for special bypass-DNS name resolution for custom host name resolution to a VPN address) along with one or more product configurations which contain weblinks that are loaded into the rendering engine 135. The product configuration(s) contained in the environment configuration 246 may include customized JavaScript, and CSS which are injected into the browser plugin at runtime. The rendering engine 135 may become an environment at any time when the rendering engine 135 is in idle state (waiting for a job), and be able to run one or more digital products in an already logged in state. Each digital product may enact an auto-login function (if required for a web application in a digital product), which stores sensitive login secrets in a secured key/value "vault" that is not available to any persons or any entities except the rendering engine 135 at runtime. When a web application requires login, the rendering engine 135 replays the secure information into the login form, and completes the auto-login process.

In some embodiments, a directory may be created for each job. The directory may be named with a hash of the GUID. Other files (such as the instruction markup documents 102, 102, the audio files 104, the video files 105, 107, the subtitle files 106, the playlists, etc.) generated in each stage of the pipeline of the system 100 may be predictably named and may be placed in job directory. For example, a French audio file for a job may be named fr-vtt.txt and may be saved in the directory which is named with the hash of the job's GUID. The status of one or more of these files may be saved at each stage of the pipeline of the system 100. A client may use a user interface, such as the user interface 2000 which is described below with reference to FIG. 20, to display the status of the client's different documents.

Figure 2F:
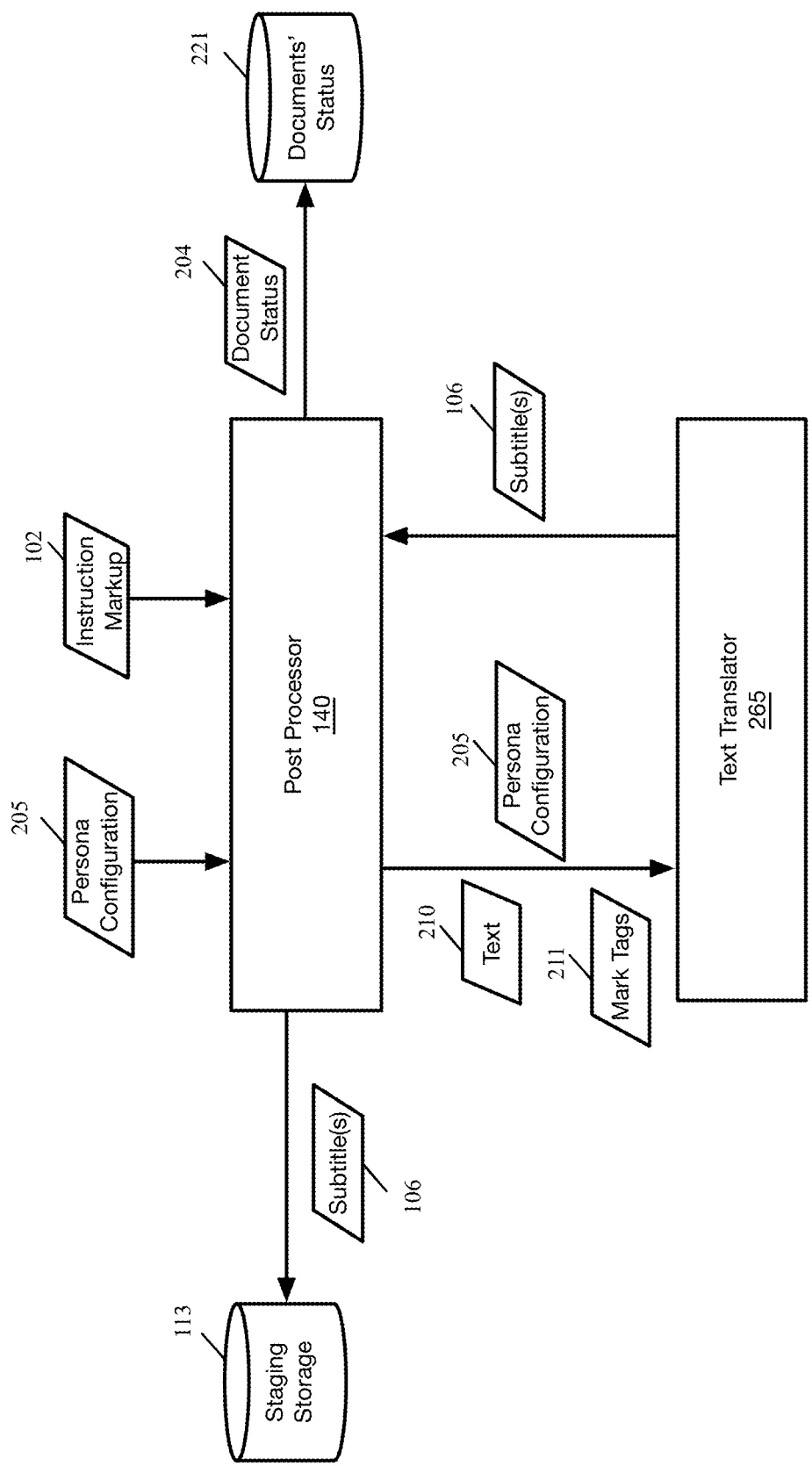
FIG. 2F is a functional block diagram illustrating an example embodiment of the post processor engine of FIG. 1A, according to various aspects of the present disclosure.

FIG. 2F is a functional block diagram illustrating an example embodiment of the post processor engine of FIG. 1A, according to various aspects of the present disclosure. The post processor 140 may receive the instruction markup document 102 and the persona configuration 205 and may generate one or more subtitle files 106.

The subtitles (or the closed captions) may be generated in the "starting language" which may, for example, and without limitations, be defaulted to English. The rendering engine 130 (FIG. 2E) may start an internal clock at 00:00:00.00 when the <start_recording/> tag is called. Each <speak> tag has a duration="value" attribute which may be applied in the pre-processing phase by the pre-processor 130. The value, in some embodiments, may specify the duration with a precision of hundredths of a second.

When the <speak> tag is invoked in the rendering engine 135, a scan for <mark> tags must be performed. Every period, question mark, or exclamation point must have a <mark> tag applied by the pre-processor 130. Each sentence must have a duration based on these mark tags, and each sentence may be sent to a WebVTT file (e.g., a file with .vtt extension), which may have the offset time noted. The result is the outputs in the attached WebVTT files. For example:
WEBVTT
00:00:01.640-->00:00:05.240
The prism console is where you manage all of your subscriptions.
00:00:05.376-->00:00:09.413
We'll start with an overview of all screens available from the "home" menu.
00:00:09.413-->00:00:10.966
Starting with the health menu item.

In some embodiments, the generation of the starting language may be done during an initial render phase. In a second phase, translations may be sent for each line in the WebVTT file to the text translator 265 (as shown below, the same timecodes. are sent to the text translator for translation to Spanish):
WEBVTT
00:00:01.640-->00:00:05.240
La consola de prisma es donde administra todas sus nuevas suscripciones de tannex.
00:00:05.376-->00:00:09.413
Comenzaremos con una descripción general de todas las pantallas disponibles en el menú "inicio".
00:00:09.413-->00:00:10.966

One technical advantage that the present embodiments provide over the prior art for generating subtitles is that the prior art methods generate subtitles from the spoken audio files, for example, by a human listening to the audio files and typing the subtitles. In other prior art methods, the audio may be converted back to text, for example, through machine learning.

In contrast, the post processor 140 of the present embodiments already has the text in the instruction markup document 102 and knows at what point in time that text is being spoken. The rendering engine 135 of the present embodiments generates the time code offset while the video is being recorded each time. The post processor 140 of the present embodiments has the distinct advantage of knowing what text is being spoken at a time.

With continued reference to FIG. 2F, the post processor 140 may send the persona configuration 205, the mark tags 211, and the associated text 210 to the text translator 265 to generate one or more subtitle files 106. The post processor 140 may store the subtitles file(s) 106, for example in the staging storage 113. The subtitles may be overlaid over the associated video by a video player. The post processor 140 may update the document status 204 in the documents' status storage 221.

Figure 2G:
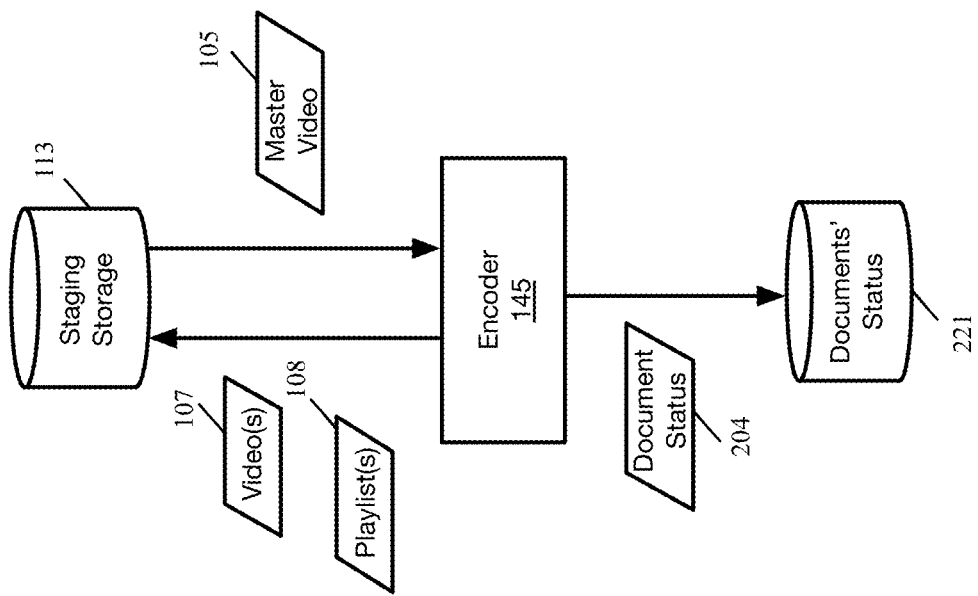
FIG. 2G is a functional block diagram illustrating an example embodiment of the encoder of FIG. 1A, according to various aspects of the present disclosure.

FIG. 2G is a functional block diagram illustrating an example embodiment of the encoder of FIG. 1A, according to various aspects of the present disclosure. With reference to FIG. 2G, the encoder 145 may receive the master video file 105 and may generate one or more video files 107 with different display resolutions (for displaying on different screen sizes) and/or for different transmission bandwidths (or bitrates). The encoder 145 may generate one or more playlists 108.

The master video file 105, in some embodiments, may be a high quality uncompressed video file. The rendering engine 130 may not be able to compress the master video file

105, as the master video file 105 is being recorded. The master video file 105 may, therefore, be a very large file that may include several gigabytes of data for every few of minutes of recording. For example, the master video file 105, in some embodiments, may be an uncompressed Quick-Time movie file (e.g. a MOV file).

The video files 107 may be compressed video files. The video files 107 may be, for example, and without limitations, in MP4 (or MPEG-4) format. A playlist may be, for example, and without limitations, a Moving Picture Experts Group Audio Layer 3 Uniform Resource Locator (M3U) file or a M3U8 file.

A playlist may be an HTTP Live Streaming (HLS) playlist. A M3U playlist may be a manifest of several video files that may be played in sequential order. A M3U file may be a plain text file that may be used by a player to describe where the media files are located. A M3U8 may be a manifest of many variants of the same video. For example, the files may have different video resolutions such as, for example, 640×480 pixels, 1280×720 pixels, 1920×1080 pixels, etc. A M3U8 file may be a plain text file that may be used by a player to describe where the media files are located.

The encoder 145 may store the video file(s) 107 and the playlist(s) 108 in the staging storage 113. The encoder 145 may update the document status 204 in the documents' status storage 221.

Figure 2H:
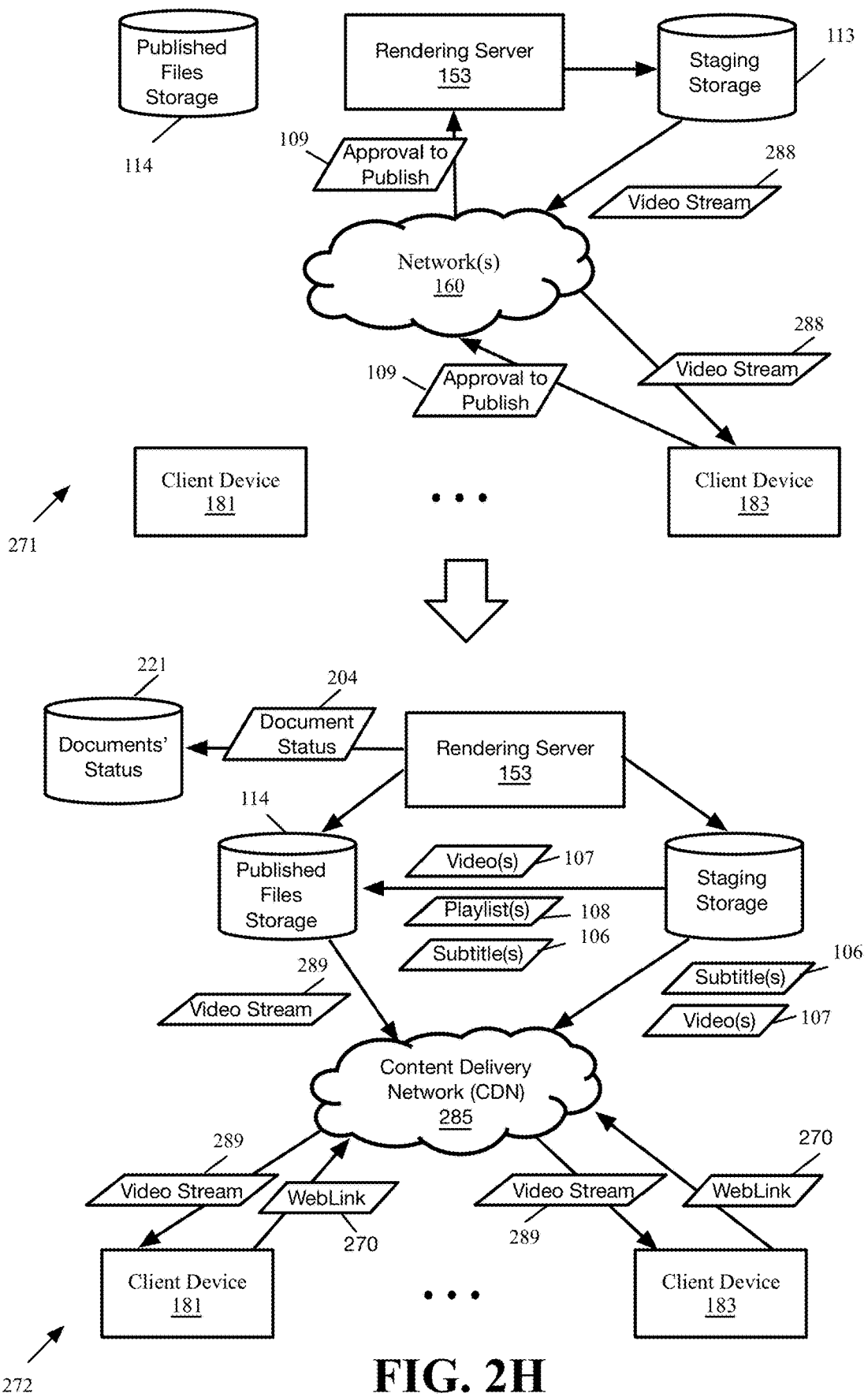
FIG. 2H is a functional block diagram illustrating an example embodiment of the content delivery of FIG. 1A, according to various aspects of the present disclosure.

FIG. 2H is a functional block diagram illustrating an example embodiment of the content delivery of FIG. 1A, according to various aspects of the present disclosure. Once the video file(s) 107, the playlist(s) 108, and the subtitle file(s) 106 are stored, the client who had submitted the rendering job may be notified to review and approve the files for publication.

FIG. 2H, as shown, includes two stages 271 and 272. In stage 271, the client may use a user interface on a computing device 183 to review a video stream 288 that may include the rendered video file(s) 107, the playlist(s) 108, and/or the subtitle file(s) 106. The video stream 288 may be streamed from a rendering server 153 (or from another server of the hardware system 150 of FIG. 1B) to the client device 183 through the networks 160. Once the client approves the rendering job, the client may send an approval to publish 109 from the client device 183 to the rendering server 153 to publish the video file(s) 107, the playlist(s) 108, and/or the subtitle file(s) 106.

In stage 272, in response to receiving the approval to publish 109, the video file(s) 107, the playlist(s) 108, and/or the subtitle file(s) 106 that are approved for publication may be moved (or copied) by the rendering server 153 (or by another server of the hardware system 150 of FIG. 1B) from the staging storage 113 to the published files storage 114. The rendering server 153 (or the other server) may also change the status 204 of the documents in the documents' status storage 221.

The video file(s) 107, the playlist(s) 108, and the subtitle file(s) 106 stored in the published files storage 114 may become accessible to authorized client devices such as the client devices 181-183. In some embodiments, the published files in the published files storage 114 may be accessible through a content delivery network (CDN) 285, which may provide one or more weblinks 270 to the client devices 181-183 through the CDN network 285. The CDN network 285 may be a distributed network of servers that may use networks such as the Internet, the cellular networks, intranets, etc., to deliver content to subscribers such as the client devices 181-183. The client devices 181-183 may use the weblink(s) 270 to receive the video streams 289.

Figure 3:
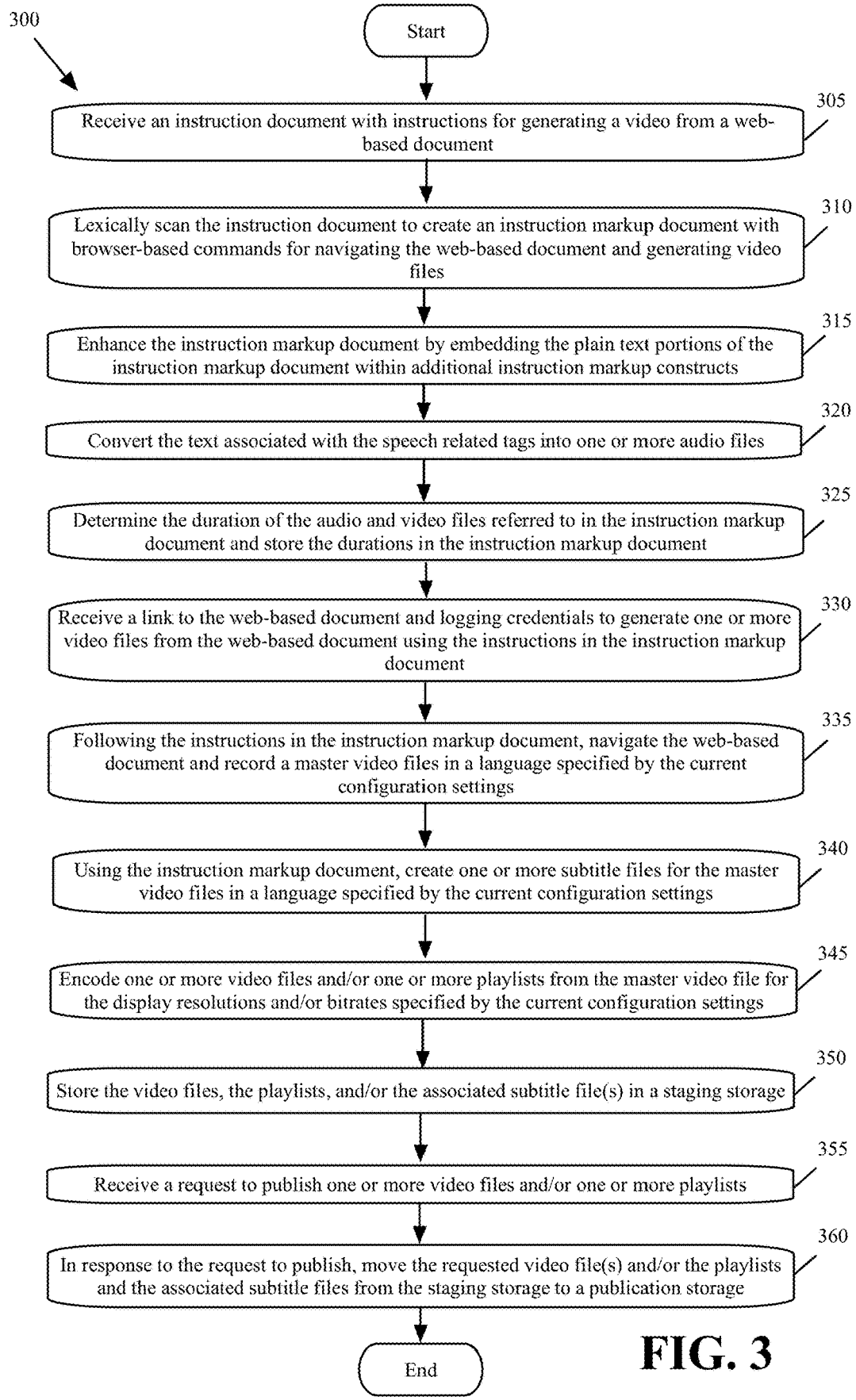
FIG. 3 is a flowchart illustrating an example process for generating video files, according to various aspects of the present disclosure.

FIG. 3 is a flowchart illustrating an example process 300 for generating video files, according to various aspects of the present disclosure. The process 300, in some of the present embodiments, may be performed by the processing units of one or more of the servers 151-153 of FIG. 1B.

With reference to FIG. 3, at block 305, an instruction document with instructions for generating a video from a web-document may be received. For example, the ingester 120 of FIG. 2A may receive an instruction document such as the free-form text document 201, the markdown document 202, or the DITA document 203. The instruction document may be sent to the ingester 120, for example, and without limitations, by a drag and drop operation through a user interface such as the user interface 2400 of FIG. 24.

The instruction document may be lexically scanned (at block 310) to create an instruction markup document with browser-based commands for, among others, navigating the web-document and generating video files. The instruction markup document 102 may be in a domain-specific instructional language which explains the operations to be performed on the web-based document. For example, the ingester 120 of FIG. 2A may scan the instruction document 201, 202, or 203 and may create the instruction markup document 102.

The instruction markup document may be enhanced (at block 315) by embedding the plain text portions of the instruction markup document within additional instruction markup constructs. For example, the behavioral enhancer 125 of FIG. 2C may use heuristics and/or AI to identify actions with the plain text blocks. The behavioral enhancer 125 may create instruction markup constructs to embed the plain text blocks. The behavioral enhancer 125 may, in some of embodiments, embed the plain blocks, for which no actions can be identified, within speak constructs, as described above with reference to FIG. 2C.

Next, the speech related tags in the instruction markup document may be identified (at block 320) and the text associated with the speech related tags may be converted into one or more audio files. For example, the pre-processor 130 may identify the speech related text as described above with reference to FIG. 2D and may generate one or more audio files 104.

The duration of the audio and video files referred to in the instruction markup document may be determined (at block 325) and may be stored in the instruction markup document. For example, the pre-processor 130 may determine the duration of the audio and video files referred to in the instruction markup document 102 and may store the durations in the instruction markup document 102, as described above with reference to FIG. 2D.

Next, a link to a web-based document and logging credentials may be received (at block 330) to generate one or more video files from the web-based document using the instructions in the instruction markup document. For example, the rendering engine 135 of FIG. 2E may receive a rendering job from the rendering job queue 217 that may include the weblink 121 to a web-based document and optional logging credentials.

Next, the web-based document may be navigated (at block 335) by following the instructions in the instruction markup document, and a master video files may be recorded in a language that is specified by the current configuration settings. For example, the rendering engine 135 of FIG. 2E may use the instructions in the markup document 102 to navigate and/or manipulate the web-based document displayed on a display 244 and may record the master video file 105 from the display 244. The display 244, in some embodiments, may be an emulated display screen of a virtual machine 162-163 (or a container), as described above with reference to FIG. 1B. The rendering engine 135, in some embodiments, may use a physical display screen to record the master video file 105.

The instruction markup document may be used (at block 340) to create one or more subtitle files for the master video files in a language specified by the current configuration settings. For example, the post processor 140 of FIG. 2F may send the mark tags and the associated text with the persona configuration related to text translation to the text translator 265. The text translator 265 may generate one or more subtitle file 106 in the languages specified by the persona configuration 205.

Next, one or more video files and/or one or more playlists may be encoded (at block 345) from the master video file for the display resolutions and/or bitrates specified by the current configuration settings. For example, the encoder 145 of FIG. 2G may generate one or more video files 107 with different resolutions and/or different transmission bandwidths. The encoder 145 may generate one or more playlists 108. A playlists may be a manifest of several video files that may be played in sequential order (e.g., the playlist may be a M3U playlist). A playlist may be a manifest of many variants of the same video (e.g., the playlist may be a M3U8 playlist).

The video files, the playlists, and/or the associated subtitle file(s) may be stored (at block 350) in a staging storage. For example, video files, the playlists, and/or the associated subtitle file(s) may be stored in the staging storage 113 of FIG. 1A. Next, a request to publish one or more video files and/or one or more play lists may be received (at block 350). For example, the rendering server 153 of FIG. 2H may receive the approval to publish 109.

In response to receiving the request to publish, the requested video file(s) and/or playlist(s) and the associated subtitle files may be moved or copied (at block 355) from the staging storage to a publication storage. For example, in response to receiving the approval to publish 109, the rendering server 153 of FIG. 2H (or another server of the system 150 of FIG. 1B) may move the video file(s) 107, the playlist(s) 108, and/or the subtitle file(s) 106 from the staging storage 113 to the published file storage 114. The files stored in the published file storage 114 may be accessible through the weblink(s) 270. The processing may then end.

Figure 4:
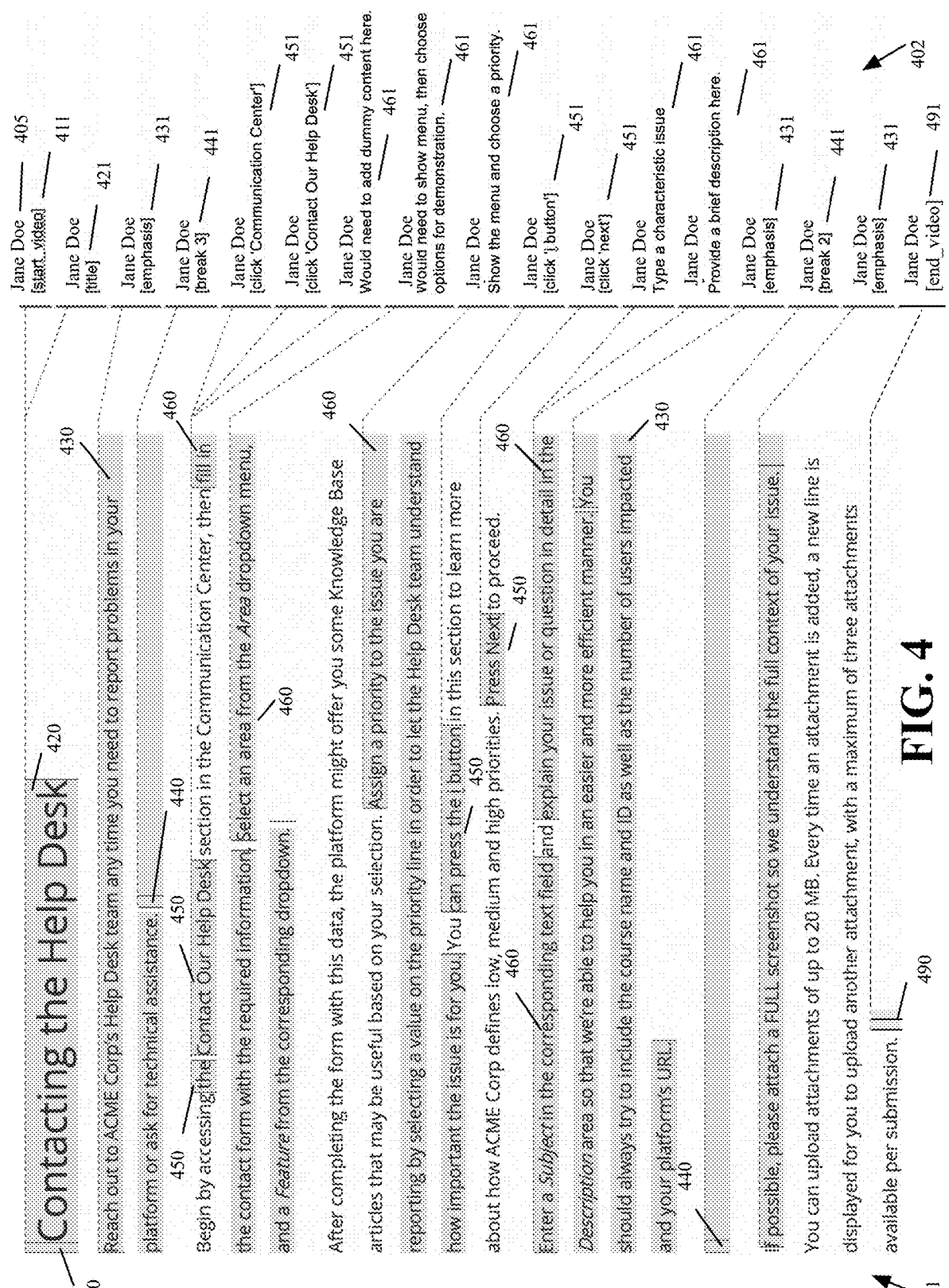
FIG. 4 is a schematic front view of a portion of the display of a computing device displaying an instruction document that includes comments for generating markdown commands, according to various aspects of the present disclosure.

FIG. 4 is a schematic front view of a portion of the display of a computing device displaying an instruction document that includes comments for generating markdown commands, according to various aspects of the present disclosure. With reference to FIG. 4, the instruction document may be displayed in the user interface of a text editor, such as, for example, and without limitations Microsoft Word, Google Docs, Apple Pages, etc. As shown, the user interface may include a plain text section 401 and a comment section 402. Displaying and printing of the comment section 402 may be selectively turned on or off by one or more options (not shown) that are provided by the text editor.

With further reference to FIG. 4, several portions 410, 420, 430, 440, 450, 460, and 490 of the plain text section 401 of the document are selected. The selected portions, in this example, are shown as highlighted. The comment section 402 includes a corresponding comment 411, 421, 431, 441, 451, 461, and 491 for each selected portion 410, 420, 430, 440, 450, 460, and 490 of the text.

Each comment indicates the author's name 405 (in this example, the author of all comments is the same person). The comments may include, for example, and without limitations, identifying where the video has to start (video_start) 411 and where the video has to stop (stop_video) 491. The comments may identify the title of the video 421. The comments may include identifying where a displayed text needs emphasis 431. For example, the video may emphasize the selected text by highlighting, display in bod, blinking the fonts, changing the color of the font, etc.

The comments may include identifying where there is a need for a break (or pause) 441 for a number of seconds in the action while the video is still recording. The comments may indicate that an element displayed on the video has to be selected. For example, click 'xyz' 451, where 'xyz' is the identifier of a displayed element, may indicate selecting the 'xyz' element on the user interface of the digital product.

The comments may include notes 461 that the document author and/or the document reviewers may leave in the document as a part of their workflow. The notes 461 may be used, for example, as reminders, as a way of collaboration, etc. Some embodiments may ignore any comments that are not surrounded by a delimiter, such as the start bracket, "[" and end bracket "]".

Some embodiments may allow an instruction document 101 to be in the form of comments in an XML document without impacting an existing XML publication. For example the following comments may be inserted in an XML, document:

```
<!-- <start_video/> -->
<!-- <click selector="'Save'"/> -->
```

The <!--<start_video/>--> comment is recognized by the system 100 (FIG. 1A) as a markdown command to start recording the video. The <!--<click selector="'Save'"/>--> may cause the element "Save" on the UI of the digital product to the clicked at, while the video is being recorded. Any other comments may be interleaved with the XML lines in the document. The system 100 may use the comments to generate an instruction markup document 102 (FIG. 1A). Since comments are not displayed when an XML document is being published, the inserted comments do not affect the publication of the XML document.

Some embodiments may allow the use of pairs of tags and/or the use of nested tags. For example the following is an example of the use of the pair of tags:

```
<!-- <title> --><!--<skip>-->Lesson 1: <!--</skip>-->This is your video title<!-- </title>-->
```

To achieve the expected behavior, the content in between opening and closing markdown tags embedded in the comments has to be balanced, for example as shown above with the skip and title tags.

Some embodiments may allow an instruction document 101 to be in the form of a multi column table. FIG. 5 is a schematic front view of a portion of the display of a computing device displaying an instruction document that is in a multi column table format, according to various aspects of the present disclosure. With reference to FIG. 5, a portion 500 of a free text instruction document 201 (FIG. 2A) is displayed on the display of the computing device. The portion of the document may include a multi column table 505.

The table 505, also referred to herein as the storyboard template, may include two or more columns. In the example of FIG. 5, the table 505 includes a narrative column 501, an action column 502, a data column 503, and a special effect column 504. Other embodiments may include fewer or more columns that the table 505.

The narrative column 501 may include the text that has to be spoken in the video. The narrative column 501 may include bracketed references, for example with numerical references such as [1], [2], [3], etc., which may point to the exaction position in which actions may happen, data may be entered, and/or special effects may happen.

The action column 502 may be the lexical description of the action which is to occur along with a bracket that links to a bracket with the same reference number in the narrative column 501. When the action requires data, the data column 503 may provide a bracketed pointer to the action for which the parameter applies to. The special effect column 504 may include a reference to a markdown command, along with a bracket that links to a bracketed item with the same number in the narrative column 501.

In the example of FIG. 5, when the rendering engine 135 (FIG. 1A) is rendering the video and reaches a point where the bracket link [1] 510 is scanned, the rendering engine 135 finds any action, data, and/or special effect in the action column 502, the data column 503, and/or the special effect column 504 that matches the bracket link [1]. In this example, the action 511 has the same bracket link. In response, the rendering engine 135 clicks the element 'Spiel' on the user interface of the digital product while rendering the video.

When the rendering engine 135 scans the bracket link [2] 520 in the narrative column 501, the rendering engine finds any action, data, and/or special effect in the action column 502, the data column 503, and/or the special effect column 504 that matches the bracket link [2]. In this example, the rendering engine finds the action with the same bracket link 521 and clicks on the element 'New' on the user interface of the digital product while rendering the video.

When the rendering engine 135 scans the bracket link [3] 530 in the narrative column 501, the rendering engine finds any action, data, and/or special effect in the action column 502, the data column 503, and/or the special effect column 504 that matches the bracket link [3]. In this example, the rendering engine 135 finds the action with the same bracket link 531 and types 'The Title' on the user interface of the digital product while rendering the video. The rendering engine 135 also inserts the data with the same bracket link 532 for the title.

When the rendering engine 135 scans the bracket link [4] 540 in the narrative column 501, the rendering engine finds any action, data, and/or special effect in the action column 502, the data column 503, and/or the special effect column 504 that matches the bracket link [4]. In this example, the rendering engine 135 finds the special effect 541 with the same bracket link and performs the special action 'Quick Swirl' on the user interface of the digital product while rendering the video.

Figure 6:
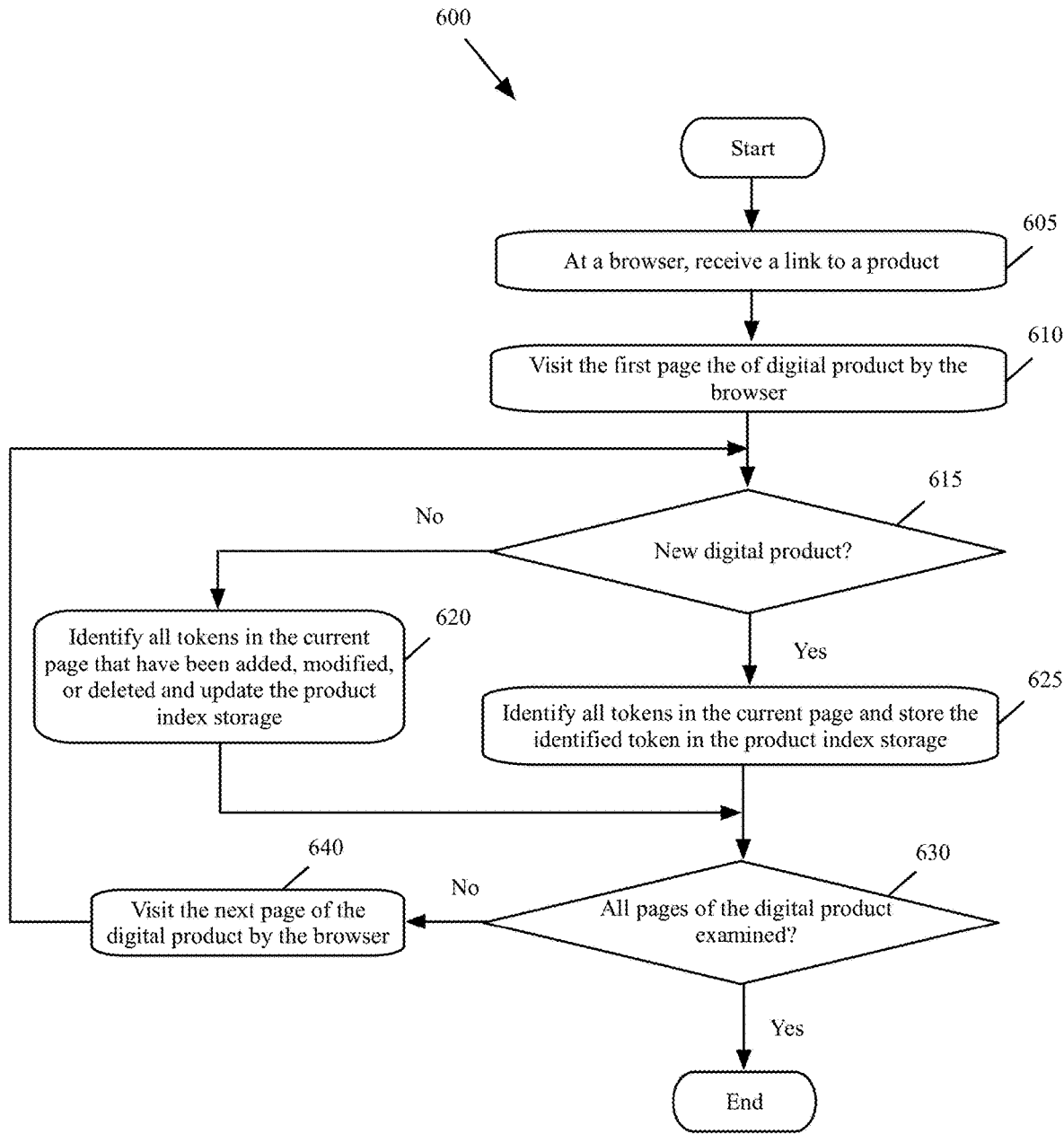
FIG. 6 is a flowchart illustrating an example process for generating product index data, according to various aspects of the present disclosure.

FIG. 6 is a flowchart illustrating an example process 600 for generating product index data, according to various aspects of the present disclosure. The process 600, in some of the present embodiments, may be performed by the processing units of one or more of the servers 151-153 of FIG. 1B.

With reference to FIG. 6, at block 605, a link to a digital product may be received. For example, the digital product may be a web document and a weblink to the home page of the web document may be received. It should be noted that the process 600 may be activated to crawl and identify the token of a new digital product. The process 600 may also be periodically and/or asynchronously activated to crawl an existing digital product to identify changes in the digital product's tokens.

At block 610, the first page of the digital product may be visited by the browser. For example, the browser may visit the home page of the digital product. Next, a determination may be made (at block 615) whether the digital product is new. For example, a determination may be made whether this is the first time that the browser is crawling the digital product.

When the digital product is new, all tokens in the current page may be identified (at block 625) and may be stored (at block 625) in the product index data storage. For example, the tokens may be identified and stored in the product index data storage 115, as described above with reference to FIG. 2B. The processing may then proceed to block 630, which is described below.

When the digital product is not new, all tokens in the current page that have been added, modified, or deleted may be identified (at block 620) and may be stored (at block 620) in the product index storage. For example, the new tokens may be added to the product index data storage 115, the tokens that have been removed from the page may be deleted from the product index data storage 115, and the tokens that are modified may be modified in the product index data storage 115.

Next, a determination may be made (at block 630) whether all pages of the digital product are examined. If not, the next page of the digital product may be visited (at block 640) by the browser. The processing may then proceed to block 615, which was described above. When a determination is made (at block 630) that all pages of the digital product are examined, the process 600 may end. It should be noted that the process 600, in some embodiments, may automatically be launched and performed without human interactions.

FIG. 7 illustrates examples of the constructs of the domain-specific instructional language used to generate a video file, according to various aspects of the present disclosure. The domain-specific instructional language (or spiel) may include constructs such as tags that may be used to generate a video while a navigating a web-based document.

With reference to FIG. 7, the table 700 shows different types 705 of spiel constructs and examples 710 of the construct in each type. As shown, the domain-specific instructional language constructs may be used for the followings: identifying the root of the instruction markup document 720, screen animations 721, screen navigation and/or page access 722, code editor/debugger access 723, sidebar organizer 724, video recording 725, asset generation 726, browser page access 727, remote terminal access 728, timeout/wait 729, audio play 730, text display 731, script execution 732, and user authentication 733. The followings are examples of different spiel constructs. In the following examples, the constructs that terminate with the character"/" are empty tags. The constructs that do not terminate with the character"/" are start tags that require a body and a matching end tag.

The spiel construct, <spiel>, is the root construct. Every instruction markup document, in some embodiments, may start with a <spiel> construct and other constructs in the body of the instruction markup document may follow the spiel construct. The spiel construct does not have any attributes.

The url construct, <url href=" "/>, may instruct the browser to navigate to the given URI, and wait for the page to load. The url construct includes the required attribute href. The markdown equivalent of the url construct is: [url https://www.website.com], where the website.com is the web address to navigate.

The portal construct, <portal href=" "/>, may instruct the browser to navigate to the given URI, in a portal window. The portal construct delivers a "picture-in-a-picture" experience with the portal window being a smaller window, and preserving the context of the current webpage. The portal construct includes the required attribute href. The markdown equivalent of the portal construct is: [portal https://www.website.com], where the website.com is the web address to navigate.

The timeout construct, <timeout seconds=" "/>, may instruct rendering engine 135 of FIG. 2E to exit the rendering process if not completed in @seconds. The timeout construct includes the required attribute seconds. The markdown equivalent of the timeout construct is: [timeout n], where n is the number of seconds.

The wait_for construct, <wait_for selector=" "/>, may instruct the rendering engine 135 to block the timeline until the given @selector is discovered. The wait_for construct includes the required attribute selector. The markdown equivalent of the wait_for construct is: [wait_for 'selector name'], where the selector name is the name of the selector to be discovered.

The exit construct, <exit/>, may be used for a fatal error, for example, when a login page blocking for an auth code times out. The exit construct has no attributes. The markdown equivalent of the exit construct is: [exit].

The exit_for construct, <exit_for selector=" "/>, may instruct the rendering engine 130 to exit the spiel when the given @selector is discovered. The exit_for construct may be used for login pages, and any debug/utility pages which are not recorded. The exit_for construct has the required attribute selector. The markdown equivalent of the exit_for construct is: [exit_for 'selector name'], where the selector name is the name of the selector to be discovered.

The login_for construct, <login_for selector=" "/>, may instruct the rendering engine to pause its flow, and run the parent spiel flow when the given @selector is discovered. The login_for construct may be used for redirecting to login pages. The login_for construct has the required attribute selector. The markdown equivalent of the login_for construct is: [login_for 'selector name'], where the selector name is the name of the selector to be discovered.

The speak construct, <ssml: speak>, may reference the tag of the SSML schema. It should be noted that the SSML <speak> is the root of SSML, and all children tags (such as <mark>) are implied by the fact that the <speak> tag defines all acceptable embedded tags, which are all tags in the SSML schema. The current version of the SSML schema is maintained by the World Wide Web Consortium (W3C).

The script construct, <script>, may pass the given script in the text or character data (CDATA) body of the tag. The script construct has no attributes.

The mouse_to construct, <mouse_to selector=" "/>, has the required attribute selector and the optional attribute async. The mouse_to construct may move the mouse to the given @selector. If @async is provided, the mouse_to construct instructs the rendering engine to continue the timeline cursor immediately. The markdown equivalent of the mouse_to construct is: [mouse_to 'element name' ], where the element name of the name of the element to navigate to.

The mouse_move construct, <mouse_move x=" " y=" "/>, may move the mouse to the given @x/@y coordinates on a 1920×1080 screen. The mouse_move construct has the required attributes x and y. The markdown equivalent of the mouse_move construct is: [mouse_move x y].

The move_by construct, <move_by x=" " y=" "/>, may move the mouse differentially by the given @x/@y coordinates on a 1920×1080 screen. The move_by construct has the required attributes x and y. The markdown equivalent of the move_by construct is: [moveby x y].

The mouse_arc construct, <mouse_arc x=" " y=" "/>, may curve the mouse to the given @x/@y coordinates on a 1920×1080 screen. The mouse_arc construct has the required attributes x and y. The markdown equivalent of the mouse_arc construct is: [mouse_arc x y].

The mouse_settings construct, <mouse_settings persona=" "/>, may inform the rendering engine which mouse persona to use. The mouse persona is typically handled in the client's setting page. However, it is possible to swap between personas within the spiel. Examples of possible personal values are: "DG Trackball," "DG Mouse," and "synthetic," where DG is an example of the initials of a user who has personalized a particular mouse behavior. The mouse_settings construct has the required attribute persona. The markdown equivalent of the mouse_settings construct is: [mouse_settings persona], where persona is the mouse persona.

The monaco construct, <monaco>, has no attributes. The text body must be given, and the text within the body is injected into the first Microsoft® Monaco code editor widget on-page. The markdown equivalent of the monaco construct is: [monaco code to inject into editor].

The monaco_line construct, <monaco_line start=" " end=" "/>, has the required attributes start and end. Given the start/end line numbers, the monaco_line construct may highlight a vertical bar in the editor for those line(s). The markdown equivalent of the monaco_line construct is: [monaco_line start end], where start and end are the start line number and the end line number, respectively.

The monaco_clear construct, <monaco_clear/>, may clear all annotations in the Monaco editor. Given the start/end line numbers, the monaco_line construct may highlight a vertical bar in the editor for those line(s). The monaco_clear construct has no attributes. The markdown equivalent of the monaco_clear construct is: [monaco_clear].

The monaco_click construct, <monaco_click/>, may focus and run the Monaco editor. The monaco_click construct has no attributes. The markdown equivalent of the monaco_click construct is: [monaco_click].

The type construct, <type>, may type the given text in the body of the construct into the given @selector. The type construct plays audio of keyboard sounds which are selectable in the persona generator. The type construct has no attributes. The markdown equivalent of the type construct is: [type ('first name selector')(text)], where 'first name selector' is the selector for the author's first name and text is the text to be typed.

The send_key construct, <send_key>, is a variant of the type construct, which may send a raw key event directly to the operating system. The send_key construct has no attributes. The markdown equivalent of the send_key construct is: [send_key keystrokes], where keystores are the native keystrokes at the operating system level.

The send_meta construct, <send_meta>, is a variant of the type construct, which may send a raw meta-key event directly to the operating system. The send_meta construct supports any meta-keys in the xdotool command, for example: "cmd+shift+i" for development tools. The send_meta construct has no attributes. The markdown equivalent of the send_meta construct is: [send_meta meta-key], where meta-key is the raw meta key to send.

The play construct, <play file=" ">, has the required attribute file and the optional attributes async, volume, and quadrant. When the filename to an uploaded audio is provided, the play construct may play the file. Optionally, using the async attributes makes the rendering engine continue the flow of control. Optionally, using the volume [0-100] indicates to the rendering engine how loud to play the file. If the file given is a video (e.g., a movie), the file may be played full screen by default. Optionally, the movie may be played as "picture-in-a-picture" and the screen may be split into 9 squares, and the quadrant attribute 1-9 informs the rendering engine which region to place it. The markdown equivalent of the play construct is: [play http://website.com/file.mp3], where http://website.com/file.mp3 may be the address of any audio or video file.

The break construct, <break time=" "/>, may instruct the rendering engine to wait for n-milliseconds. The break construct has the required attribute time. The markdown equivalent of the break construct is: [break time], where time is the wait time in milliseconds.

The scroll_into_view construct, <scroll_into_view selector=" "/>, has the required attribute selector. Given the CSS selector, or xpath:(xpath), the scroll_into_view construct may scroll the document to that location. The scroll_into_view construct functions on elements within the overflow div tags (which define a division or a section in an HTML document), and scrolls the entire document window when necessary. When an element which requires interaction happens to be off screen, this method is called automatically to bring it into view. The markdown equivalent of the scroll_into_view construct is: [scroll_into_view 'selector'], where 'selector' identifies the element to bring into view.

The scroll_to construct, <scroll_to x=" " y=" "/>, may scroll the document to the point location identified by the x and y coordinates. The scroll_to construct has the required attributes x and y. The markdown equivalent of the scroll_to construct is: [scroll_to x y].

The scroll_by construct, <scroll_by x=" " y=" "/>, has the required attributes x and y. Given the x/y coordinates, the scroll_by construct may scroll the document by a difference of x/y pixels. The markdown equivalent of the scroll_by construct is: [scroll_by x y].

The click construct, <click/>, has the optional attributes selector, navigate, x, and y. Given the CSS selector, or xpath:(xpath), the click construct may click the element. If @navigate is passed, the click construct instructs the engine to wait until the next page loads. A sound is played to simulate a mouse, which is configurable in the persona settings. The markdown equivalent of the click construct is: [click 'selector'], where 'selector' identifies the element to click.

The soft_return construct, <soft_return/>, may send an operating system native ctrl+Return (aka soft return) to the browser element of focus. The soft_return construct no attributes. The markdown equivalent of the soft_return construct is: [soft_return].

The blur construct, <blur selector=" "/>, has the required attribute selector and the optional attribute px. Given the CSS selector, or xpath:(xpath), the blur construct may blur the element. The blur construct may be used for scrubbing Personally Identifiable Information (PII), when called before start_recording. The px attribute may define the radius of the blur as defined in CSS. The markdown equivalent of the blur construct is: [blur 'selector'], where 'selector' may be any valid 'textual selector', CSS selector, or XPath selector. For example, input.password is a CSS selector.

The highlight construct, <highlight selector=" "/>, has the required attribute selector. Given the CSS selector, or xpath:(xpath), the highlight construct may highlight the element. The markdown equivalent of the highlight construct is: [highlight 'selector'], where 'selector' is the selector of the element to be highlighted.

The highlight_off construct, <highlight_off selector=" "/>, has the required attribute selector. Given the CSS selector, or xpath:(xpath), the highlight_off construct may disable highlight on the element. The markdown equivalent of the highlight_off construct is: [highlight_off 'selector'], where 'selector' is the selector of the element for which highlight is to be disabled.

The flash construct, <flash selector=" "/>, has the required attribute selector and the optional attribute tick. Given the elements matching the CSS selector, or xpath:(xpath), the flash construct may apply CSS3 visual transform flash effect on the elements. The markdown equivalent of the flash construct is: [flash 'selector'], where 'selector' is the selector of the element to which the flash effect is to be applied.

The notify construct, <notify>, may show a desktop-style notification of anything typed within the construct's text body. The notify construct has no attributes. The markdown equivalent of the notify construct is: [notify notification], where notification is the notification to be alerted in a corner (e.g., the upper right corner) of the screen.

The box construct, <box selector=" "/>, has the required attribute selector. Given the elements matching the CSS selector, or xpath:(xpath), the box construct may apply CSS3 visual transform box outline effect on the elements. The markdown equivalent of the box construct is: [box 'selector'], where 'selector' is the selector identifies the element to which the box effect is applied.

The box_out construct, <box_out selector=" "/>, has the required attribute selector. Given the elements matching the CSS selector, or xpath:(xpath), the box out construct may apply CSS3 visual transform box inverse-outline effect (or shadow all but the element) on the elements. The markdown equivalent of the box out construct is: [box_out 'selector'], where 'selector' identifies the element to which the inverse-outline effect is applied.

The organizer construct, <organizer>, has no attributes. Given one or more topic elements, the organizer construct may configure a sidebar organizer to track the progress through a list of topics. The markdown equivalent of the organizer construct is: [organizer].

The topic construct, <topic id=" " l>, has the required attribute id and the optional attribute title. Given a required id, and optional title, the topic construct may allow embedding the id and the title to build a sidebar organizer. When the title attribute is omitted, the id attribute is a referential key to a DITA document and topic. The markdown equivalent of the topic construct is: [topic 'id']. The markdown equivalent of the topic construct is: [topic 'id'].

Figure 25:
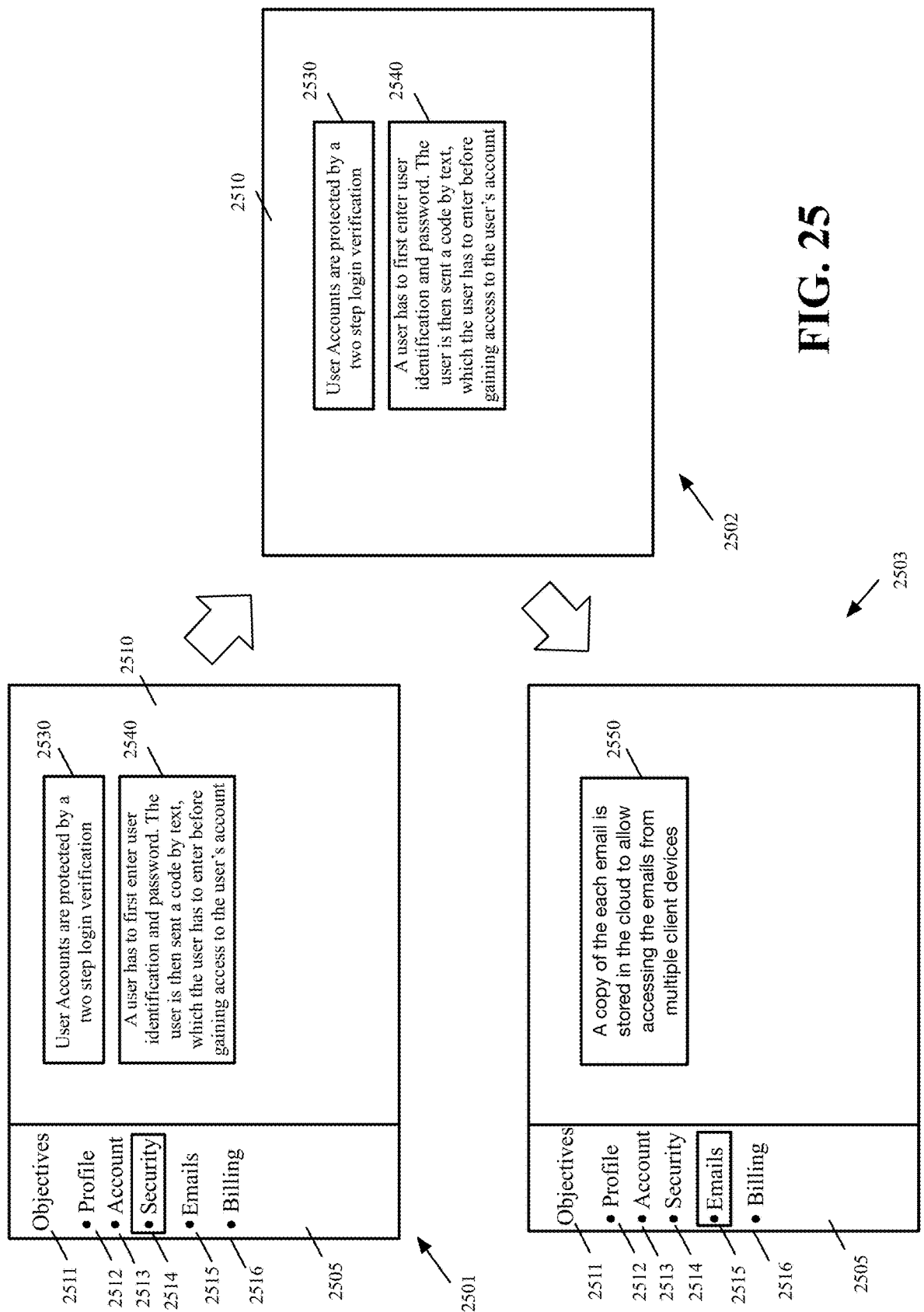
FIG. 25 is a schematic front view of the display of a client device that shows a sidebar organizer, according to various aspects of the present disclosure.

The organizer_show construct, <organizer_show/>, may show the topic organizer, for example, as shown in stage 2501 or stage 2503 of FIG. 25. The organizer_show construct has no attributes. The markdown equivalent of the organizer_show construct is: [organizer_show].

The organizer_hide construct, <organizer_hide/>, may hide the topic organizer, for example, as shown in stage 2502 of FIG. 25. The organizer_hide construct has no attributes. The markdown equivalent of the organizer_hide construct is: [organizer_hide].

The organizer next construct, <organizer next/>, may show and advances the highlight on the topic organizer. The organizer next construct has no attributes. The markdown equivalent of the organizer next construct is: [organizer next].

The circle construct, <circle radius=" "/>, has the required attribute radius and the optional attributes time, clockwise, and mirror. The circle construct may circle the mouse for [time] milliseconds, within [radius]px. The clockwise attribute determines the directionality of the circle motion. When the clockwise is attribute is true, the circle animation may move clockwise. When the clockwise is attribute is false, the circle animation may move counter-clockwise. When the mirror attribute is true, the motion the circle construct does may be reversed in a second pass. The markdown equivalent of the circle construct is: [circle radius].

The swirl construct, <swirl/>, has the optional attributes time, quantum, and mirror. The swirl construct may swirl the mouse by the specified number of times. When the mirror attribute is true, the motion the swirl construct does may be reversed in a second pass. The quantum attribute may cause the followings: as the swirl animation moves, once the animation has reached a 360 degree pass, the animation may reverse direction and may go the opposite way, and then completes back to the beginning (e.g., to 0 degrees) and reverses course again. This sequence may repeat until the animation is complete. The markdown equivalent of the swirl construct is: [swirl].

The quick_swirl construct, <quick_swirl/>, has the optional attributes clockwise, quantum, and mirror. The quick_swirl construct may swirl the mouse quickly. When the clockwise is attribute is true, the quick_swirl animation may move clockwise. When the clockwise is attribute is false, the quick_swirl animation may move counter-clockwise. The quantum attribute may cause the followings: as the quick_swirl animation moves, once the animation has reached a 360 degree pass, the animation may reverse direction and may go the opposite way, and then completes back to the beginning (e.g., to 0 degrees) and reverses course again. This sequence may repeat until the animation is complete. When the mirror attribute is true, the motion the quick_swirl construct does may be reversed in a second pass. The markdown equivalent of the quick_swirl construct is: [quick_swirl].

The long_swirl_in construct, <long_swirl_in/>, has the optional attributes mirror, quantum, and clockwise. The quick_swirl construct may swirl the mouse in slowly. The markdown equivalent of the long_swirl_in construct is: [long_swirl_in].

The long_swirl_out construct, <long_swirl_out/>, has the optional attributes clockwise, quantum, and mirror. The long_swirl_out construct may swirl the mouse in slowly. The markdown equivalent of the long_swirl_out construct is: [long_swirl_out].

The spaz construct, <spaz time=" "/>, has the required attribute time and the optional attribute box. The spaz time construct may squiggle the mouse for [time] milliseconds, within a [box]px bounding box. The markdown equivalent of the spaz construct is: [spaz time], where time is the squiggle time in milliseconds.

The start_recording construct, <start_recording/>, may instruct the rendering engine to begin recording the spiel. From this moment forward, the timeline begins, and all closed captioning (also referred to as WebVTT) timecode sequences are based off this start time. The start_recording construct has no attributes. The markdown equivalent of the start_recording construct is: [start_recording]. An optional <title> Video Title</title> or Markdown: [title Video Title] may be added between start_recording and stop_recording. If the document contains more than one pair of start_recording and stop_recording tags, then the title marking is required to name each of the videos which are generated from the document.

The stop_recording construct, <stop_recording/>, may instruct the rendering engine to stop recording the spiel. The stop_recording construct has no attributes. The markdown equivalent of the stop_recording construct is: [stop_recording].

The encode construct, <encode/>, has no attributes. The encode construct, when in publish mode, may instruct the encoder to begin encoding the master video file into MP4, and/or M3U8 streaming playlists. The markdown equivalent of the encode construct is: [encode].

The fade_in construct, <fade_in/>, has no attributes. The fade_in construct may instruct the rendering engine to fade-in from a 100% black screen. The markdown equivalent of the fade_in construct is: [fade_in].

The fade_out construct, <fade_out/>, has no attributes. The fade_out construct may instruct the rendering engine to fade-out to a 100% black screen. The markdown equivalent of the fade_out construct is: [fade_out].

The blur_in construct, <blur_in/>, has no attributes. The blur_in construct may instruct the rendering engine to transition in from a 100% blurred screen. The markdown equivalent of the blur_in construct is: [blur_in].

The blur_out construct, <blur_out/>, has no attributes. The blur_out construct may instruct the rendering engine to transition out to a 100% blurred screen. The markdown equivalent of the blur_out construct is: blur_out].

The console construct, <console/>, has no attributes. The console construct may be used for debugging. The console construct shows the Chrome DevTools console in the preview window or rendered video. The markdown equivalent of the console construct is: [console].

The terminal_init construct, <terminal_init/>, has the optional attributes type, username, password, expect, and quadrant. The terminal_init construct may initialize the SSH or Telnet session on a client system. The type attribute defines SSH or Telnet and defaults to SSH. The username, password, and expect attributes may be supplied in the client's global settings. If those global settings are not defined, the engine may fail without them provided inline. The expect attribute may block the execution of the engine until the given pattern is returned in the terminal session. The quadrant attribute may accept an attribute of [1-9] and may display the quasi-terminal window in the given screen region. For example, quadrant "6" is on the right side of the screen and vertical-centered. The markdown equivalent of the terminal_init construct is: [terminal_init host.com username pass], where host.com is the host address, username is the username, and pass is the password.

The terminal construct, <terminal>, has the optional attributes expect and timeout. The body of the terminal construct may be sent to the terminal session with newlines preserved. A newline may be automatically sent at the end of the input. It's rare to send newlines in this input, but "heredoc" syntax, or newlines continued with "\" would work. The optional "expect" tag may block the rendering engine from continuing until the given string is displayed in stdout or stderr. The markdown equivalent of the terminal construct is: [terminal 'parameters'], where the parameters are typed into the terminal, for example, the parameters may be "ls-tl\n".

Figure 8:
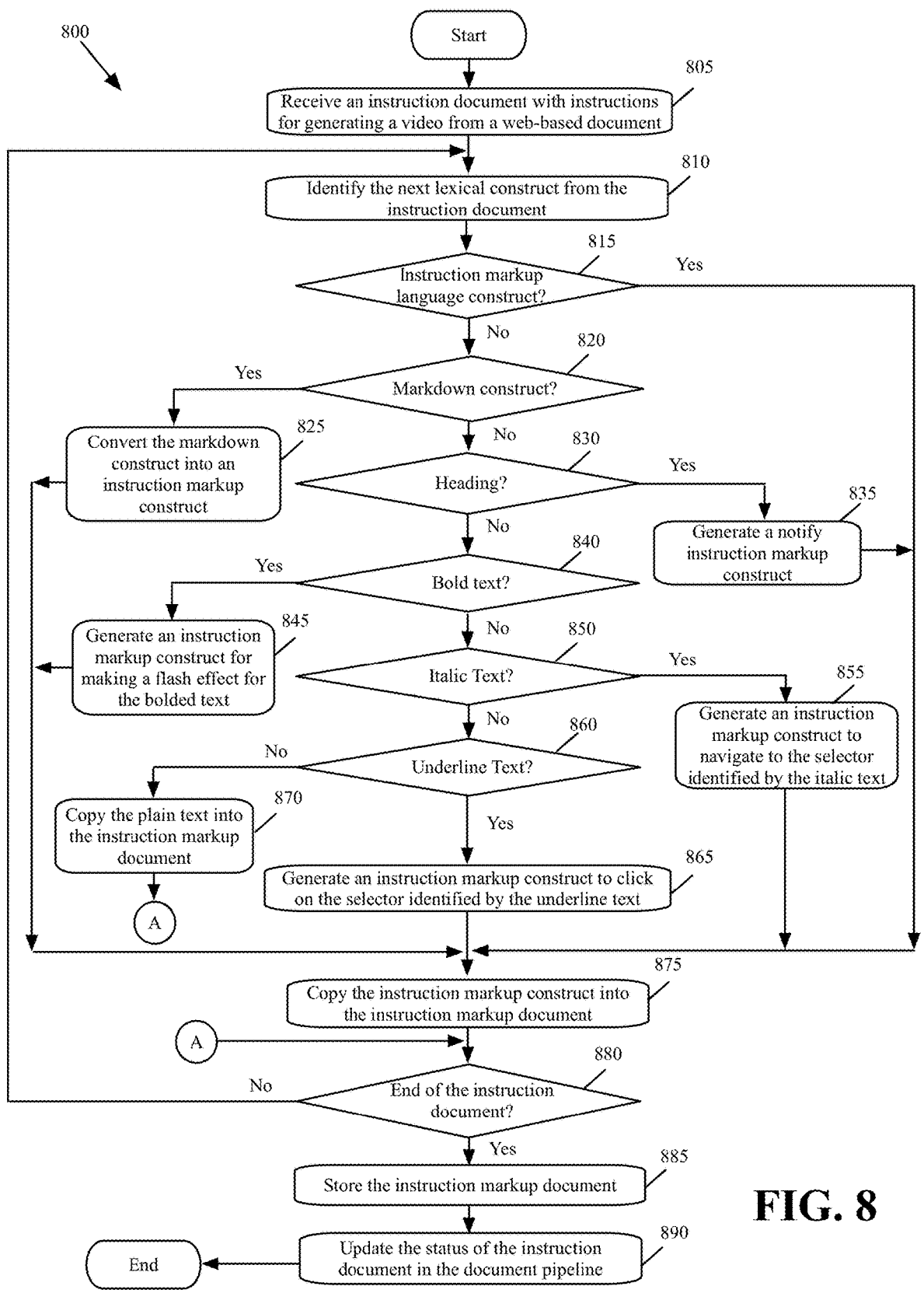
FIG. 8 is a flowchart illustrating an example process for ingesting instruction documents, according to various aspects of the present disclosure.

FIG. 8 is a flowchart illustrating an example process 800 for ingesting instruction documents, according to various aspects of the present disclosure. The process 800, in some of the present embodiments, may be performed by a processing unit of a computing device (e.g., one of the servers 151 of FIG. 1B) that implements the ingester 120 of FIG. 2A.

With reference to FIG. 8, an instruction document may be received (at block 805) with instructions for generating a video from a web-based document. For example, the ingester 120 of FIG. 2A may receive an instruction document such as the free-form text document 201, the markdown document 202, the DITA document 203, etc.

The next lexical construct in the instruction document may be identified (at block 810). For example, the ingester 120 may scan the instruction document and may identify the next lexical construct in the instruction document.

A determination may be made (at block 815) whether the lexical construct is an instruction markup language construct. For example, a determination may be made whether the lexical construct is a spiel language construct. When the lexical construct is an instruction markup language construct, the processing may proceed to the block 875, which is described below. Otherwise, a determination may be made (at block 820) whether the lexical construct is a markdown construct. When the construct is a markdown construct, the process may convert (at block 825) the markdown construct into an instruction markup construct. For example, the ingester 120, may convert the markdown construct to a spiel construct as described above with reference to FIG. 2A. The processing may the proceed to block 875, which is described below.

When the lexical construct is not a markdown construct, a determination may be made (at block 830) whether the construct is a heading. When the lexical construct is a heading, a notify instruction markup construct may be generated (at block 835). For example, the ingester 120 of FIG. 2A may generate a <notify> construct as described above with reference to FIG. 2A. The processing may then proceed to block 875, which is described below.

When the lexical construct is not a heading, a determination may be made (at block 840) whether the lexical construct is bold text. When the lexical construct is bold text, an instruction markup construct for making a flash effect for the bolded text may be generated (at block 845). For example, the ingester 120 may generate a <flash> construct as described above with reference to FIG. 2A. The processing may then proceed to block 875, which is described below.

When the lexical construct is not bold text, a determination may be made (at block 850) whether the lexical construct is italic text. When the lexical construct is italic text, an instruction markup construct for navigating to the selector identified by the italicized text may be generated (at block 855). For example, the ingester 120 may generate a <mouse_to > construct as described above with reference to FIG. 2A. The processing may then proceed to block 875, which is described below.

When the lexical construct is not italic text, a determination may be made (at block 860) whether the construct is underlined text. When the lexical construct is underline text, an instruction markup construct for clicking on the selector identified by the underlined text may be generated (at block 865). For example, the ingester 120 may generate a <click> construct as described above with reference to FIG. 2A. The processing may then proceed to block 875, which is described below.

When the lexical construct is not underline text, the plain text may be copied (at block 870) into the instruction markup document. For example, when there is no explicit annotation, such as heading, bold, italic, or, underline, the unannotated plain text may be copied by the ingester 120 into the instruction markup document. As described below with reference to FIG. 9, the plain text may be enhanced by the behavioral enhancer 125.

At block 875, the instruction markup construct may be copied into the instruction markup document. For example, the ingester 120 may copy the instruction markup construct into the instruction markup document 102. A determination may be made (at block 880) whether the end of the instruction document is reached. If the end of the instruction document is not reached, the processing may then proceed to block 810, which was described above. Otherwise, the instruction markup document may be stored (at block 885). For example, the ingester 120 may store the instruction markup document 102 into the instruction markup storage 111.

The status of the instruction document in the pipeline may be updated (at block 890). For example, the ingester 120 may update the document status 104 in the documents' status storage 221. The processing may then end.

Figure 9:
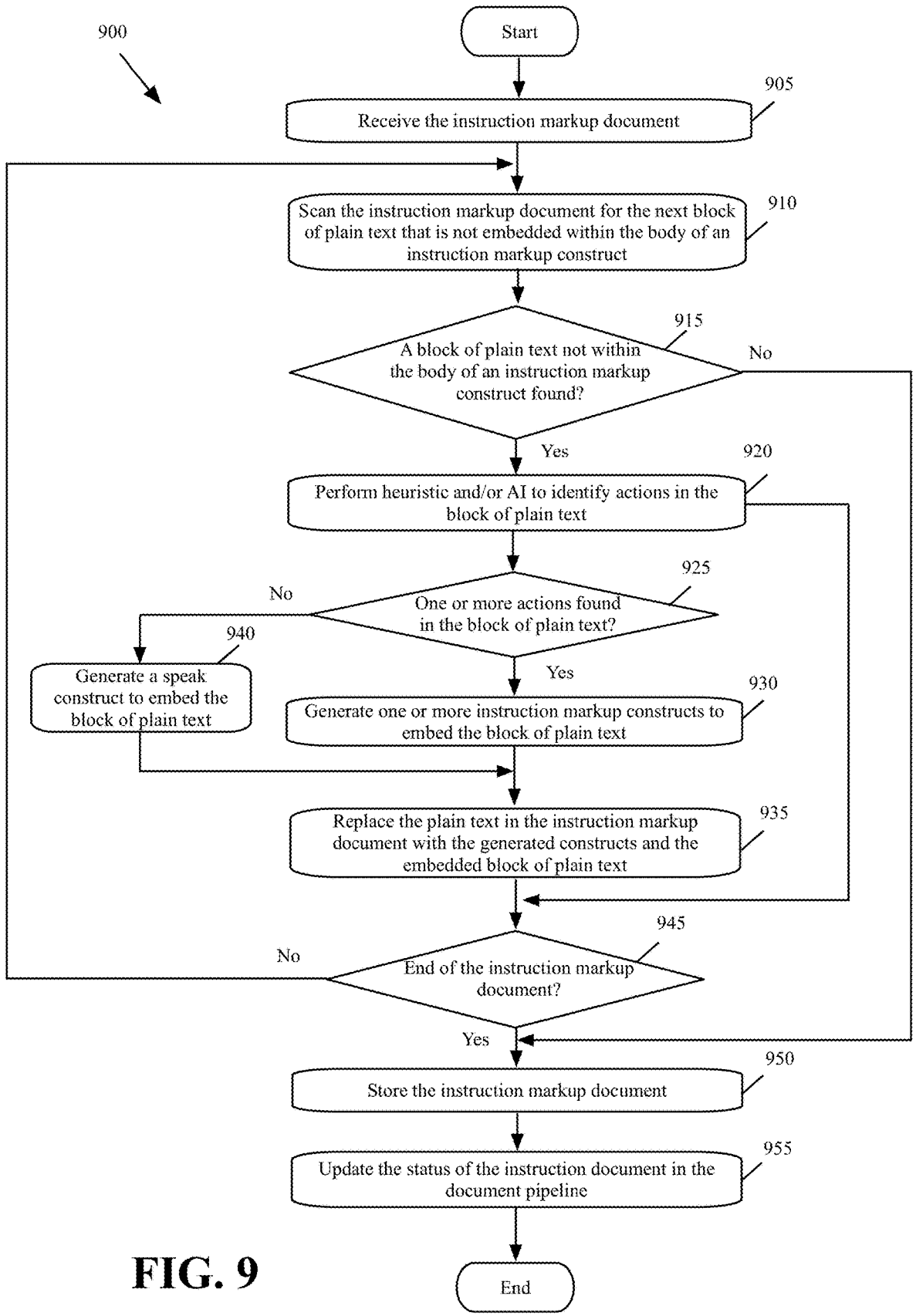
FIG. 9 is a flowchart illustrating an example process for enhancing an instruction markup document, according to various aspects of the present disclosure.

FIG. 9 is a flowchart illustrating an example process 900 for enhancing an instruction markup document to find actions for blocks of plain text, according to various aspects of the present disclosure. The process 900, in some of the present embodiments, may be performed by a processing unit of a computing device (e.g., one of the servers 151 of FIG. 1B) that implements the behavioral enhancer 125 of FIG. 2A.

With reference to FIG. 9, an instruction markup document may be received (at block 905). For example, the behavioral enhancer 125 of FIG. 2C may receive the instruction markup document 102. The instruction markup document 102 may have been generated either by the ingester 120 (FIG. 2A) or may have been received from a user (as shown by the arrow 191). For example, the instruction markup document 102 may include blocks of plain text that the ingester 120 (FIG. 2A) was not able to resolve, or a user-defined instruction markup document 102 may include blocks of plain text that are not embedded within any instruction markup constructs.

With further reference to FIG. 9, the instruction markup document may be scanned (at block 910) to identify the next block of plain text that is not embedded within the body of an instruction markup construct. For example, the behavioral enhancer 125 my scan the instruction markup document 102 to identify block of plain text that is not embedded within the body of an instruction markup construct other than the root construct.

A determination may be made (at block 915) whether a block of plain text that is not embedded within the body of an instruction markup construct is found in the instruction markup document. When a block of plain text that is not embedded within the body of an instruction markup construct is not found, the processing may proceed to block 950, which is described below.

Otherwise, heuristic and/or AI may be performed (at block 920) to identify actions in the block of plain text. For example, the behavioral enhancer 125 may identify one or more actions in the block of plain text, as described above with reference to FIG. 2C.

Next, a determination may be made (at block 925) whether one or more actions are found in the block of plain text. When one or more actions are not found in the block of plain text, a speak construct may be generated (at block 940) to embed the block of plain text. For example, as described above with reference to FIG. 2C, when no actions can be found in the block of plain text, the behavioral enhancer 125 may embed the block of text within the body of a speak construct. The processing may then proceed to block 935, which is described below.

When one or more actions are found in the block of plain text, one or more instruction constructs may be generated (at block 930) to embed the block of plain text. The plain text in the instruction markup document may be replaced (at block 935) with the generated constructs and the embedded block of plain text.

Next, a determination may be made (at block 945) whether the end of the instruction markup document is reached. When the end of the instruction markup document is not reached, the processing may then proceed to block 910, which was described above.

Otherwise, the instruction markup document may be stored (at block 950). For example, the behavioral enhancer 125 may store the instruction markup document 102 into the instruction markup storage 111. The status of the instruction document in the pipeline may be updated (at block 955). For example, the behavioral enhancer 125 may store the document status 105 into the documents' status storage 221. The processing may then end.

Figure 10:
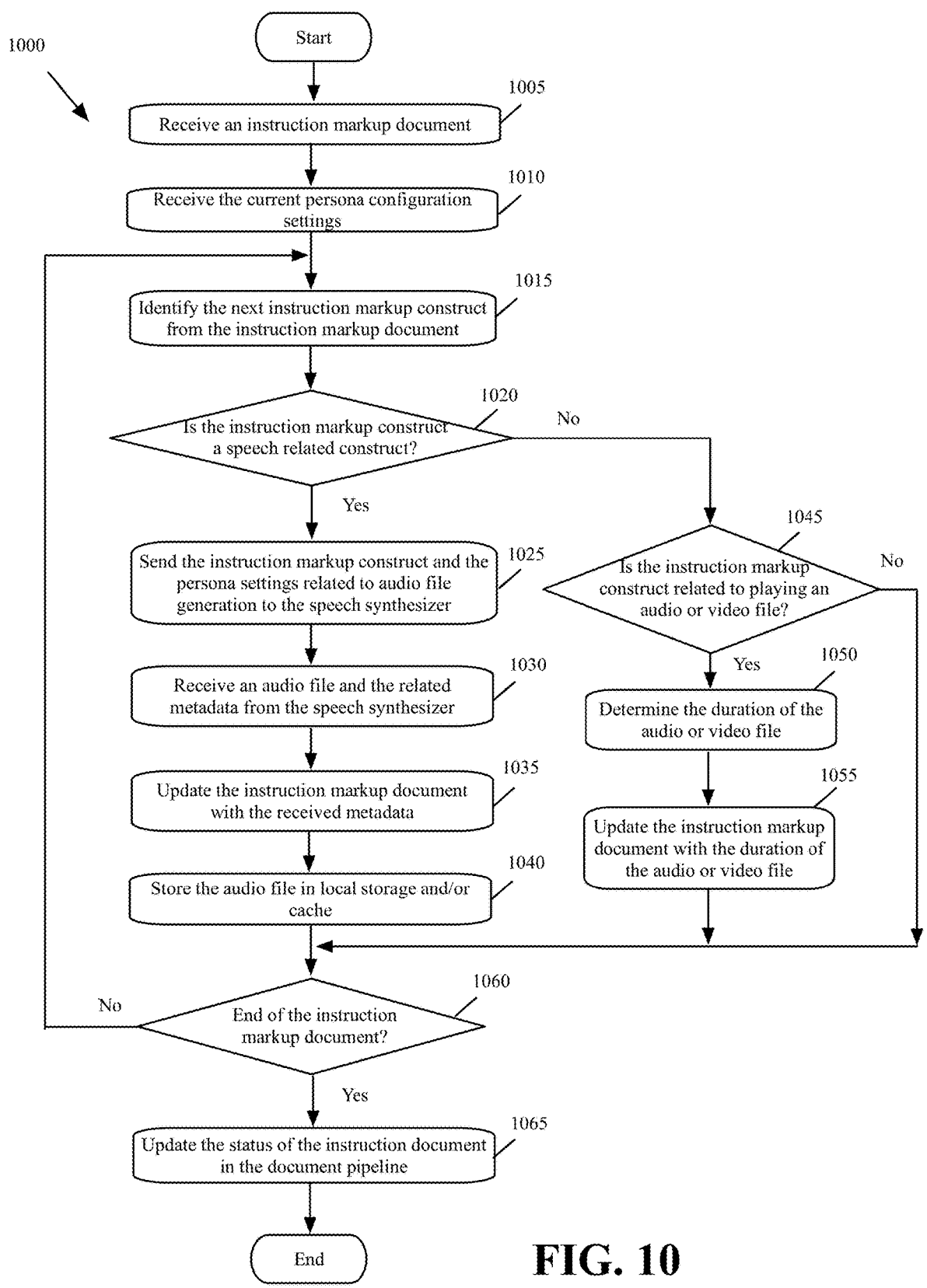
FIG. 10 is a flowchart illustrating an example process for pre-processing an instruction markup document to generate one or more audio files, according to various aspects of the present disclosure.

FIG. 10 is a flowchart illustrating an example process 1000 for pre-processing an instruction markup document to generate one or more audio files, according to various aspects of the present disclosure. The process 1000, in some of the present embodiments, may be performed by a processing unit of a computing device (e.g., one of the servers 152 of FIG. 1B) that implements the pre-processor 130 of FIG. 2D.

With reference to FIG. 10, an instruction markup document may be received (at block 1005). For example, the pre-processor 130 may receive the instruction markup document 102. At block 1010, the current persona configuration setting may be received. For example, the pre-processor 130 may receive the persona configuration 205. The persona configuration may be set for each rendering job, per user's logging account, per client with multiple user logging accounts, etc.

FIG. 11 illustrates examples of the persona settings, according to various aspects of the present disclosure. The table 1100 shows the names 1105, the values 1110, and notes 1115 for several examples of persona settings 1121-1141. The persona settings control different aspects of videos generated by the present embodiments. For example, the cursor color 1121, the cursor diameter 1122, the mouse 1123, the mouse destination offset 1128, the mouse trails count 1129, the mouse trail lifetime 1130, and the mouse acceleration factor 1131 personas control different characteristics, such as the shape, color, and movements, of a displayed cursor.

The language persona 1124 controls the language and the locale for the generated video. The voice 1125, the voice engine 1126, the mouse clicks 1127, the keyboard sounds 1132, the page navigation sound 1140, and the page load sound 1141 personas control the persona for the generated audio. The keyboard typematic rate 1133 controls the average character per second for typing operations. The highlight color(s) 1134 and the flash color 1135 personas specify the color of the highlights and flash effects. The subtitles 1136 and the subtitle languages 1137 control the properties of the subtitle files. The component font 1138 persona controls the font used for on-screen components and overlays.

With reference to FIG. 10, the next instruction markup construct from the instruction markup document may be identified (at block 1015). For example, the pre-processor 130 of FIG. 2D may identify the next instruction markup construct (e.g., a construct shown in FIG. 7) in the instruction markup document 102. Next, a determination may be made (at block 1020) whether the instruction markup construct is a speech related construct. For example, the pre-processor 130 may determine whether the instruction markup construct is a <speak> construct.

When the instruction markup construct is not a speech related construct, the processing may proceed to block 1045, which is described below. Otherwise, the instruction markup construct and the persona settings related to audio file generation may be sent (at block 1025) to the speech synthesizer. For example, the pre-processor 130 may send the speech related tags 206 and the persona configuration 205 to the speech synthesizer, as described above with reference to FIG. 2D.

Next, an audio file and the related metadata may be received (at block 1030) from the speech synthesizer 220. For example, the pre-processor 130 may receive the audio file 104 and the associated metadata 213 from the speech synthesizer 220. The metadata may provide information for the start and/or the duration of each sentence, the start and/or the duration of groups of sentences etc.

Next, the instruction markup document may be updated (at block 1035) with the received metadata. For example, the pre-processor 130 may use the metadata 213 and may update the (e.g., to add the start and/or the duration of each sentence or each group of sentences).

The audio file may be stored (at block 1040) in local storage and/or cache. For example, the pre-processor 130 may store the audio file 104 in the audio file storage 112. In order to make the audio files quickly accessible during the rendering process, the audio files may be stored in high-speed storage and/or local cache. The processing may then proceed to block 1060, which is described below.

When the instruction markup construct is not a speech related construct, a determination may be made (at block 1045) whether the instruction markup construct is related to playing an audio or video file. For example, the pre-processor 130 may determine whether the instruction markup construct is a <play/> construct. When the instruction markup construct is not related to playing an audio or video file, the processing may then proceed to block 1060, which is described below.

Otherwise, the duration of the audio or video file may be determined (at block 1050). Next, the instruction markup document may be updated (at block 1055) with the duration of the audio or video file. For example, the pre-processor 130 may determine the duration of the audio or video file and may update the play construct to add the duration of the file, as described above with reference to FIG. 2D.

At block 1060, a determination may be made whether the end of the instruction markup document is reached. When the end of the instruction markup document is not reached, the processing may then proceed to block 1015, which was described above.

Otherwise, the status of the instruction document in the pipeline may be updated (at block 1065). For example, the pre-processor 130 may store the document status 105 into the documents' status storage 221. The processing may then end.

Figure 12A:
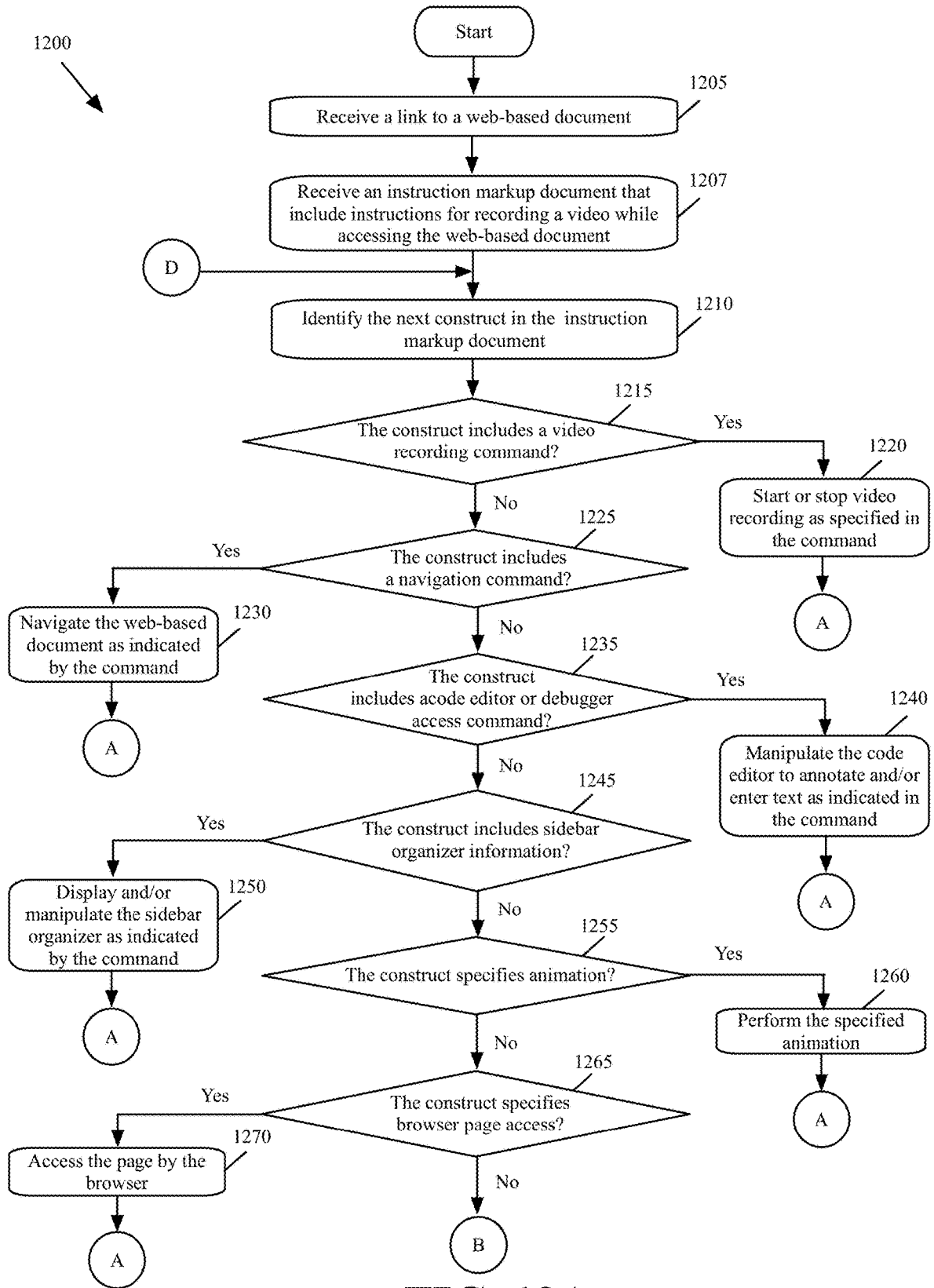
FIGS. 12A, 12B, and 12C are a flowchart illustrating an example process for rendering a video file from a web-based document using the instruction in an instruction markup document, according to various aspects of the present disclosure.
Figure 12B:
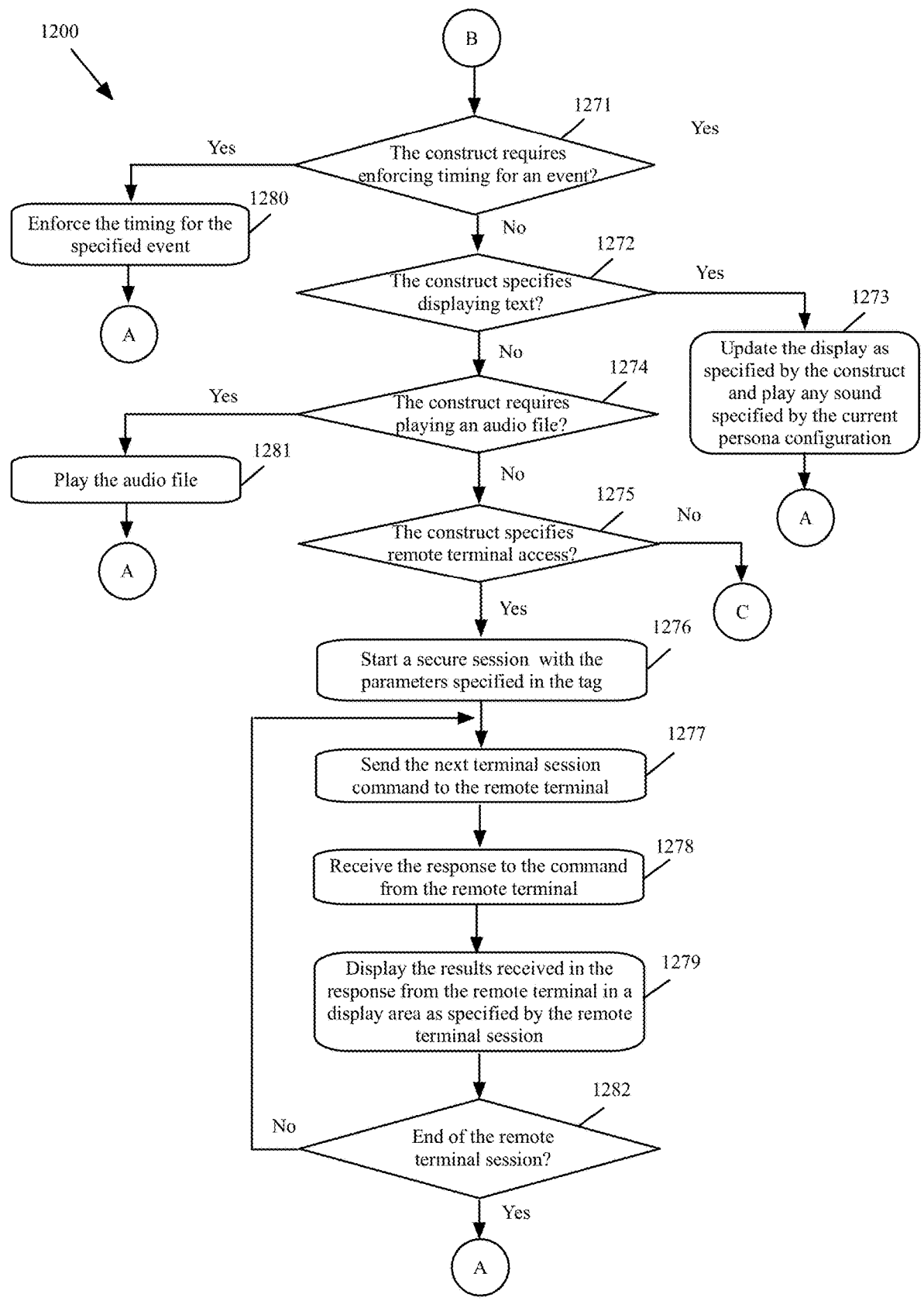
Figure 12C:
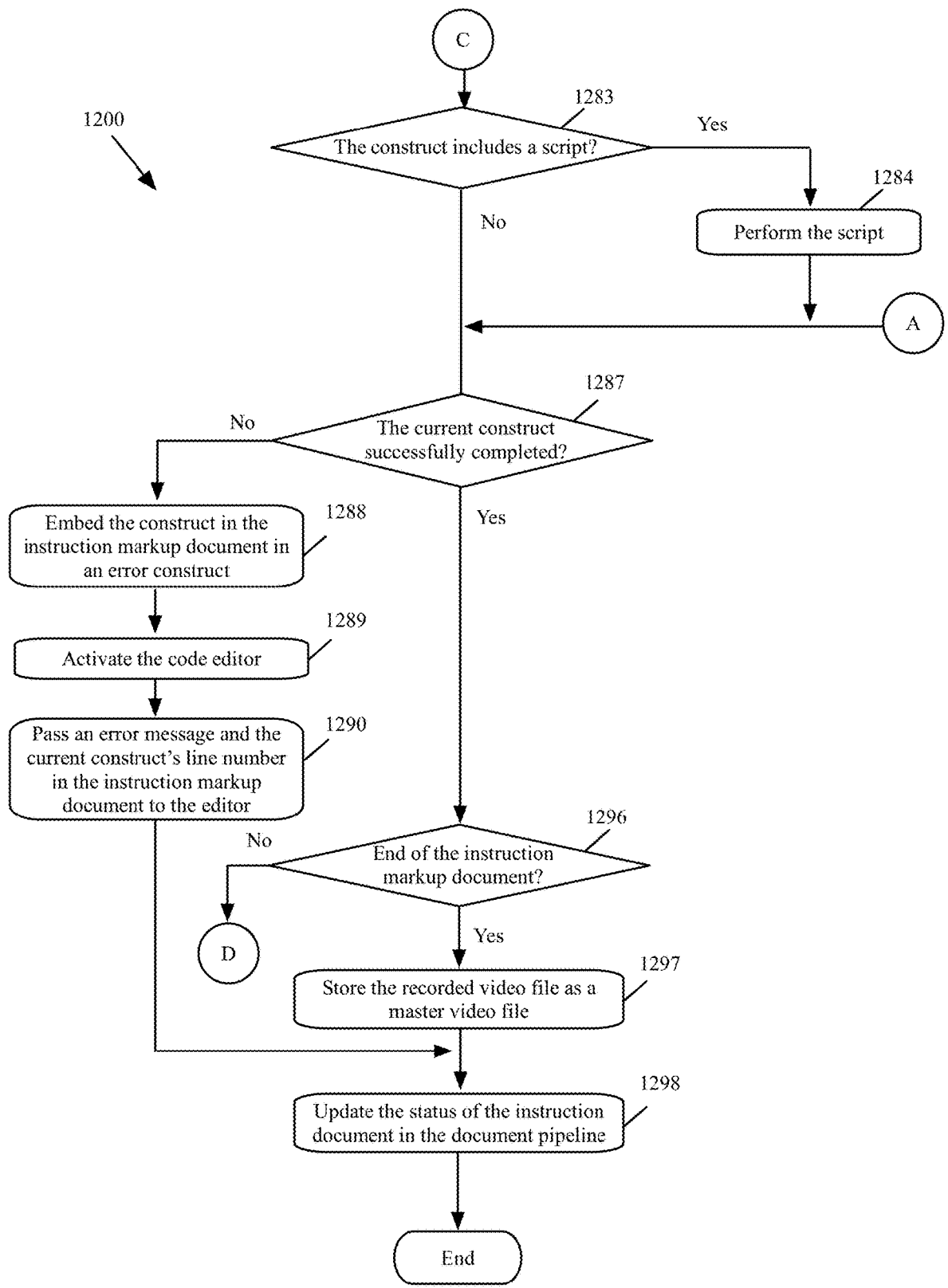

FIGS. 12A-12C are a flowchart illustrating an example process 1200 for rendering a video file from a web-based document using the instruction in an instruction markup document, according to various aspects of the present disclosure. The process 1200, in some of the present embodiments, may be performed by a processing unit of a computing device (e.g., one of the servers 153 of FIG. 1B) that implements the rendering engine 135 of FIG. 2E.

With reference to FIG. 12A, a link to a web-based document may be received (at block 1205). For example, the rendering engine 135 may receive the weblink 121 to a web-based document when the rendering engine 135 of FIG. 2E receives a job from the rendering job queue 217. At block 1207, an instruction markup document that includes instructions for recording a video while accessing the web-based document may be received. For example, the rendering engine 135 may receive the instruction markup document 102.

The next construct in the instruction markup document may be identified (at block 1210). For example, the rendering engine 135 may scan the instruction markup document 102, and may identify the next instruction markup construct in the document.

A determination may be made (at block 1215) whether the construct includes a video recording command. When the construct includes a video recording command, video recording may be started or stopped (at block 1220) as specified in the command. For example, a video recording construct 725 such as the start_recording construct shown in FIG. 7 may cause the rendering engine 135 (FIG. 2E) to start recording the display screen of the computing device that is displaying the web-based document pointed by the weblink 121. A video recording construct 725 such as the stop_recording construct shown in FIG. 7 may cause the rendering engine 135 to stop the recording. The processing may then proceed to block 1287, which is described below.

When the construct does not include a video recording command, a determination may be made (at block 1225) whether the construct includes a navigation command. When the construct includes a navigation command, the web-based document is navigated (at block 1230) as specified by the command. For example, a screen navigation/page actions construct 722, such as the mouse_to construct, the mouse_move construct, the move_by construct, the mouse_arc construct, the mouse_settings construct, the scroll_into_view construct, the scroll_to construct, the scroll_by construct, or the click construct shown in FIG. 7 may cause the browser used by the rendering engine 135 of FIG. 2E to navigate the web-based document as specified by the construct and may update the display of the computing device that is displaying the web-based document. The processing may then proceed to block 1287, which is described below.

When the construct does not include a navigation command, a determination may be made (at block 1235) whether the construct includes a code editor or debugger access command. When the construct includes a code editor or debugger access, the code editor may be manipulated (at block 1240) to annotate and/or enter text as indicated in the command.

For example, a code editor component/debugger access construct 723 such as the monaco construct, the monaco_line construct, the monaco_clear the construct, the monaco_click construct, the exit construct, the exit_for construct, or the console construct shown in FIG. 7 may cause the browser to invoke a code editor such as, for example, and without limitations, the Microsoft® Monaco code editor to perform the operation specified by the construct. The processing may then proceed to block 1287, which is described below.

When the construct does not include a code editor or debugger access, a determination may be made (at block 1245) whether the construct includes sidebar organizer information. When the construct includes sidebar organizer information, the browser may display and/or manipulate (at block 1250) a sidebar organizer as indicated in the command. For example, a side bar organizer construct 724 such as the organizer construct, the topic construct, the organizer_show construct, the organizer_hide construct, or the organizer_next construct shown in FIG. 7 may cause the browser to display and/or manipulate a sidebar organizer is described further below with reference to FIG. 25. The processing may then proceed to block 1287, which is described below.

When the construct does not include sidebar organizer information, a determination may be made (at block 1255) whether the construct specifies animation. When the construct specifies animation, the specified animation may be performed (at block 1260). For example, a screen animation construct 721 such as the circle construct, the swirl construct, the quick_swirl construct, the long_swirl construct, the long_swirl_out construct, the spaz construct, the fade_in construct, the fade_out construct, the blur_in construct, or the blur_out construct shown in FIG. 7 may cause the browser to perform the specified animation on the screen. The processing may then proceed to block 1287, which is described below.

When the construct does not specify animation, a determination may be made (at block 1265) whether the construct specifies browser page access. When the construct specifies browser page access, the page specified by the construct may be accessed (at block 1270) by the browser. For example, a browser page access construct 727 such as the url construct or the portal construct shown in FIG. 7 may cause the browser to access the specified webpage and update the display. The processing may then proceed to block 1287, which is described below.

When the construct does not specify browser page access, a determination may be made (at block 1271) whether the construct requires to enforce timing for an event. When the construct requires enforcing timing for an event, the processing may enforce (at block 1271) the timing for the specified event.

For example, a timeout/wait construct 729 such as the timeout construct, the wait for construct, or the break construct shown in FIG. 7 may cause the rendering engine 135 to enforce the timing for the specified event. The <timeout seconds="n"/> construct instructs rendering engine 135 to exit the rendering process if not completed in n. The rendering engine 135 may start a countdown counter of n seconds when the <timeout seconds="n"/> is encountered in the instruction markup document. The enforcement of the timeout, in some embodiments, may be performed outside the loop of blocks 1210-1296 of FIGS. 12A-12C, which runs the rendering engine commands. For example, the expiration of the countdown counter may immediately force the termination of the rendering engine process to avoid an endless loop.

The break construct, <break time="n"/>, instructs the rendering engine to wait for n-milliseconds. The <wait_for selector="selector_n"/> construct, instructs engine to block the timeline until the given selector_n is discovered. The wait_for selector construct may be used to ensure that events do not run over each other during the rendering process, by waiting for a specific HTML, element to become visible on-screen before continuing. The selector_n may be a displayed item and the <wait_for selector="selector_n"/> ensures that the item is displayed on the screen before the rendering engine proceeds. For example, moving the mouse may take 50 milliseconds if the mouse is moved next to where the mouse was located. But it may take 700 milliseconds to a full seconds if the mouse is going to move across the whole screen. There is, therefore, a variable amount of time for every action.

The wait_for construct is a variable-length break, which just waits for elements to show up, and become actionable. As another example, an item may be clicked which may cause the page to navigate, or may cause a fetch for remote data in order to render a modal dialog. During this time, there may be a blank or incomplete screen. The rendering engine 135 must wait until the operation is complete in order to continue. Therefore, the wait_for is used to explicitly wait for an element that is anticipated to be acted upon, before calling action upon it. The wait_for selector ensures that the rendering engine 135 does not continue until the given selector becomes available.

When the construct does not require enforcing timing for an event, a determination may be made (at block 1272) whether the construct specifies displaying text. When the construct specifies displaying text, the specified text may be displayed (at block 1273) and any sound specified by the current persona configuration may be played. For example, a text display construct 731 such as the type construct, the send_key construct, the send_meta construct, the blur construct, the highlight construct, the highlight_off construct, the flash construct, the notify construct, or the soft_return construct shown in FIG. 7 may cause the rendering engine 135 to update the display as specified by the construct. When a construct such as, for example, the type construct requires typing text on the screen, the rendering engine 135 may also play any keyboard sounds specified in the persona configuration. The processing may then proceed to block 1287, which is described below.

When the construct does not specify displaying text, a determination may be made (at block 1274) whether the construct requires playing an audio file. When the construct requires playing an audio file, the audio file may be played (at block 1281). For example, an audio play construct 730 such as the speak construct or the play construct shown in FIG. 7 may cause the rendering engine 135 of FIG. 2E to play the audio file 104. The audio file may be stored in local storage and/or local cache. The processing may then proceed to block 1287, which is described below.

When the construct does not require playing an audio file, a determination may be made (at block 1275) whether the construct specifies remote terminal access. For example, a remote terminal access construct 728 shown in FIG. 7 such as the terminal_init construct or the terminal construct shown in FIG. 7 may cause the rendering engine 135 to start and/or communicate with a remote terminal as described above with reference to FIG. 2E and FIG. 7.

When the construct does not specify remote terminal access, the processing may process to block 1283, which is described below. Otherwise, a secure terminal session may be started (at block 1276) with the parameters specified in the construct. The secure terminal session may be, for example and with limitations, a session that uses the SSH protocol or the Telnet protocol.

The next terminal session command may be sent (at block 1277) to the remote terminal. For example, the rendering engine 135 (FIG. 2E) may establish the remote terminal session 295 with the remote electronic device 290. The response to the command may then be received (at block 1278) from the remote terminal. For example, the response may include data 208 (FIG. 2E).

The results received in the response from the remote terminal may be displayed (at block 1279) in a display area as specified by the remote terminal construct. Next, a determination may be made (at 1282) whether the remote terminal session has ended. If the remote terminal session has not ended, the processing may proceed to block 1277, which was described above. Otherwise, the processing may then proceed to block 1287, which is described below.

When the construct does not specify remote terminal access, a determination may be made (at block 1283) whether the construct includes a script. When the construct includes a script, the script may be performed (at block 1284). For example, the rendering engine 135 may perform the operations that are specified by the script construct. The processing may then proceed to block 1287, which is described below.

When the construct does not include a script, a determination may be made (at 1287) whether the current construct has been successfully completed. When the current construct has not been successfully completed, the construct in the instruction markup document may be embedded (at block 1288) in an error construct. For example, the rendering engine 135, in some embodiments may embed the construct that cannot be successfully completed within an error construct (or error tag). The error construct allows the error to be inspected and resolved by a human. An error tag may have the following format:

<error> <ambiguous_construct/> </error>, where <ambiguous_construct/> is the construct that cannot be successfully completed. The error tag may include an optional description attribute, which may be used to explain what needs to be resolved. For example:

<error description"There are more than one save buttons on this page">
<click selector="'Save'"/>
</error>

In the above example, the error tag includes a description attribute that explains the reason for the ambiguity (e.g., there are more than two save buttons on the page).

Next, the code editor may optionally be activated (at block 1289). An error message and the current construct's line number in the instruction markup document may be passed (at block 1290) to the editor. The processing may then proceed to block 1298, which is described below.

In some embodiments, the following actions may happen when the code editor is open (at block 1289), and a "preview" job is running (e.g., when the rendering engine is running the instruction markup document, and a window is launched which has a video player and a real-time view of the instruction markup document is running). When the rendering engine 135 is running, a pointer on the current instruction markup document construct (the current spiel tag) is kept in order to manage the current step. Each construct (or tag) in the instruction markup document may be considered a step. When the given step does not complete successfully, the given line number of the instruction markup document is noted, and an event is emitted to the code editor user interface. The line number and error message are provided in this event, and it is displayed in the code editor.

With further reference to FIG. 12, when the current construct has been successfully completed, a determination may be made (at block 1296) whether the end of the markup document is reached. When the end of the markup document is not reached, the processing may proceed back to block 1210, which was described above.

Otherwise, the recorded video file may be stored (at block 1297) as a master video file. For example, the rendering engine 135 of FIG. 2E may store the master video file 105 in the staging storage 113. The status of the instruction document in the pipeline may be updated (at block 1298). For example, the rendering engine 135 may store the document status 105 into the documents' status storage 221. If a construct was not successfully completed and was embedded (at block 1288) in an error construct, the rendering engine 135 may set the status of the instruction markup document 102 to "needs attention." The processing may then end.

In some embodiments, when the code editor is open (at block 1289 of FIG. 12C), and a "preview" job is running (e.g., when the rendering engine is running the instruction markup document, and a window is launched which has a video player and a real-time view of the spiel running) the following actions may happen.

When the rendering engine 135 is running, a pointer on the current instruction markup document construct (the current spiel tag) may be kept in order to manage the current step. Each construct (or tag) in the instruction markup document may be considered a step. When the given step does not complete successfully, the given line number of the instruction markup document is noted, and an event is emitted to the code editor user interface. The line number and error message are provided in this event, and it is displayed in the code editor.

FIG. 13 is a schematic front view of a portion of the display of a computing device displaying the code editor user interface 1305 identifying a line number in the instruction markup document that has not been successfully completed, according to various aspects of the present disclosure. With reference to FIG. 13, the user interface 1305 may include a display area 1315 for display an instruction markup document 1390. As shown, the line number 1310 of the instruction markup document 1390 where an error is detected is highlighted. An error icon 1320 may also be displayed to identify the location where the error has occurred.

With further reference to FIG. 13, the user interface 1305, in some embodiments, may include a display area 1340 for displaying timeline view. The timeline view 1340 may include a display area 1360 for displaying notify constructs, a display area 1370 for displaying spoken words in speak constructs, and a display area 1380 for displaying mark constructs.

For example, the notify construct 1331 corresponds to the line 1351 of the instruction markup document 1390. The spoken words 1332 and 1333 correspond to the lines 1352 and 1353 of the instruction markup document 1390, respectively. The spoken words 1334 and 1335 correspond to lines of the instruction markup document 1390 that are not currently displayed in the display area 1315. The spoken words 1332-1335 are the exact words being played during the rendering process. The timeline view 1340 may be scrolled horizontally and vertically by using the scroll bars 1361 and 1362, respectively.

The mark icons 1336-1338 correspond to the lines 1356-1358 of the instruction markup document 1390, respectively. The mark icon 1339 corresponds to a line number of the instruction markup document 1390 that is not currently displayed in the display area 1315. When a user selects (e.g., by clicking with a pointing device such as mouse) any of the items 1331-1339, the display area 1315 may scroll to display the corresponding line in the instruction markup document 1390.

FIG. 14 is a schematic front view showing the user interface of FIG. 13 after a detailed error message is shown for the construct that has not been successfully completed, according to various aspects of the present disclosure. With reference to FIG. 14, a detailed error message 1410 may be displayed when the cursor is moved over the error icon 1320.

Figure 15:
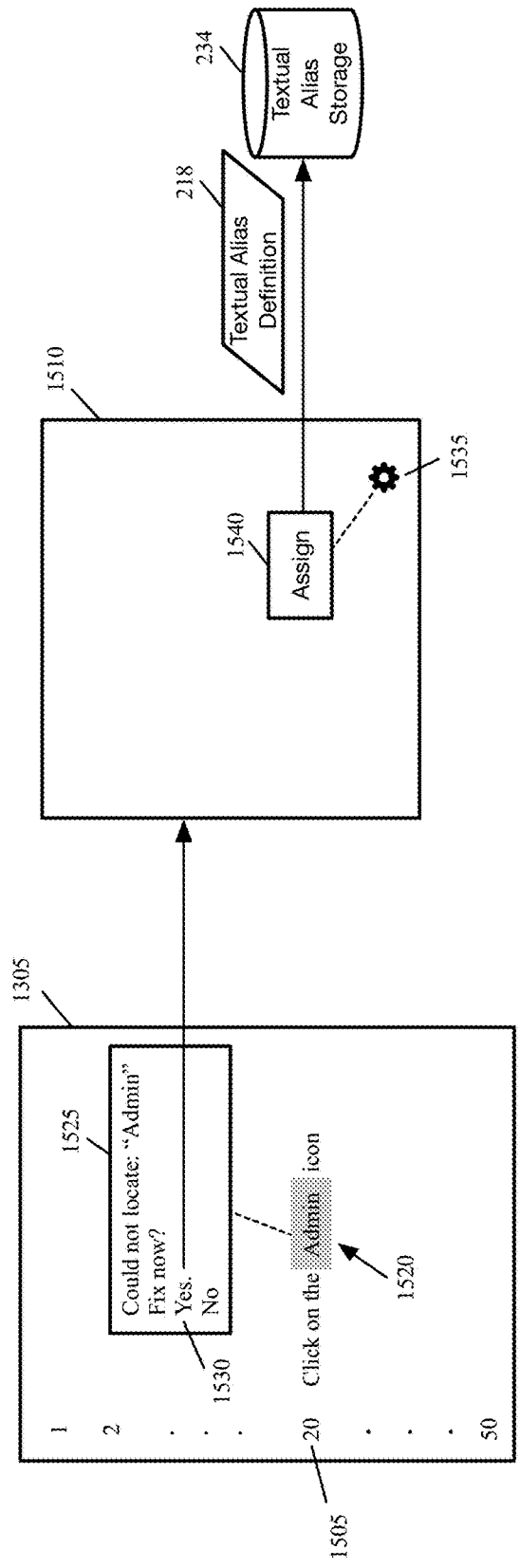
FIG. 15 is a functional diagram illustrating the reactive use of a browser extension to disambiguate the mapping of the elements of a digital product's user interface and the tokens in an instruction document, according to various aspects of the present disclosure.

FIG. 15 is a functional diagram illustrating the reactive use of a browser extension to disambiguate the mapping of the elements of a digital product's user interface and the tokens in an instruction document, according to various aspects of the present disclosure. When an instruction document fails during a preview, the code editor may be activated and the code editor window may indicate the failed line, and the author of the instruction document may use the browser to navigate to the user interface of the digital product, find the proper element, and in a displayed context window make a selection to "assign" the element to the failed selector.

In the example of FIG. 15, the code editor user interface 1305 has identified an unresolved token 1520 in a line of code 1505 in the instruction document. In the example of FIG. 15, the line of code indicates "Click on the Admin icon," where the digital product has no element named "Admin." The code editor my identify the ambiguous token, for example, by highlighting the ambiguous token. The code editor may display a message (e.g., in a pop up window 1525) indicating that the token "Admin" cannot be located in the digital product for which the video is being made. The code editor may provide an option 1530 to fix the ambiguity.

With further reference to FIG. 15, when the option 1530 is selected, the browser with a browser extension for fixing the mapping of the elements of a digital product's user interface and the tokens in the instruction document may be activated and display the digital product for which the video is being made. The browser may display a user interface 1510 for navigating through the pages of the digital product.

As shown, the person using the browser may identify and select the admin icon 1535 (e.g., and without limitations, by right clicking on the icon 1535). When the browser receives the selection of the element 1535 through the user interface 1510, the browser extension used for disambiguation may display an option 1540 to assign the selected element 1535 to the token 1520. After receiving a selection of the option 1540, the browser extension may save the mapping of the element 1535 to the token 1520 in textual alias definition document 218, which may be stored in the textual alias storage 234.

Figure 16:
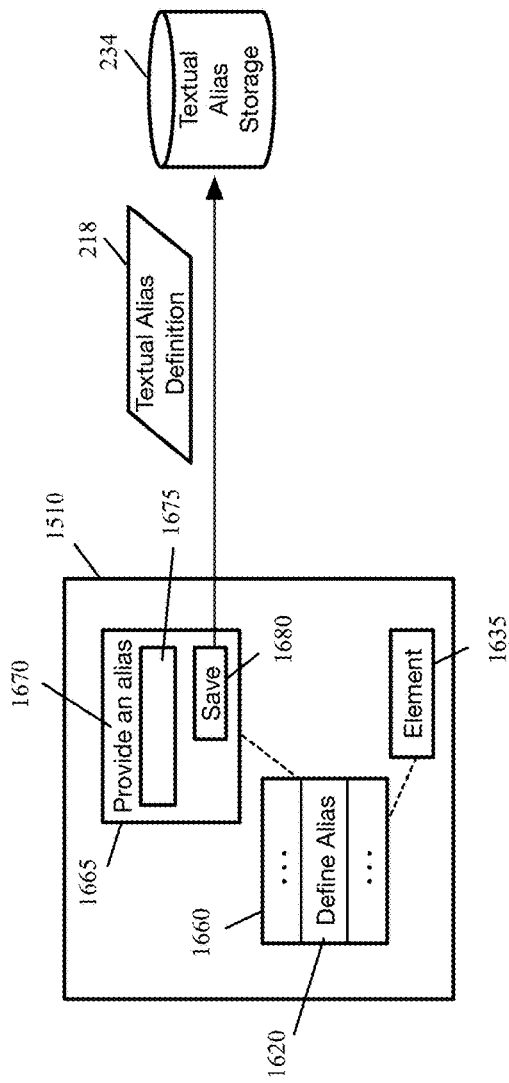
FIG. 16 is a functional diagram illustrating the proactive use of a browser extension to disambiguate the mapping of the elements of a digital product's user interface and the tokens in an instruction document, according to various aspects of the present disclosure.

FIG. 16 is a functional diagram illustrating the proactive use of a browser extension to disambiguate the mapping of the elements of a digital product's user interface and the tokens in an instruction document, according to various aspects of the present disclosure. During the preview of an instruction document 101 (FIG. 1A), a person may proactively user the browser to select elements in the user interface of a digital product and associate the element with a textual alias.

In the example of FIG. 16, the browser with the browser extension for fixing the mapping of the elements of a digital product's user interface and the tokens in an instruction document is activated. The browser may be used to display a user interface 1510 to navigate through the pages of a digital product for which a video is being made.

In the example of FIG. 16, an element 1635 may be selected (e.g., and without limitations, by right clicking on element icon 1635) to disambiguate. In response, the user interface 1510 may display a list 1660 of actions that may be performed on the selected element 1635. When the user interface 1510 receives a selection of the define alias action 1620, the user interface 1510 may display (e.g., and without limitations, using a pop up window 1665) a message 1670 to provide an alias.

The user interface 1510 may display a text area (or text box) 1675 for entering the text for the alias. The user interface 1510 may provide an option 1680 to save the mapping of the element 1635 to the alias entered in the text area 1675. The textual alias definition 218 may be stored in the textual alias storage 234.

Figure 17:
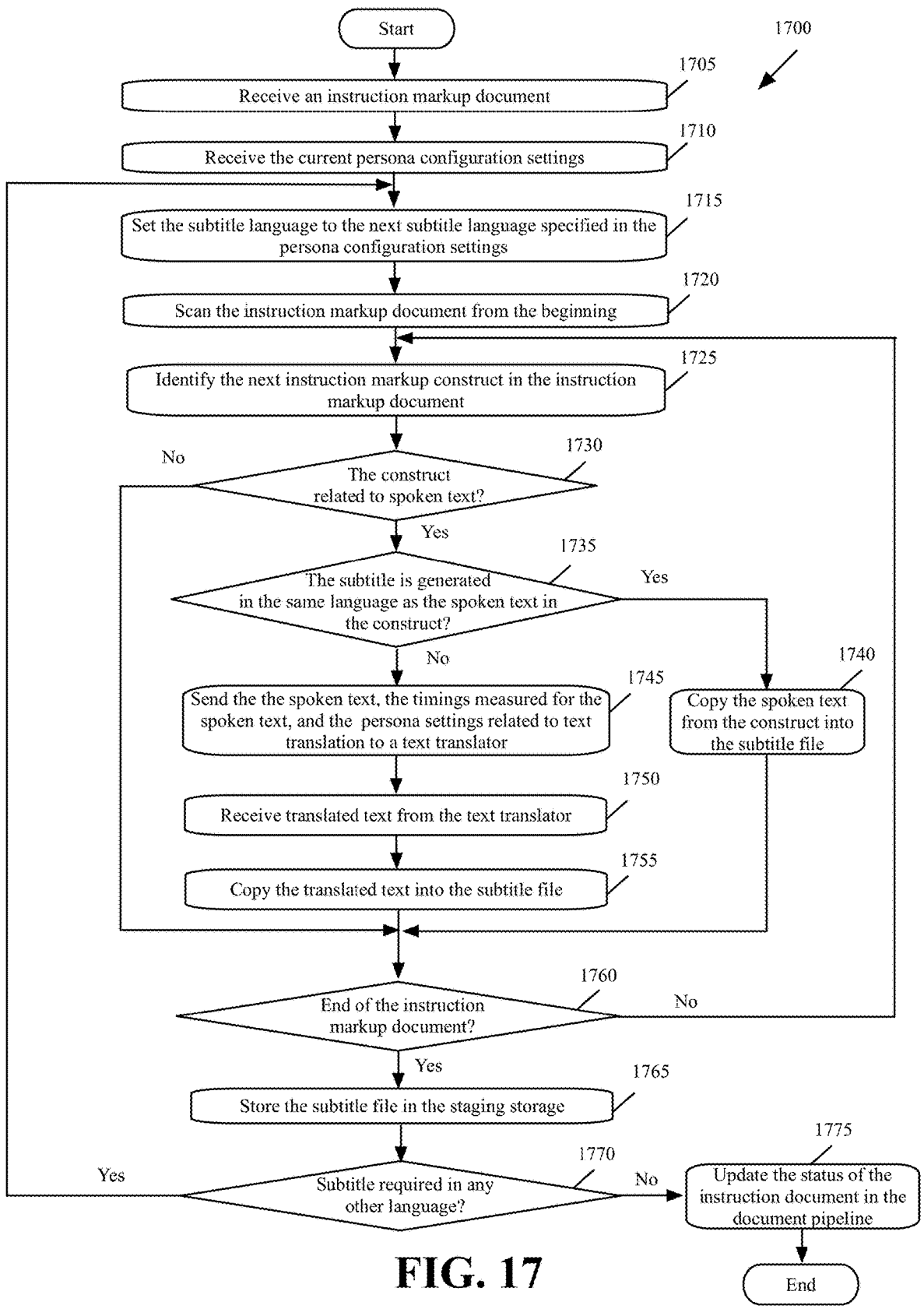
FIG. 17 is a flowchart illustrating an example process for generating one or more subtitle files for a rendered video file, according to various aspects of the present disclosure.

FIG. 17 is a flowchart illustrating an example process 1700 for generating one or more subtitle files for a rendered video file, according to various aspects of the present disclosure. The process 1700, in some of the present embodiments, may be performed by a processing unit of a computing device that implements the post processor 140 of FIG. 2F.

With reference to FIG. 17, an instruction markup document may be received (at block 1705). For example, the post processor 140 may receive the instruction markup document 102. The instruction markup document may be used by the post processor 140 to generate subtitles. At block 1710, the current persona configuration setting may be received. For example, the post processor 140 may receive the persona configuration 205. The persona configuration may include the information regarding the subtitle languages 1137 and the current language 1124 as shown in FIG. 11.

Next, the subtitle language may be set (at block 1715) to the next subtitle language specified in the persona configuration settings. For example, the persona setting may specify subtitles to be generated in several languages. In some embodiments such as the embodiments described with reference to FIG. 17, the post processor 140 may make several passes and may generate a subtitle file in one language in each pass.

The instruction markup document may be scanned (at block 1720) from the beginning. Since the post processor 140 may make one pass through the instruction markup document for each subtitle language, the post processor 140 may start scanning the instruction markup document from the beginning for each subtitle.

The next instruction markup construct in the instruction markup document may then be identified (at block 1725). Next, a determination may be made (at block 1730) whether the construct is related to spoken text. When the construct is not related to spoken text, the processing may proceed to block 1760, which is described below. For example, when the post processor 140 encounters a construct in the instruction markup document 102, which is not related to spoken word and therefore does not affect the subtitles, the post processor 140 may skip the construct.

When the construct is related to spoken text, a determination may be made (at block 1735) whether the subtitle is generated in the same language as the spoken text in the construct. For example, the post processor 140 may make a determination whether translation to a different language is required. When the subtitle is generated in the same language as the spoken text in the construct, the spoken text in the construct may be copied (at block 1740) from the construct into the subtitle file. The processing may then proceed to block 1760, which is described below.

When the subtitle is not generated in the same language as the spoken text in the construct, the spoken text, the timings measured for the spoken text, and the persona settings related to text translation are sent (at block 1745) to a text translator. For example, the post processor 140 may send the spoken text 210, the persona configuration 205 identifying the subtitle's language, and the mark tags 211 to the text translator 265 as described above with reference to FIG. 2F.

The translated text may then be received (at block 1750) from the text translator. The translated text may then be copied (at block 1755) into the subtitle file. Next, a determination may be made (at block 1760) whether the end of the instruction markup document is reached.

When the end of the instruction markup document is not reached, the processing may proceed to block 1725, which was described above. Otherwise, the subtitle file 106 may be stored (at block 1765) in the staging storage 111. For example, the post processor 140 may store the subtitle file in the staging storage.

At block 1770, a determination may be made whether a subtitle is required in any other languages. When a subtitle is required in any other language, the processing may proceed to block 1715, which was described above. Otherwise, the status of the instruction document in the pipeline may be updated (at block 1775). For example, the post processor 140 may store the document status 105 into the documents' status storage 221. The processing may then end.

Figure 18:
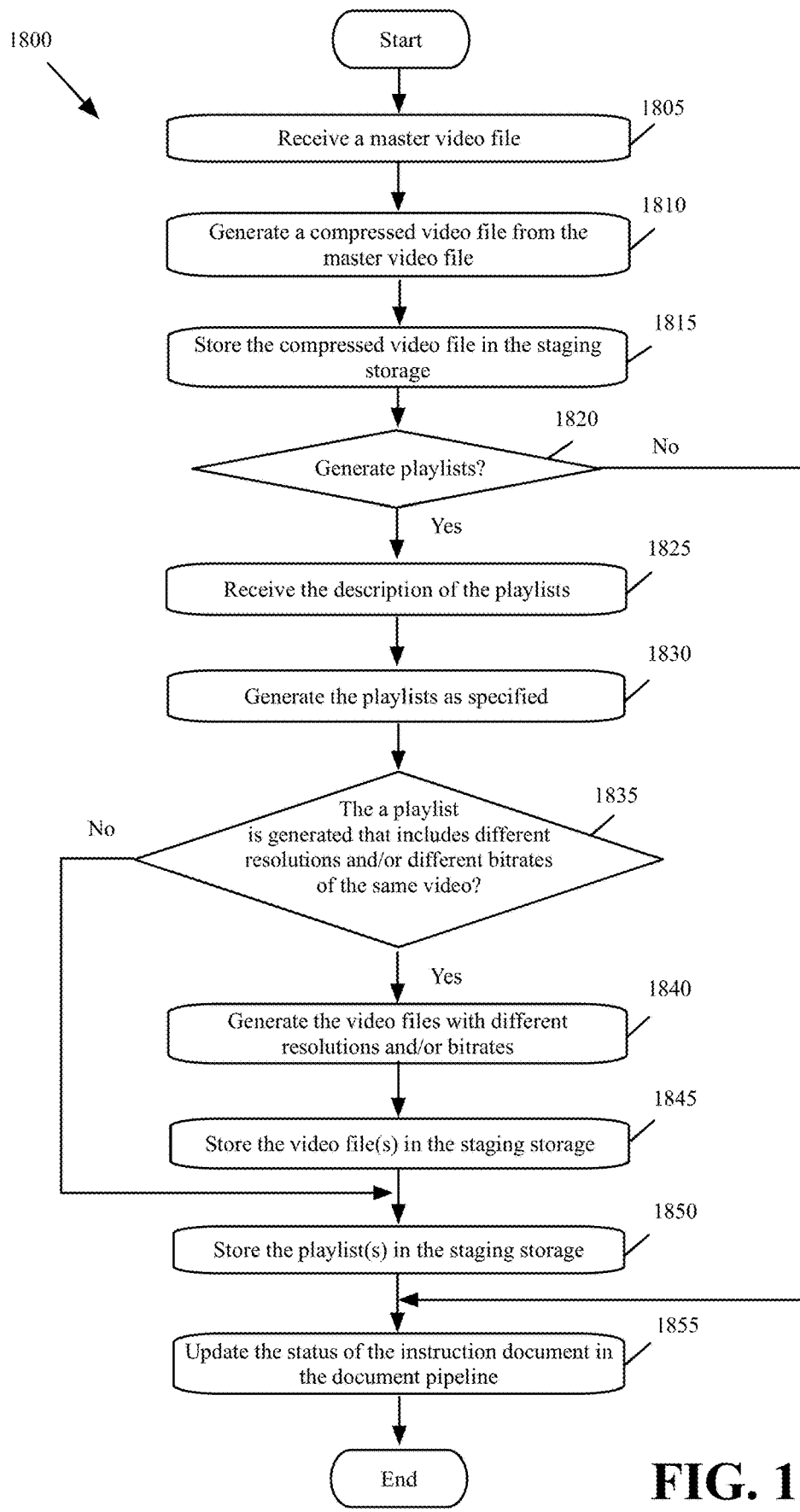
FIG. 18 is a flowchart illustrating an example process for encoding the master video file into one or more video files with different resolutions, and/or for creating one or more playlists, according to various aspects of the present disclosure.

FIG. 18 is a flowchart illustrating an example process 1800 for encoding the master video file into one or more video files with different resolutions, and/or for creating one or more playlists, according to various aspects of the present disclosure. The process 1800, in some of the present embodiments, may be performed by a processing unit of a computing device (e.g., one of the servers 153 of FIG. 1B) that implements the encoder 144 of FIG. 2G.

With reference to FIG. 18, a master video file may be received (at block 1805). For example, the encoder 145 may receive the master video file 105, as shown in FIG. 2G. The master video file 105 may be a high quality (e.g., high resolution and/or high bitrate) video file generated by the rendering engine 135, as described above with reference to FIG. 2E.

With further reference to FIG. 18, a compressed video file may be generated (at block 1810) from the master video file. For example, the encoder 145 may generate a compressed video file, such as an MP4 video file, as described above with reference to FIG. 2G. The compressed video file may then be stored (at block 1815) in the staging storage. For example, the encoder 145 may store the video file 107 in the staging storage 113.

Next, a determination may be made (at block 1820) whether to generate playlists. When the playlists are not to be generated, the processing may proceed to block 1855, which is described below. Otherwise, the description of the playlist may be received (at block 1825). Next, the playlists may be generated (at block 1830) as specified. For example, the encoder 145 may generate an M3U and/or an M3U8 playlist, as described above with reference to FIG. 2G.

Next, a determination may be made (at block 1835) whether a playlist is generated that includes different resolutions and/or different bitrates of the same video. For example, the encoder 145 may determine whether an M3U8 playlist is generated that requires different resolutions and/or bitrates of the compressed video file. When a playlist is not generated that includes different resolutions and/or different bitrates of the same video, the processing may proceed to block 1850, which is described below.

Otherwise, the video files with the different resolution and/or the transmission bitrates may be generated (at block 1840). The video file(s) may then be stored (at block 1845) in the staging storage. At block 1850, the playlists may be stored in the staging storage. The status of the instruction document in the pipeline may be updated (at block 1855). For example, the encoder 145 may store the document status 105 into the documents' status storage 221. The processing may then end.

Figure 19:
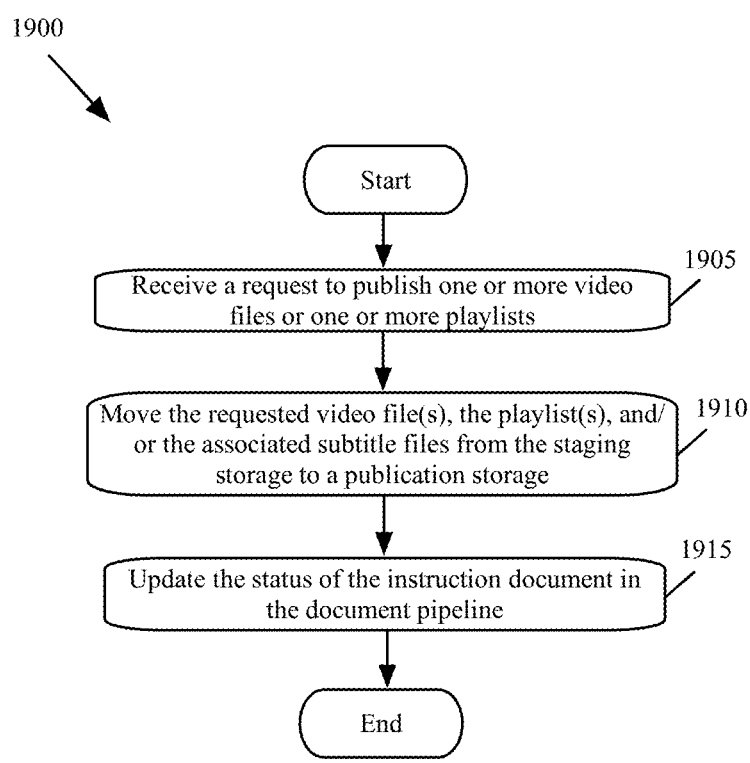
FIG. 19 is a flowchart illustrating an example process for publishing video files and playlists, according to various aspects of the present disclosure.

FIG. 19 is a flowchart illustrating an example process 1900 for publishing video files and playlists, according to various aspects of the present disclosure. The process 1900, in some of the present embodiments, may be performed by a processing unit of a server 153 of FIG. 2H.

With reference to FIG. 19, a request to publish one or more video files and/or one or more playlists may be received (at block 1905). For example, the rendering server 153 of FIG. 2H may receive the approval to publish 109 the video file(s) 107, the playlist(s) 108, and/or the subtitle(s) 106 after a client reviews and approves the video file(s) 107, the playlist(s) 108, and/or the subtitle(s) 106.

Next, the requested video file(s), the playlist(s), and/or the associated subtitle files may be moved (at block 1910) from the staging storage to a publication storage. For example, the rendering server 153 may copy the video file(s) 107, the playlist(s) 108, and/or the subtitle file(s) 106 from the staging storage 113 to the published files storage 114.

The status of the instruction document in the pipeline may be updated (at block 1915). For example, the rendering server 153 may store the document status 105 into the documents' status storage 221. The processing may then end.

Figure 20:
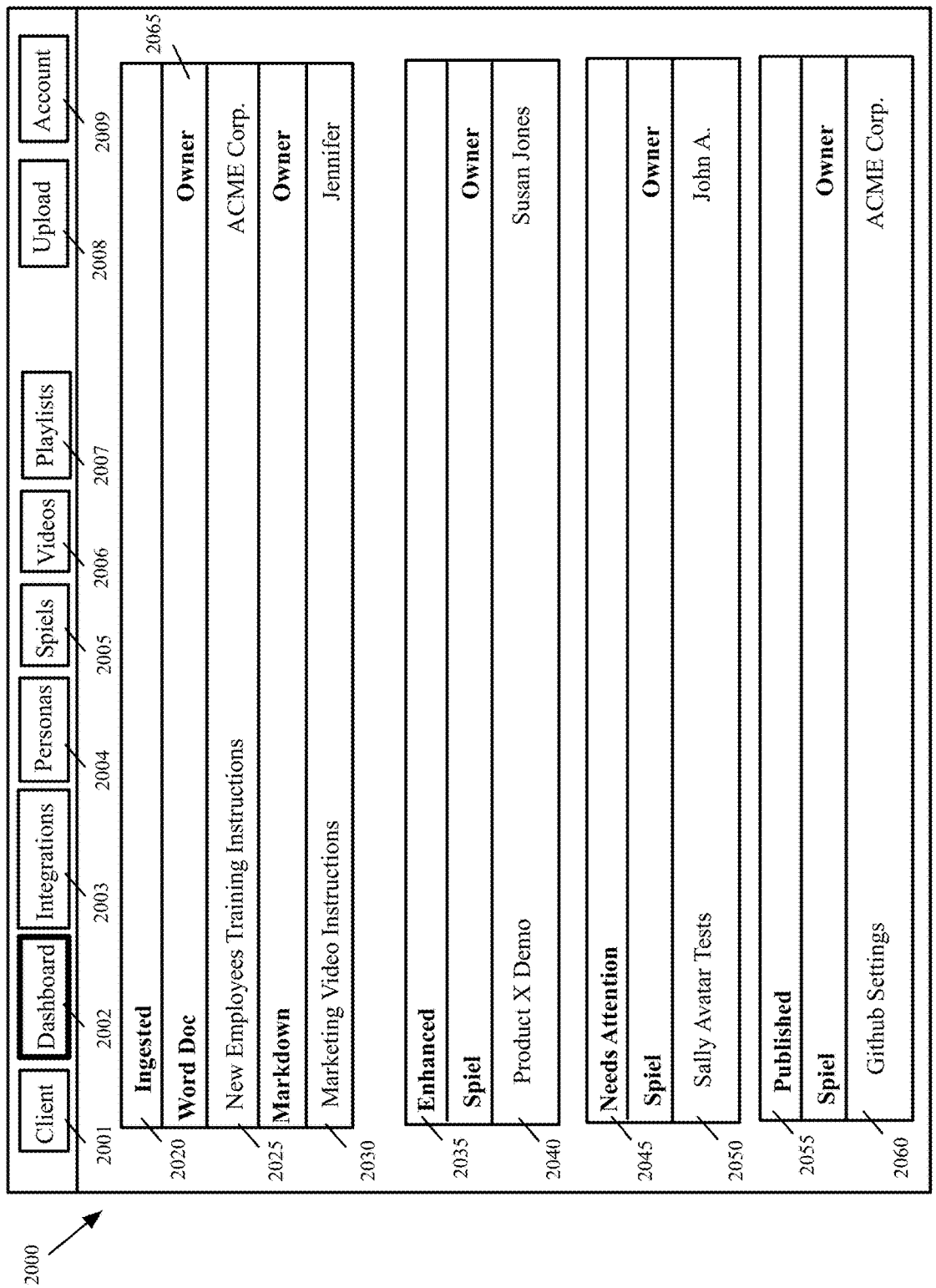
FIG. 20 is a schematic front view of the display of a client device that provides a dashboard displaying the status of different documents, according to various aspects of the present disclosure.

FIG. 20 is a schematic front view of the display of a client device that provides a dashboard displaying the status of different documents, according to various aspects of the present disclosure. With reference to FIG. 20, a user interface 2000 may be provided. The user interface may display one or more selectable tools (e.g., selectable buttons) 2001-2009 to allow a person to use the system 100 of FIG. 1A.

In the example of FIG. 20, the button 2002 is selected to display a dashboard for a particular user that has logged in the system 100. The user may be a client who is allowed to see the documents being processed for a company, a person who is allowed to see the documents being processed that are submitted by the person, an administrator of the system 100 with privilege to see the documents submitted by multiple clients, etc.

The user interface 2000 may show status, the type, and the name of different documents. The user interface 2000 may also show the owner 2065 of each document. The status of a document, in some embodiments, may include, for example, and without limitations, ingested, enhanced, rendering, pending approval, published, needs attention, etc.

In the example of FIG. 20, the document 2025 is a Word document and the document 2030 is a markdown document, both of which are shown to be ingested (as shown by 2020). The document 2040 is an instruction markup document (a spiel document) and the document is enhanced (as shown by 2035).

The document 2050 is an instruction markup document and needs attention (as shown by 2045). For example, there may be a construct in the document 2050 that the rendering engine 130 was not able to process and the rendering engine 130 has wrapped in an error tag, as described above with reference to FIG. 12C. The document 2060 is an instruction markup document that is published (as shown by 2055).

Figure 21:
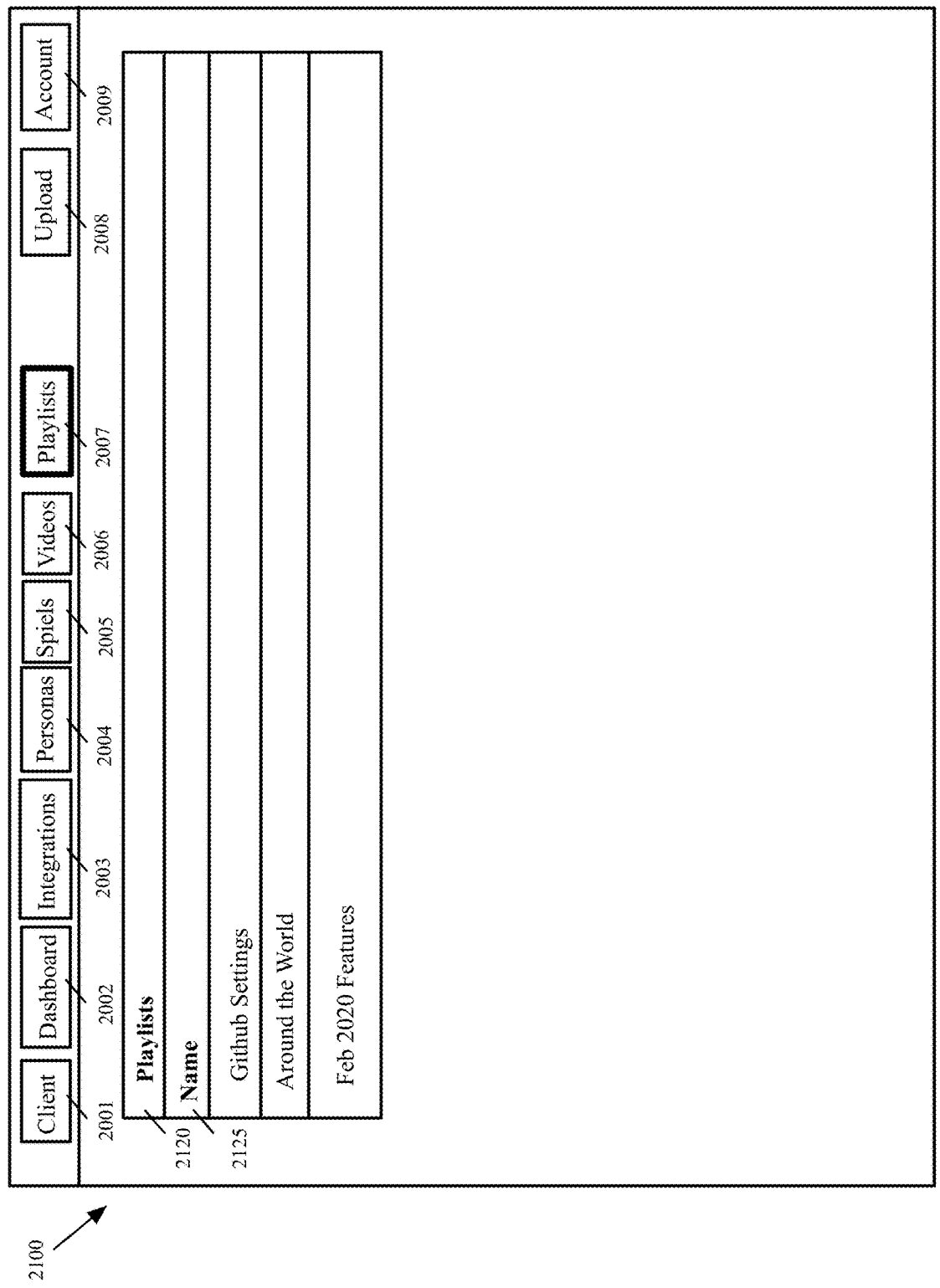
FIG. 21 is a schematic front view of the display of a client device that shows the playlists, according to various aspects of the present disclosure.

FIG. 21 is a schematic front view of the display of a client device that shows the playlists, according to various aspects of the present disclosure. With reference to FIG. 21, a user interface 2100 may be provided. The user interface 2100 may display one or more selectable tools (e.g., selectable buttons) 2001-2009 to allow a person to use the system 100 of FIG. 1A.

In the example of FIG. 21, the button 2007 is selected to display the playlists. As shown, the user interface 2100 may show a list of the playlists (as shown by 2120). The playlists may be identified by their names 2125.

Figure 22:
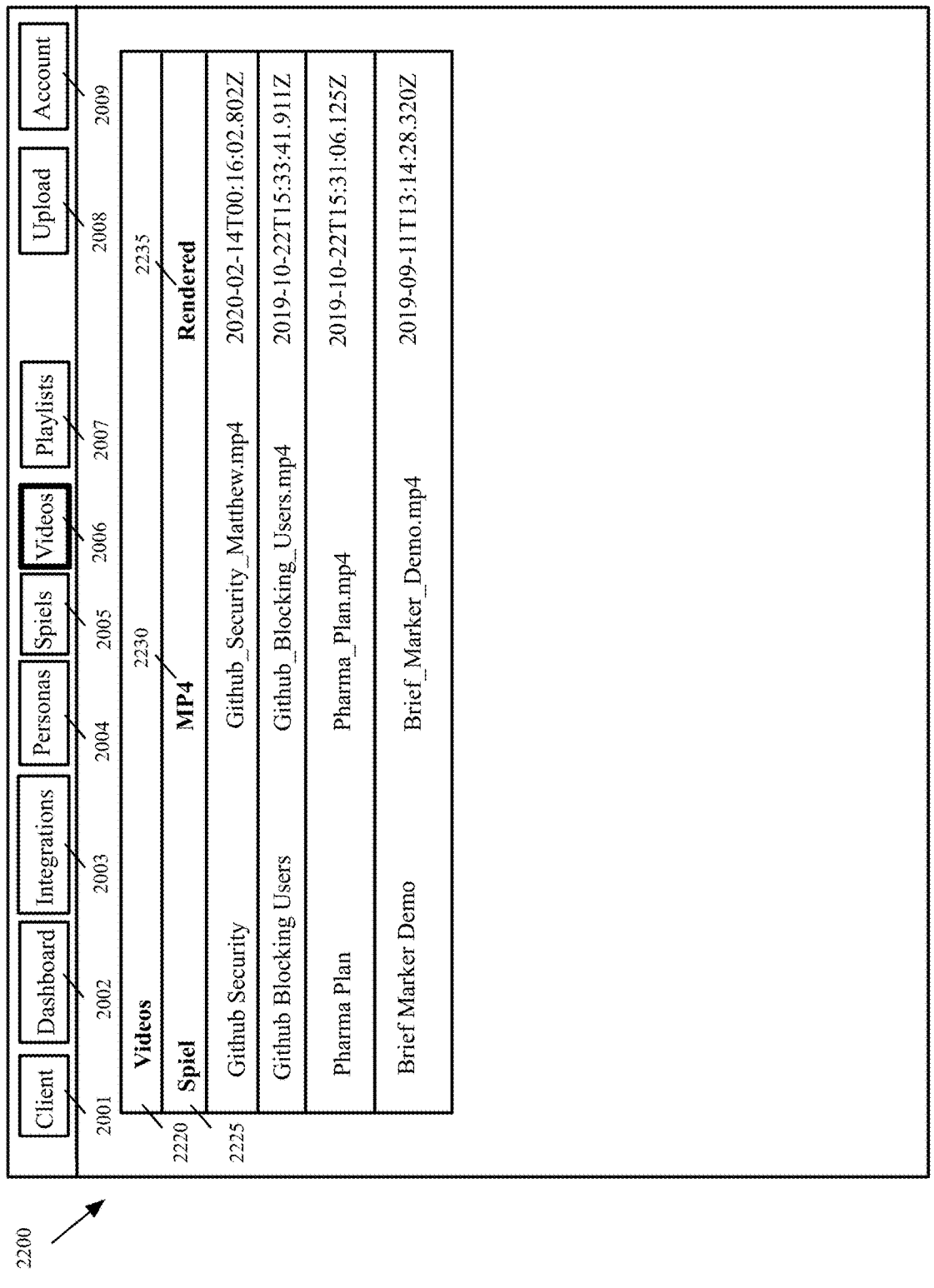
FIG. 22 is a schematic front view of the display of a client device that shows the rendered videos, according to various aspects of the present disclosure.

FIG. 22 is a schematic front view of the display of a client device that shows the rendered videos, according to various aspects of the present disclosure. With reference to FIG. 22, a user interface 2200 may be provided. The user interface 2200 may display one or more selectable tools (e.g., selectable buttons) 2001-2009 to allow a person to use the system 100 of FIG. 1A.

In the example of FIG. 22, the button 2006 is selected to display the rendered videos. As shown, a list 2220 of the rendered videos may be displayed. The rendered videos may be identified by the instruction markup document 2225 that was used to render the video, the type 2230 of the video, and the rendering time 2235.

Figure 23:
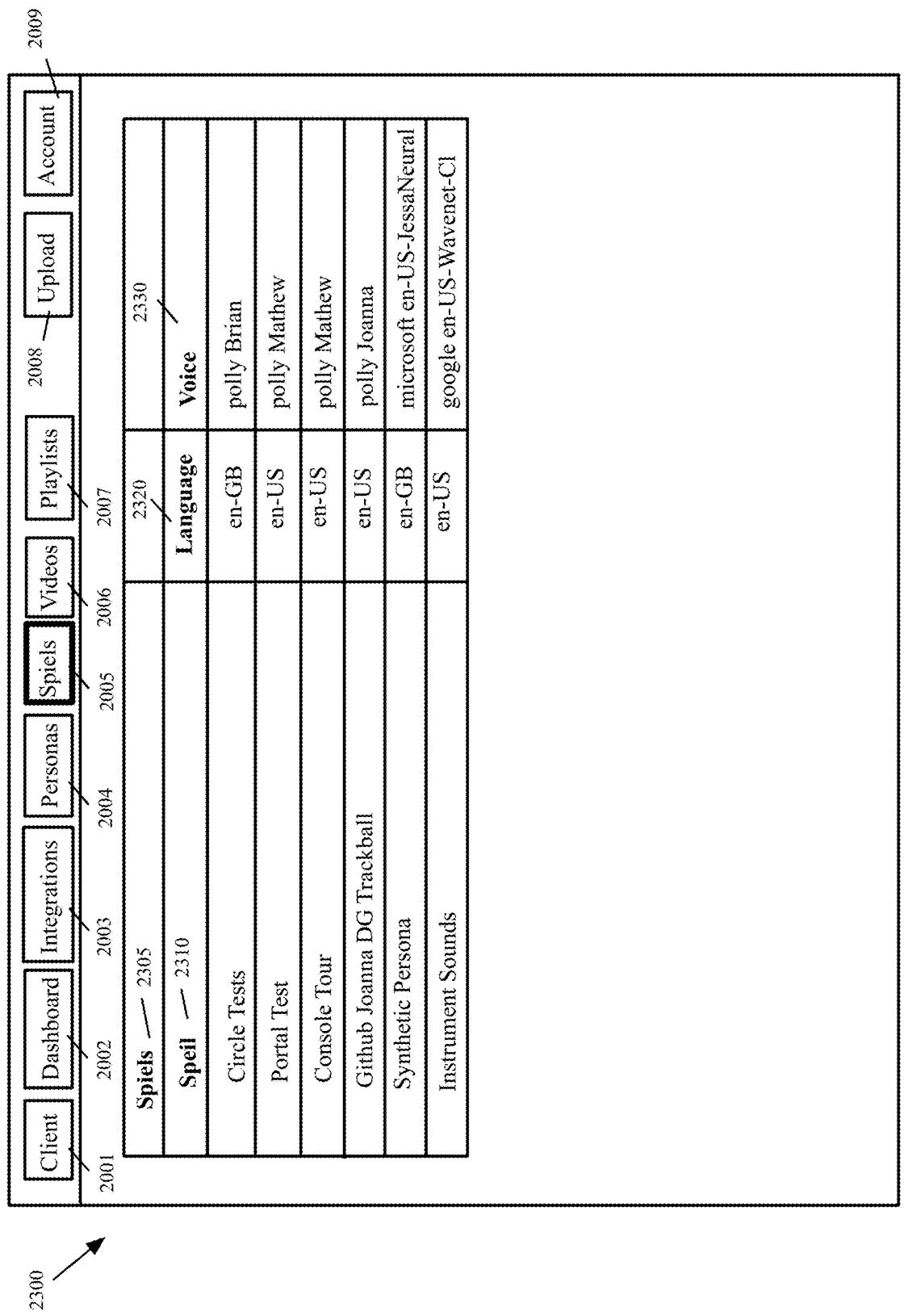
FIG. 23 is a schematic front view of the display of a client device that shows the list of the instruction markup documents, according to various aspects of the present disclosure.

FIG. 23 is a schematic front view of the display of a client device that shows the list of the instruction markup documents, according to various aspects of the present disclosure. With reference to FIG. 23, a user interface 2300 may be provided. The user interface 2300 may display one or more selectable tools (e.g., selectable buttons) 2001-2009 to allow a person to use the system 100 of FIG. 1A.

In the example of FIG. 23, the button 2005 is selected to display the list 2305 of the instruction markup documents. As shown, for each document, the type 2310, the language 2320, and the voice persona 23830 are shown.

Figure 24:
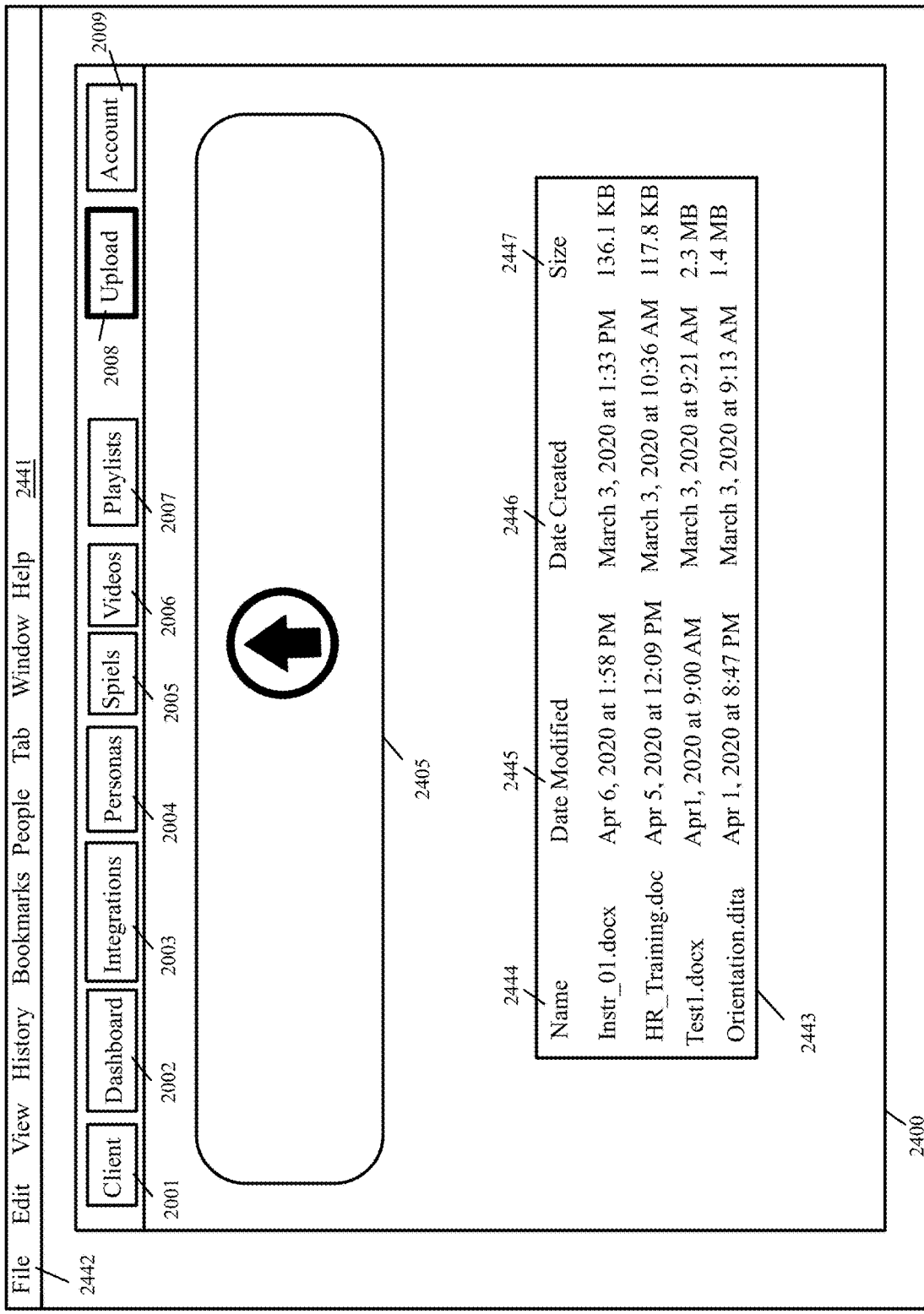
FIG. 24 is a schematic front view of the display of a client device that shows a user interface for uploading documents into the system of FIG. 1A, according to various aspects of the present disclosure.

FIG. 24 is a schematic front view of the display of a client device that shows a user interface for uploading documents into the system of FIG. 1A, according to various aspects of the present disclosure. With reference to FIG. 24, a user interface 2400 may be provided. The user interface 2400 may display one or more selectable tools (e.g., selectable buttons) 2001-2009 to allow a person to use the system 100 of FIG. 1A.

In the example of FIG. 24, the user interface 2400 is opened by a browser and is displayed within the browser window 2440. The browser window 2440 may include a toolbar 2441. The toolbar 2441 may include a button 2442 to open a file directory and display a list of files. As shown, when the button 2442 is selected, a file directory 2443 may be displayed.

The file directory 2443 may display the names 2444 and other information 2445-2447 of several different files in a directory. Any of the files 2444 may be uploaded to the system 100 of FIG. 1A by dragging and dropping the file into the display area 2405.

FIG. 25 is a schematic front view of the display of a client device that shows a sidebar organizer, according to various aspects of the present disclosure. Given one or more topic elements, the organizer construct configures a sidebar organizer to track the progress through a list of topics. FIG. 25, as shown, includes three stages 2501-2503. In stage 2501, a sidebar organizer 2505 may be shown with six topics 2511-2516. In the example of FIG. 25, the topic 2514 is highlighted in stage 2501. Several items 2530-2540 related to the topic 2514 are displayed in the display area 2510.

In stage 2502, the sidebar organizer may be hidden, for example, after the rendering engine encounters an <organizer_hide/> construct in the instruction markup document. In stage 2503, the sidebar organizer may be displayed again, for example, after the rendering engine encounters an <organizer_show/> construct in the instruction markup document. As shown in stage 2503, the topic 2515 is highlighted as the current topic and an item 2550 related to the topic 2515 is displayed in the display area.

Many of the above-described features and applications may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions may be implemented as sub-parts of a larger program while remaining distinct software inventions. In some embodiments, multiple software inventions may also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 26 is a functional block diagram illustrating an example electronic system 2600, according to various aspects of the present disclosure. With reference to FIG. 26, some embodiments of the invention, such as for example, and without limitations, the servers, the computing devices, the electronic devices, the virtual machines, the containers described above, may be implemented using the electronic system 2600. The electronic system 2600 may be used to execute any of the processes, methods, controls, virtualization, or operating system applications described above. The electronic system 2600 may be a computer (e.g., a desktop computer, personal computer, tablet computer, server computer, mainframe, a blade computer etc.), phone (e.g., a smartphone), personal digital assistant (PDA), or any other sort of electronic device. Such an electronic system may include various types of computer readable media and interfaces for various other types of computer readable media. The electronic system 2600 may include a bus 2605, processing unit(s) 2610, a system memory 2620, a read-only memory (ROM) 2630, a permanent storage device 2635, input devices 2640, and output devices 2645.

The bus 2605 may collectively represent all system, peripheral, and chipset buses that communicatively connect the numerous internal devices of the electronic system 2600. For example, the bus 2605 may communicatively connect the processing unit(s) 2610 with the read-only memory 2630, the system memory 2620, and the permanent storage device 2635.

From these various memory units, the processing unit(s) 2610 may retrieve instructions to execute and data to process in order to execute the processes of the invention. The processing unit(s) may be a single processor or a multi-core processor in different embodiments.

The read-only-memory 2630 may store static data and instructions that are needed by the processing unit(s) 2610 and other modules of the electronic system. The permanent storage device 2635, on the other hand, may be a read-and-write memory device. This device is a non-volatile memory unit that may store instructions and data even when the electronic system 2600 is off. Some embodiments of the invention may use a mass-storage device (such as a magnetic or optical disk and its corresponding disk drive) as the permanent storage device 2635.

Other embodiments may use a removable storage device (such as a floppy disk, flash drive, etc.) as the permanent storage device. Like the permanent storage device 2635, the system memory 2620 may be a read-and-write memory device. However, unlike storage device 2635, the system memory may be a volatile read-and-write memory, such as random access memory. The system memory may store some of the instructions and data that the processor needs at runtime. In some embodiments, the invention's processes may be stored in the system memory 2620, the permanent storage device 2635, and/or the read-only memory 2630. From these various memory units, the processing unit(s) 2610 may retrieve instructions to execute and data to process in order to execute the processes of some embodiments.

The bus 2605 may also connect to the input and output devices 2640 and 2645. The input devices may enable the user to communicate information and select commands to the electronic system. The input devices 2640 may include alphanumeric keyboards and pointing devices (also called "cursor control devices"). The output devices 2645 may display images generated by the electronic system. The output devices may include printers and display devices, such as cathode ray tubes (CRT) or liquid crystal displays (LCD). Some embodiments may include devices such as a touchscreen that function as both input and output devices.

Finally, as shown in FIG. 26, the bus 2605 may also couple the electronic system 2600 to a network 2625 through a network adapter (not shown). In this manner, the computer may be a part of a network of computers (such as a local area network ("LAN"), a wide area network ("WAN"), an Intranet, or a network of networks, such as the Internet. Any or all components of the electronic system 2600 may be used in conjunction with the invention.

Some embodiments may include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments may be performed by one or more integrated circuits, such as application specific integrated circuits (ASICs) or field programmable gate arrays (FPGAs). In some embodiments, such integrated circuits may execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, a number of the figures (including FIGS. 3, 6, 8-10, 12A-12C, and 17-19) conceptually illustrate processes. The steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method of generating video files, the method comprising:
    receiving a link to a web-based document;
    receiving a domain-specific markup document different from the web-based document, comprising:
    a set of instructions to start and stop recording one or more video files;
    a set of browser instructions for navigating the web-based document;
    and a set instructions for generating speech;
    displaying a page of the web-based document on a display of a computing device;
    sequentially identifying the instructions in the domain-specific markup document;
    start recording the display of the computing device in a video file in response to identifying a browser instruction in the domain-specific markup document to start recording a video file;
    navigating the web-based document in response to identifying the browser instructions in the domain-specific markup document for navigating the web-based document;
    recording the display of the computing device in the video file while the web-based document is navigated based on the browser instructions in the domain-specific markup document;
    playing an audio file in response to identifying the browser instructions in the domain-specific markup document for generating speech while the display of the computing device is being recorded in the video file;
    stop recording the video file in response to identifying an instruction in the domain-specific markup document to stop recording the video file; and
    storing the recorded video file.

2. The method of claim 1, wherein playing the audio file comprises:
    prior to receiving the domain-specific markup document, sending an instruction for generating speech to a speech synthesizer, the instruction for generating speech comprising an identification of a spoken language and text for converting to speech;
    receiving, from the speech synthesizer, an audio file corresponding to the text in the identified language; and
    playing the audio file received from the speech synthesizer on the computing device.

3. The method of claim 2, wherein the instruction sent to the speech synthesizer further comprises an identification of a voice persona, and wherein the audio file received from the speech synthesizer is generated using the identified voice persona.

4. The method of claim 2 further comprising:
    identifying a spoken language for generating a subtitle;
    generating a subtitle in the identified language; and
    storing the subtitle for overlaying over the recorded video file by a video player.

5. The method of claim 1, wherein the computing device is a first computing device, wherein the domain-specific markup document further comprises a set of instructions for starting a session with a second computing device, the set of instructions for starting the session comprising one or more commands and an identification of a display area on the display of the first computing device, the method further comprising:
    connecting the first computing device to the second computing device through a secure connection;
    sending each command to the terminal second computing device;
    in response to sending each command, receiving one or more responses from the second computing device; and
    displaying the response on the identified display area of the first computing device.

6. The method of claim 5, wherein the secure connection is one of a ssh connection and a telnet connection.

7. The method of claim 5, wherein the domain-specific markup document further comprises an instruction to clear the identified display area of the first computing device, the method further comprising clearing the identified display area of the first computing device in response to receiving the instruction to clear the identified display area.

8. The method of claim 5, wherein the domain-specific markup document further comprises an instruction to exit the session with the second computing device, the method further comprising exiting the session with the second computing device in response to the instruction to exit the session.

9. The method of claim 1 further comprising:
prior to receiving the domain-specific markup document, receiving an editable instruction document comprising:
a set of instructions for navigating the web-based document; and
text for generating speech;
converting the set of instructions for navigating the web-based document in the editable instruction document into the instructions for navigating the web-based document in the domain-specific markup document; and
converting the text for generating speech into instructions for generating speech in the domain-specific markup document.

10. The method of claim 9, wherein the editable instruction document is one of a plain text document, a markdown document, a document comprising plain text and markdown instructions, and a Darwin Information Typing Architecture (DITA) document.

11. The method of claim 9, wherein the editable instruction document further comprises a heading, the method further comprising:
identifying a block of text following the heading; and
generating an instruction in the domain-specific markup document for displaying a pop up message comprising the block of text.

12. The method of claim 9, wherein the editable instruction document comprises a bold word, the method further comprising:
generating an instruction in the domain-specific markup document to create an emphasis in a word corresponding to the bold word in an audio file.

13. The method of claim 1, wherein the domain-specific markup document further comprises a script, the method further comprising:
performing the script while the display of the computing device is being recorded in the video file.

14. The method of claim 1, wherein the domain-specific markup document further comprises a sidebar organizer information comprising one or more topic elements, the method further comprising:
displaying the topic elements on the display of the computing device while the display of the computing device is being recorded in the video file; and
visually identifying a progress through the topic elements.

15. The method of claim 1, wherein the domain-specific markup document further comprises an identification of an animation, the method further comprising:
identifying a persona for the animation based on a current personal configuration; and
displaying the animation on the display of the computing device while the display of the computing device is being recorded in the video file.

16. The method of claim 1, wherein the domain-specific markup document further comprises an instruction for generating a delay, the method further comprising:
generating the delay prior to navigating the web-based document or playing audio on the computing device.

17. The method of claim 1, wherein the domain-specific markup document further comprises an instruction for waiting for a display event, the method further comprising:
determining that the display event has occurred prior to processing any further instructions in the domain-specific markup document.

18. The method of claim 1 further comprising:
receiving a request to publish the stored video file; and
generating one or more video files with formats specified in a current personal configuration.

19. The method of claim 1 further comprising:
receiving a request to publish the stored video file; and
generating one or more playlists as specified in a current personal configuration.

20. A non-transitory machine readable medium storing a program which when executed by at least one processor implements a video file generating engine, the program comprising sets of instructions for:
receiving a link to a web-based document;
receiving a domain-specific markup document different from the web-based document, comprising:
a set of instructions to start and stop recording one or more video files;
a set of browser instructions for navigating the web-based document; and
a set instructions for generating speech;
displaying a page of the web-based document on a display screen of a computing device;
sequentially identifying the instructions in the domain-specific markup document;
start recording the display of the computing device in a video file in response to identifying a browser instruction in the domain-specific markup document to start recording a video file;
navigating the web-based document in response to identifying the browser instruction in the domain-specific markup document for navigating the web-based document;
recording the display of the computing device in the video file while the web-based document is navigated based on the browser instructions in the domain-specific markup document;
playing an audio file in response to identifying the browser instruction in the domain-specific markup document for generating speech while the display of the computing device is being recorded in the video file;
stop recording the video file in response to identifying an instruction in the domain-specific markup document to stop recording the video file;
and storing the recorded video file.

21. The non-transitory machine readable medium of claim 20, wherein the set of instructions for playing the audio file comprises sets of instructions for:
sending, prior to receiving the domain-specific markup document, an instruction for generating speech to a speech synthesizer, the instruction for generating speech comprising an identification of a spoken language and text for converting to speech;
receiving, from the speech synthesizer, an audio file corresponding to the text in the identified language; and
playing the audio file received from the speech synthesizer on the computing device.

22. The non-transitory machine readable medium of claim 21, wherein the instruction for generating speech sent to the speech synthesizer further comprises an identification of a voice persona, and wherein the audio file received from the speech synthesizer is generated using the identified voice persona.

23. The non-transitory machine readable medium of claim 21, the program further comprising sets of instructions for:
identifying a spoken language for generating a subtitle;
generating a subtitle in the identified language; and
storing the subtitle for overlaying over the recorded video file by a video player.

24. The non-transitory machine readable medium of claim 20, wherein the computing device is a first computing device, wherein the domain-specific markup document further comprises a set of instructions for starting a session with a second computing device, the set of instructions for starting the session comprising one or more commands and an identification of a display area on the display of the first computing device, the program further comprising sets of instructions for:
 connecting the first computing device to the second computing device through a secure connection;
 sending each command to the second computing device;
 receiving, in response to sending each command, one or more responses from the second computing device; and
 displaying the response on the identified display area of the first computing device.

25. The non-transitory machine readable medium of claim 24, wherein the secure connection is one of a ssh connection and a telnet connection.

26. The non-transitory machine readable medium of claim 24, wherein the domain-specific markup document further comprises an instruction to clear the identified display area of the first computing device, the program further comprising:
 a set of instructions for clearing the identified display area of the first computing device in response to receiving the instruction to clear the identified display area.

27. The non-transitory machine readable medium of claim 24, wherein the domain-specific markup document further comprises an instruction to exit the session with the second computing device, the program further comprising:
 a set of instructions for exiting the session with the second computing device in response to the instruction to exit the session.

28. The non-transitory machine readable medium of claim 20, the program further comprising sets of instructions for:
 receiving, prior to receiving the domain-specific markup document, an editable instruction document comprising:
  a set of instructions for navigating the web-based document; and
  text for generating speech;
 converting the set of instructions for navigating the web-based document in the editable instruction document into the instructions for navigating the web-based document in the domain-specific markup document; and
 converting the text for generating speech into instructions for generating speech in the domain-specific markup document.

29. The non-transitory machine readable medium of claim 28, wherein the editable instruction document is one of a plain text document, a markdown document, a document comprising plain text and markdown instructions, and a Darwin Information Typing Architecture (DITA) document.

30. The non-transitory machine readable medium of claim 28, wherein the editable instruction document further comprises a heading, the program further comprising sets of instructions for:
 identifying a block of text following the heading; and
 generating an instruction in the domain-specific markup document for displaying a pop up message comprising the block of text.

31. The non-transitory machine readable medium of claim 28, wherein the editable instruction document comprises a bold word, the program further comprising:
 a set of instructions for generating an instruction in the domain-specific markup document to create an emphasis in a word corresponding to the bold word in an audio file.

32. The non-transitory machine readable medium of claim 20, wherein the domain-specific markup document further comprises a script, the program further comprising:
 a set of instructions for performing the script while the display of the computing device is being recorded in the video file.

33. The non-transitory machine readable medium of claim 20, wherein the domain-specific markup document further comprises a sidebar organizer information comprising one or more topic elements, the program further comprising sets of instructions for:
 displaying the topic elements on the display of the computing device while the display of the computing device is being recorded in the video file; and
 visually identifying a progress through the topic elements.

34. The non-transitory machine readable medium of claim 20, wherein the domain-specific markup document further comprises an identification of an animation, the program further comprising sets of instructions for:
 identifying a persona for the animation based on a current personal configuration; and
 displaying the animation on the display of the computing device while the display of the computing device is being recorded in the video file.

35. The non-transitory machine readable medium of claim 20, wherein the domain-specific markup document further comprises an instruction for generating a delay, the program further comprising a set of instructions for:
 generating the delay prior to navigating the web-based document or playing audio on the computing device.

36. The non-transitory machine readable medium of claim 20, wherein the domain-specific markup document further comprises an instruction for waiting for a display event, the program further comprising a set of instructions for:
 determining that the display event has occurred prior to processing any further instructions in the domain-specific markup document.

37. The non-transitory machine readable medium of claim 20, the program further comprising sets of instructions for:
 receiving a request to publish the stored video file; and
 generating one or more video files with formats specified in a current personal configuration.

38. The non-transitory machine readable medium of claim 20, the program further comprising sets of instructions for:
 receiving a request to publish the stored video file; and
 generating one or more playlists as specified in a current personal configuration.

\* \* \* \* \*